United States Patent
Yamamoto et al.

(10) Patent No.: US 10,866,749 B2
(45) Date of Patent: *Dec. 15, 2020

(54) COMPOUND STORAGE SYSTEM AND STORAGE CONTROL METHOD TO CONFIGURE CHANGE ASSOCIATED WITH AN OWNER RIGHT TO SET THE CONFIGURATION CHANGE

(71) Applicant: Hitachi, Ltd., Tokyo (JP)

(72) Inventors: Akira Yamamoto, Tokyo (JP); Miho Imazaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/814,557

(22) Filed: Mar. 10, 2020

(65) Prior Publication Data
US 2020/0210083 A1 Jul. 2, 2020

Related U.S. Application Data

(63) Continuation of application No. 14/989,583, filed on Jan. 6, 2016, now Pat. No. 10,599,351, which is a
(Continued)

(51) Int. Cl.
*G06F 3/00* (2006.01)
*G06F 3/06* (2006.01)

(52) U.S. Cl.
CPC .......... *G06F 3/0631* (2013.01); *G06F 3/0604* (2013.01); *G06F 3/0607* (2013.01);
(Continued)

(58) Field of Classification Search
CPC .................................................. G06F 3/0631
See application file for complete search history.

(56) References Cited

U.S. PATENT DOCUMENTS 6,625,691 B2 9/2003 Obara et al.
7,120,739 B2 10/2006 Fujimoto et al.
(Continued)

FOREIGN PATENT DOCUMENTS

JP 03-726484 B4 12/2005
JP 2006-338341 A 12/2006
(Continued)

OTHER PUBLICATIONS

PCT International Search Report and Written Opinion on application PCT/JP2013/001840 dated Dec. 10, 2013; 12 pages.
(Continued)

*Primary Examiner* — Tammara R Peyton
(74) *Attorney, Agent, or Firm* — Foley & Lardner LLP

(57) ABSTRACT

One or more storage systems are connected to one or more storage boxes comprising multiple storage devices. Multiple storage areas provided by one or more storage boxes include an allocated area, which is a storage area that is allocated to a virtual volume, and an empty area, which is a storage area that is not allocated to any logical volume. Multiple owner rights corresponding to multiple storage areas are set in one or more storage systems. A storage system having an empty area owner right changes an empty area to the allocated area by allocating the empty area. In a case where a configuration change (a relative change in the number of storage boxes with respect to the number of storage systems) is performed, a first storage system that exists after the configuration change sets, in the first storage system, either more or fewer owner rights than the owner rights, which have been allocated to the first storage system before the configuration change.

11 Claims, 52 Drawing Sheets

Related U.S. Application Data continuation of application No. 13/978,023, filed as application No. PCT/JP2013/001840 on Mar. 18, 2013, now Pat. No. 9,250,809.

(52) U.S. Cl.
CPC ............ *G06F 3/067* (2013.01); *G06F 3/0608* (2013.01); *G06F 3/0629* (2013.01); *G06F 3/0647* (2013.01); *G06F 3/0659* (2013.01); *G06F 3/0665* (2013.01); *G06F 3/0689* (2013.01)

(56) References Cited

U.S. PATENT DOCUMENTS

| | | |
|---|---|---|
| 7,461,196 B2 | 12/2008 | Kawamura et al. |
| 8,099,497 B2 | 1/2012 | Melnikov |
| 8,307,171 B2 | 11/2012 | Ogawa et al. |
| 8,756,392 B2 | 6/2014 | Matsui et al. |
| 10,628,086 B2 * | 4/2020 | Calder .................. G06F 3/0644 |
| 2002/0194426 A1 | 12/2002 | Obara et al. |
| 2003/0009619 A1 | 1/2003 | Kano et al. |
| 2005/0044140 A1 | 2/2005 | Urabe |
| 2008/0184000 A1 | 7/2008 | Kawaguchi |
| 2010/0318579 A1 | 12/2010 | Satoyama et al. |
| 2011/0307680 A1 | 12/2011 | Yamamoto |
| 2012/0198190 A1 | 8/2012 | Hart et al. |
| 2012/0290804 A1 | 11/2012 | Eguchi |

FOREIGN PATENT DOCUMENTS

| | | |
|---|---|---|
| JP | 2008-040571 A | 2/2008 |
| JP | 04-369520 B2 | 11/2009 |
| WO | WO-2012/085975 A1 | 6/2012 |

OTHER PUBLICATIONS

Non-Final Office Action in U.S. Appl. No. 16/814,545 dated Aug. 21, 2020.

* cited by examiner

FIG. 2

| | |
|---|---|
| SERVER PORT IDENTIFIER | ~24000 |
| LOGICAL VOLUME IDENTIFIER | ~24001 |
| STORAGE SYSTEM IDENTIFIER | ~24002 |
| STORAGE PORT IDENTIFIER | ~24003 |
| ⋮ | |
| LOGICAL VOLUME IDENTIFIER | ~24001 |
| STORAGE SYSTEM IDENTIFIER | ~24002 |
| STORAGE PORT IDENTIFIER | ~24003 |

SEVER PORT INFORMATION 198

STORAGE SYSTEM INFORMATION 2060

FIG. 9

| | |
|---|---|
| LOGICAL VOLUME ID | ~2001 |
| LOGICAL CAPACITY | ~2002 |
| LOGICAL VOLUME TYPE | ~2005 |
| LOGICAL VOLUME RAID GROUP TYPE | ~2003 |
| ALLOCATION EXTENT | ~2006 |
| SEGMENT BIT MAP | ~2014 |
| FIRST WRITE TIMES | ~2008 |
| SECOND READ TIMES | ~2009 |
| SECOND WRITE TIMES | ~2010 |
| MIGRATION FLAG | ~2015 |
| MIGRATED LUN | ~2016 |
| MIGRATION POINTER | ~2017 |
| MIGRATION WAITING FLAG | ~2018 |
| MIGRATION FOR CLOSING FLAG | ~2019 |
| MIGRATION TARGET LUN | ~2020 |
| MIGRATED LUN FOR CLOSING | ~2021 |
| CACHE MANAGEMENT POINTER | ~2022 |
| ⋮ | |
| CACHE MANAGEMENT POINTER | ~2022 |

LOGICAL VOLUME INFORMATION 2000

CACHE MANAGEMENT INFORMATION 2750

EMPTY CACHE INFORMATION MANAGEMENT QUEUE 2201

FIG. 12

| |  |
|---|---|
| STORAGE BOX IDENTIFIER | ~7000 |
| CONNECTION INFORMATION | ~7001 |
| NUMBER OF STORAGE UNITS | ~7002 |
| NUMBER OF CONNECTED STORAGE UNITS | ~7003 |
| NUMBER OF PATHS | ~7004 |
| PATH IDENTIFIER | ~7006 |
| ⋮ | |
| PATH IDENTIFIER | ~7006 |
| NUMBER OF ACCESSIBLE PATHS | ~7005 |

STORAGE BOX INFORMATION 2050

FIG. 13

| STORAGE GROUP ID | — 2301 |
| --- | --- |
| STORAGE GROUP TYPE | — 2306 |
| PACKAGE GROUP RAID TYPE | — 2302 |
| NUMBER OF SEGMENTS | — 2303 |
| NUMBER OF ALLOCATABLE SEGMENTS | — 2309 |
| NUMBER OF EMPTY SEGMENTS | — 2304 |
| ALLOCATABLE SEGMENT BIT MAP | — 2308 |
| EMPTY SEGMENT BIT MAP | — 2307 |
| STORAGE UNIT POINTER | — 2305 |
| ⋮ | |
| STORAGE UNIT POINTER | — 2305 |
| FIRST R TIMES | — 2310 |
| SECOND R TIMES | — 2311 |
| FIRST W TIMES | — 2312 |
| SECOND W TIMES | — 2313 |

STORAGE GROUP INFORMATION 2300

FIG. 29

| STORAGE BOX IDENTIFIER | ~7000 |
| --- | --- |
| CONNECTION INFORMATION | ~7001 |
| NUMBER OF STORAGE UNITS | ~7002 |
| NUMBER OF CONNECTED STORAGE UNITS | ~7003 |
| NUMBER OF PATHS | ~7004 |
| NUMBER OF ACCESSIBLE PATHS | ~7005 |
| STORAGE SYSTEM HAVING CONTROL RIGHT | ~7006 |

STORAGE BOX INFORMATION 2050

FIG. 38

| | |
|---|---|
| LOGICAL VOLUME ID | ~2001 |
| LOGICAL CAPACITY | ~2002 |
| LOGICAL VOLUME TYPE | ~2005 |
| LOGICAL VOLUME RAID GROUP TYPE | ~2003 |
| REAL PAGE POINTER | ~2004 |
| ⋮ | |
| REAL PAGE POINTER | ~2004 |
| FIRST READ TIMES | ~2007 |
| FIRST WRITE TIMES | ~2008 |
| SECOND READ TIMES | ~2009 |
| SECOND WRITE TIMES | ~2010 |
| MIGRATION FLAG | ~2015 |
| MIGRATED LUN | ~2016 |
| MIGRATION POINTER | ~2017 |
| MIGRATION WAITING FLAG | ~2018 |
| MIGRATION FOR CLOSING FLAG | ~2019 |
| MIGRATED LUN FOR CLOSING | ~2021 |
| CACHE MANAGEMENT POINTER | ~2022 |
| ⋮ | |
| CACHE MANAGEMENT POINTER | ~2022 |

LOGICAL VOLUME INFORMATION 2000

STORAGE GROUP INFORMATION 2300

REAL PAGE INFORMATION 2100

EMPTY PAGE INFORMATION MANAGEMENT QUEUE 2210

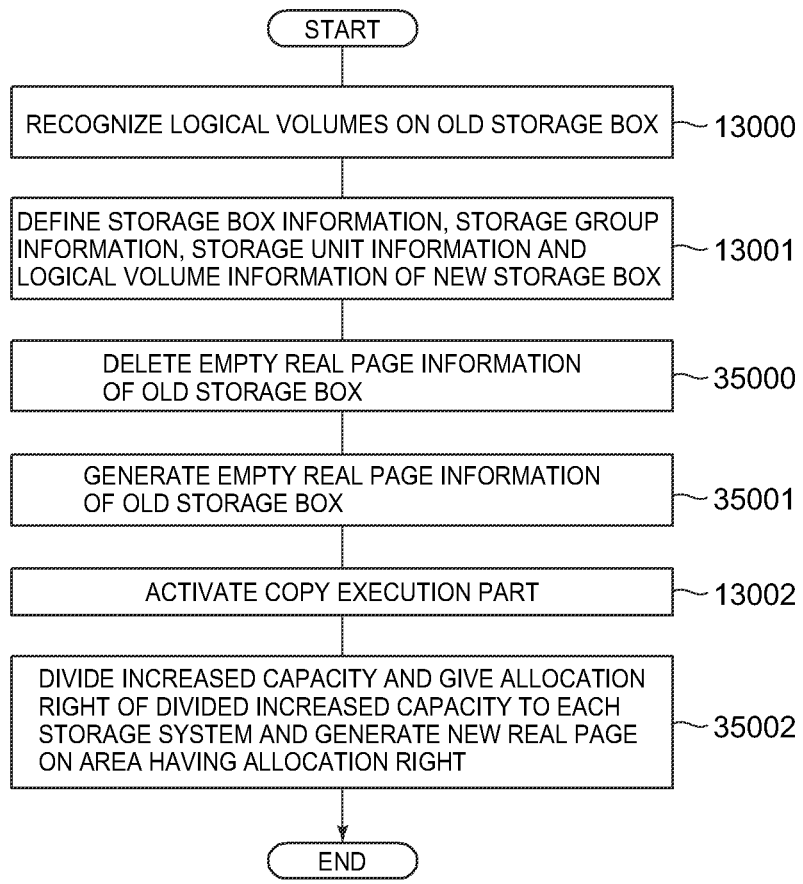

STORAGE UNIT INFORMATION 2500

COMPOUND STORAGE SYSTEM AND STORAGE CONTROL METHOD TO CONFIGURE CHANGE ASSOCIATED WITH AN OWNER RIGHT TO SET THE CONFIGURATION CHANGE

CROSS-REFERENCE TO RELATED PATENT APPLICATIONS

This application is a Continuation of U.S. application Ser. No. 14/989,583 filed Jan. 6, 2016, which is a Continuation of U.S. application Ser. No. 13/978,023 filed Jul. 2, 2013 which is the US National Stage of PCT/JP2013/001840 filed Mar. 18, 2013. All of the aforesaid applications are incorporated herein by reference in their entirety.

TECHNICAL FIELD

The present invention relates to storage control in a compound storage system (for example, a scale-out storage system), which is a system comprising multiple storage systems.

BACKGROUND ART

For example, Patent Literature 1 through Patent Literature 5 below are known.

Patent Literature 1 is an invention in which multiple disk control apparatuses share multiple disk apparatuses via a switch. The disk control apparatus load leveling is attempted in accordance with the disk control apparatus, which processes a read/write request to the disk apparatus, dynamically changing. In Patent Literature 1, a host computer recognizes one physical disk apparatus as one disk apparatus.

Patent Literature 2 is related to technology called virtual storage. In Patent Literature 2, a storage system has a virtual storage identifier and a real storage identifier. In Patent Literature 2, a virtual LUN and a real LUN exist with respect to a LUN (Logical Unit Number), which is a logical volume number specified when a server performs a read/write. The virtual LUN is unique inside a virtual storage, and the real LUN is unique inside a real storage. The virtual storage is configured in accordance with one or more real storages. For example, a single virtual storage is realized on the basis of multiple real storages. Furthermore, even when a real storage identifier changes in accordance with an old real storage being replaced by a new real storage, the handing over of the virtual storage identifier can make it appear to the virtual storage host that operations are continuing.

Patent Literature 3 discloses technology for real storage load leveling in accordance with copying a virtual LUN between real storages, which comprise a virtual storage.

Patent Literature 4 relates to technology called "capacity virtualization". Capacity virtualization is also called thin provisioning. In Patent Literature 4, a virtual storage has a capacity virtualization function. In the capacity virtualization function, a relatively large-capacity storage area called a capacity pool is partitioned into segments called pages. Generally speaking, when a logical volume is defined, a logical volume capacity is specified in addition to the LUN, and a logical volume corresponding to this capacity is reserved in the storage. In a virtual storage that has a capacity virtualization function, a storage area is not reserved as a logical volume when the logical volume is defined, and in a case where a write actually occurs with respect to the logical volume, a page is allocated to a write-destination area in the logical volume. This makes it possible to reduce the storage area actually being used. Since the trigger for allocating the storage area is the occurrence of a write, an administrator may define a relatively large capacity as the logical volume capacity without having to compute the exact capacity of the logical volume, thereby also enabling management costs to be lowered.

In Patent Literature 5, a storage system A is coupled to an external storage system, and this external storage system is virtually made to appear as a storage capacity inside the storage system A. A capacity virtualization function (a function, which treats a storage capacity as a storage pool, partitions the storage capacity into page units, and allocates the page when there is a write request) is applied to the external storage system. The storage system A migrates to a storage system B a logical volume to which a page of the external storage system, which is also coupled to the storage system B, is allocated. In Patent Literature 5, even when a logical volume is migrated, storage system A comprises the storage pool of the external storage system, and storage system A also comprises the page allocation and release rights of the storage pool. A read/write with respect to the migrated logical volume is executed by the storage system B.

CITATION LIST

Patent Literature

[PTL] 1
Japanese Patent Publication No. 3726484
[PTL] 2
Japanese Patent Application Publication No. 2008-040571
[PTL] 3
WO 2012/085975
[PTL] 4
Japanese Patent Publication No. 04369520
[PTL] 5
Japanese Patent Application Publication No. 2006-338341

SUMMARY OF INVENTION

Technical Problem

It is preferable that at least a first problem of the following first through sixth problems be solved.

(First Problem) To realize an architecture for multiple storage systems to share a storage box, which stores a storage unit.

(Second Problem) To realize process continuity in a case where a storage system, which shares a storage box, has been added in an environment in which multiple storage systems share the storage box.

(Third Problem) In a case where a certain storage system has been closed due to a failure or the like, to level the load of the closed storage system on another storage system.

(Fourth Problem) To realize processing when adding a storage box, which is shared by multiple storage systems.

(Fifth Problem) To realize processing when one or more storage boxes are ejected from two or more storage boxes, which are shared by multiple storage systems.

(Sixth Problem) To realize a capacity virtualization function between multiple storage systems.

Solution to Problem

The first problem, for example, can be solved as follows. A storage box, which is shared by multiple storage systems, comprises a switch. Each storage system also comprises a switch for coupling to the storage box. The multiple storage systems share the storage box (more accurately, a group of storage units (one or more storage units) inside the storage box) by using the switch inside the storage box. The number of storage boxes, which is shared by the multiple storage systems, is one or more. Each storage system may or may not comprise a storage unit. Furthermore, each storage system typically comprises a cache memory, and in a case where a write request is received from a server and write-target data, which conforms to the write request, is written to the cache memory, may send a completion report with respect to the write request to the server. The server (host computer) referred to in this specification may be either a physical server or a virtual server.

The second problem, for example, can be solved as follows. An added storage system (a storage system, which has been communicably coupled anew to a storage box shared by multiple existing storage systems) sends each of the existing storage systems, which are already sharing the storage box, adding notification information denoting that a storage system, which will share the storage box, has been added. The adding notification information may include information denoting the performance and/or a function of the added storage system. This makes it possible to expect that multiple storage areas (for example, logical volumes), which are based on one or more storage units inside the storage box, will be optimally allocated to the multiple systems after a system configuration change (addition of a storage system). The performance of the added storage system may include processor performance (the performance of the processor of the storage system), server I/F performance (the performance (for example, the data transfer rate) of the server I/F (the interface device for communicating with the server) of the storage system), storage I/F performance (the performance (for example, the data transfer rate) of the storage I/F (the interface device for communication with a storage unit inside the storage box) of the storage system), and cache capacity (the capacity of the cache memory of the storage system). Each existing storage system receives the adding notification information, and based on the adding notification information (for example, information denoting performance and/or a function), decides from among one or more storage areas being provided to itself a target storage area (for example, a logical volume) for migrating control to the added storage system, and sends to the added storage system area information (for example, information, which comprises a LUN) denoting the decided migration-target storage area. Next, the added storage system decides, in accordance with a path management program, which is executed by the processor inside the server coupled to this added storage system, the added storage system path to which to couple the migration-target storage area, and sends to the path management program path information (for example, information, which comprises a migration-target storage area LUN and identification information of a port (an added storage system port) to which the migration-target storage area is associated), which denotes the connection-destination path of the migration-target storage area. Thereafter, a target existing storage system for managing the migration-target storage area from among the one or more existing storage systems sends to the path management program notification information, which comprises information (for example, information comprising the LUN of the migration-target storage area) denoting that the migration-target storage area is separate from the target existing storage system, and information denoting that the path of the target existing storage system (the path via which the migration-target storage area is coupled) will be closed. The path management program receives the above-mentioned path information and notification information, and based on this information, updates path management information, which comprises information denoting the corresponding relationship between the LUN and the destination. The server, which executes the path management program, can, based on the post-update path management information, issue a read/write request (either a read request or a write request), which specifies the migration-target storage area LUN to the added storage system rather than the target existing storage system. Thereafter, the added storage system can perform processing for copying data, which is being stored in the cache area (for example, an area in the cache memory) of the target existing storage system, to a cache area of the added storage system. During this copy process, the added storage system receives a read/write request, and in a case where the data is to be written to an incomplete area to which data has yet to be copied in the cache area of the added storage system, the added storage system copies the data being stored in an incomplete area inside the target existing storage system to the cache area of the added storage system, and thereafter processes the received read/write request.

The third problem, for example, can be solved as follows.

A storage system, which is to be closed (a storage system, which is to be ejected from the multiple storage systems sharing the storage box), sends closing information, which comprises information denoting the fact that the storage system is to be closed, to each of the other storage systems (existing storage systems). Each existing storage system receives the closing information and sends, to the to-be-closed storage system, notification information which comprises information denoting at least one of the operating status, the performance and the function of its own storage system. The to-be-closed storage system receives the notification information from each existing storage system, and based on the notification information from each existing storage system, decides, for each of one or more storage areas managed by the to-be-closed storage system, the existing storage system to which to move the ownership right (a control right, which will be explained further below), and sends to the move-destination existing storage system area information, which comprises information (for example, the LUN) of the storage area, of which the ownership right has been decided will be moved to this existing storage system. Next, the existing storage system receives the area information, decides the path of its own storage system to which to connect the storage area identified from this area information, and sends to the path management program, which the server processor executes, path information (for example, information, which comprises the storage area LUN and identification information of the port (the existing storage system port) associated with the storage area) denoting the connection-destination path of the identified storage area, and path closing information denoting that the to-be-closed storage system path is closed. The path closing information may be sent to the path management program by the to-be-closed storage system instead of the existing storage system. The path management program receives the above-mentioned notification information and the path closing information, and updates the path management information, which comprises information denoting the corresponding relationship between the LUN and the destination. The server, which executes the path management program, can issue, based on the post-update path management information, a read/write request (either a read request or a write request), which specifies the LUN of the storage area being provided from the to-be-closed storage system, to the existing storage system rather than the to-be-closed storage system. Thereafter, each existing storage system can perform processing for copying data, which is being stored in a cache area (for example, an area in the cache memory) of the to-be-closed storage system, which has the migration-target storage area as the storage destination, to a cache area of its own storage system. In a case where the existing storage system receives a read/write request during this copy process and the data is to be written to an incomplete area in which data has yet to be copied in the cache area of its own storage system, the relevant existing storage system copies the data being stored in an incomplete area inside the to-be-closed storage system to the cache area of the relevant existing storage system, and thereafter processes the received read/write request. In the case of the to-be-closed storage system in particular, since the redundancy and so forth of a compound storage system is likely to decline as a result of a failure or the like, the data inside the cache area should be quickly moved to another storage system. In accordance with this, only data, which must be written to the storage box, may be the copy target in the above-mentioned copy process.

The fourth problem, for example, can be solved as follows.

First of all, each storage system recognizes the fact that a storage box has been added (the storage box has been communicably connected anew to each storage system). A target storage system, which is at least one storage system of multiple storage systems, receives from each of the other storage systems operating status information, which comprises information denoting the operating status of the relevant other storage systems. The target storage system, based on the operating status information from each of the other storage systems, decides which storage area of the one or more storage areas (for example, logical volumes) based on the added storage box will be managed by which storage system. Thereafter, each storage system may, when necessary, migrate data inside a defined storage area (a storage area, which is based on the added storage box, and for which a decision has been made to be managed by its own storage system) to a storage area, which is managed by its own storage system.

The fifth problem, for example, can be solved as follows.

First of all, each storage system recognizes that a storage box has been ejected (that a storage box has been removed from the multiple storage systems). Each storage system migrates data, which is inside the storage area of the storage box to be ejected and is inside a storage area managed by its own storage system, to a storage area (a storage area based on a storage box, which is not to be ejected), which is under the management of its own storage system.

The sixth problem, for example, can be solved as follows.

A storage pool based on one or more storage boxes (for example, a storage area, which is a set of logical volumes based on one or more storage boxes and is partitioned into multiple pages (sub-areas)), is shared by multiple storage systems. An allocation right for multiple page groups, which comprise the storage pool, is allocated to each of the multiple storage systems. That is, a storage system, which is capable of allocating a page in the relevant page group to a virtual volume (a virtual logical volume, which conforms to a capacity virtualization technology (for example, Thin Provisioning)) is established for each page group. Upon receiving a write request, each storage system allocates a page in accordance with the scope of its right. A storage system for which the number of pages of its allocation right has dwindled has another storage system put up an empty page.

Advantageous Effects of Invention

In accordance with the first problem being solved, multiple storage systems are able to share a storage box, which comprises a storage unit. In accordance with either the second or the third problem being solved, even when a system configuration change, by which a storage system is either added or ejected, has been performed, a read/write request (an access request) from a host computer can be distributed by a set of storage systems after the system configuration change. In accordance with either the fourth or the fifth problem being solved, even when a box configuration change by which a storage box is either added or ejected, has been performed, an access to one or more storage boxes can be distributed between storage systems after the box configuration change. Generally speaking, in addition to a storage controller, the storage system comprises a storage unit, which is accessed by the storage controller, and thus, the storage unit and the storage controller are either added or ejected together. However, in accordance with one of the first through the fifth problems being solved, it is possible for the storage system to comprise only the storage controller without comprising the storage unit, thereby enabling each of the storage unit and the storage controller to be either added or ejected independently. In accordance with the sixth problem being solved, a capacity virtualization function can be efficiently realized between multiple storage systems.

BRIEF DESCRIPTION OF DRAWINGS

FIG. 2 is a drawing showing the configuration of server port information related to the first example.

FIG. 9 is a drawing showing the configuration of logical volume information related to the first example.

FIG. 12 is a drawing showing the configuration of storage box information related to the first example.

FIG. 13 is a drawing showing the configuration of storage group information related to the first example.

FIG. 29 is a drawing showing the configuration of storage box information related to a second example.

FIG. 38 is a drawing showing the configuration of logical volume information related to the third example.

FIG. 49 is a drawing showing the processing flow of a storage box migration execution part related to the third example.

DESCRIPTION OF EMBODIMENTS

Figure 1:
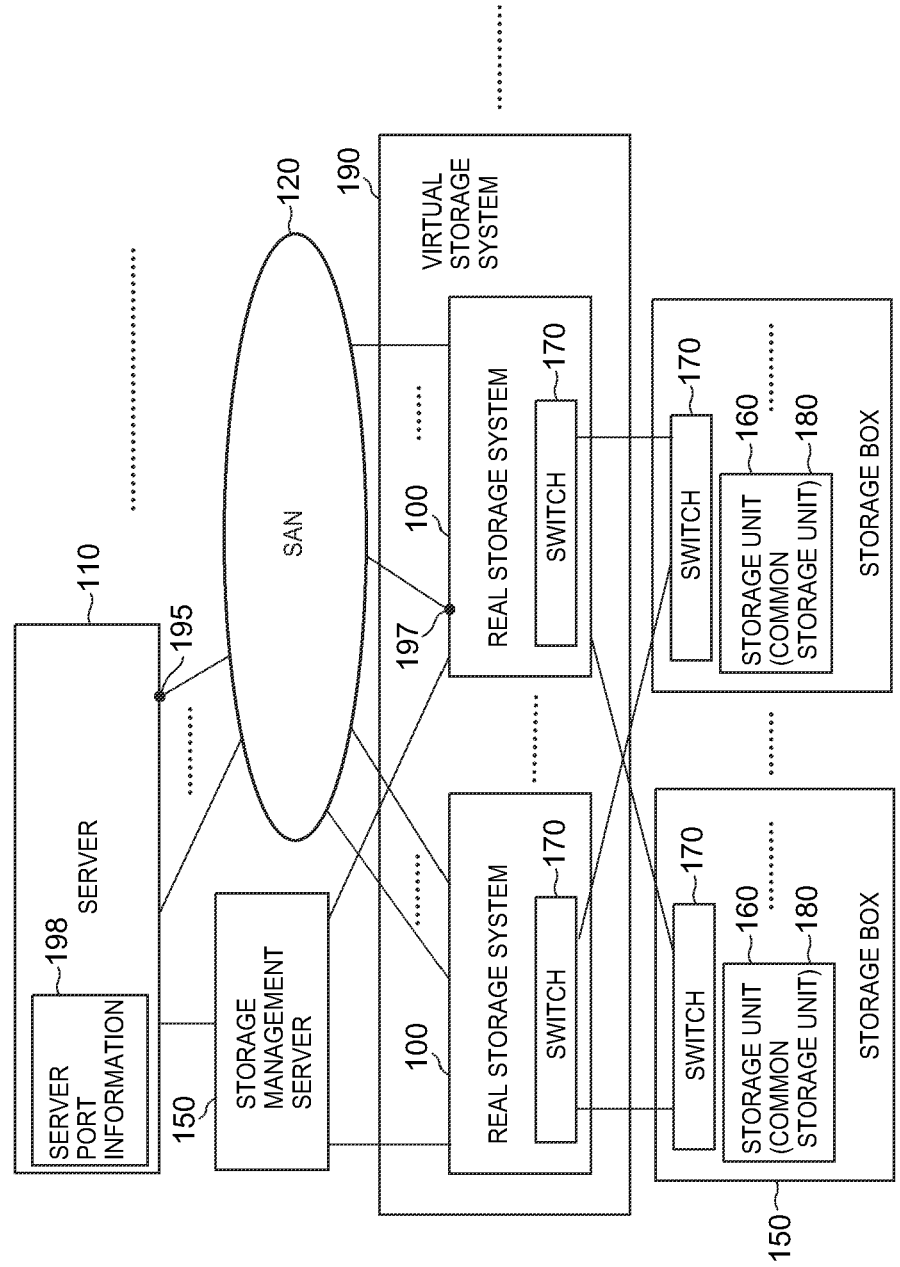
FIG. 1 is a drawing showing the configuration of an information system related to a first example.

A number of examples will be explained by referring to the drawings. The examples explained hereinbelow do not limit the invention related to the claims, and not all of the elements and combinations thereof explained in the examples are essential for a solution of the invention.

Example 1

FIG. 1 is a drawing showing the configuration of an information system related to a first example.

The information system comprises one or more storage boxes 130, one or more real storage systems 100, one or more servers 110, a SAN (Storage Area Network) 120, and a storage management server 150. The SAN 120 connects the real storage system 100 to the server 110. The server 110 has one or more server ports 195. The server 110 is connected to the SAN 120 in accordance with a server port 195. The real storage system 100 has one or more storage ports 197, which are connected to the SAN 120, and a switch 170 for connecting to the storage box 130. The real storage system 100 is connected to the SAN 120 in accordance with the storage port 197. The server 110 internally has server port information 198. The server 110 is a system for running a user application, and reads/writes required data from/to the real storage system 100 via the SAN 120. The real storage system 100 mutually sends/receives data with real storage systems via the SAN 120. A protocol that enables the transfer of a SCSI command is used in the SAN 120. For example, the Fibre Channel or other such protocol can be used.

In this example, a virtual storage system 190, which is configured from one or more real storage systems 100, exists in the information system. The virtual storage system 190 is seen from the server 110 as a storage system. However, the virtual storage system 190 need not exist in this example. In a case where the virtual storage system 190 does not exist, the real storage system 100 is seen as the storage system from the server 110.

The storage box 130 comprises a HDD (Hard Disk Drive), a storage unit 160 (a common storage unit 180) such as a flash storage having a flash memory as a storage medium, and a switch 170. There are a number of types of flash storages, including a SLC (Single Level Cell)-type flash memory, which is high priced, high performance, and is capable of being erased a large number of times, and a MLC (Multi Level Cell)-type flash memory, which is low priced, low performance, and is capable of being erased a small number of times. The storage unit 160 may comprise a new storage medium, such as a phase-change memory.

In this example, the storage unit 160 inside the storage box 130 is shared in common by multiple real storage systems 100. Therefore, in this example, there may be cases where the storage unit 160 inside the storage box 130 is called a common storage unit 180. The storage box 130 is connected to one or more real storage systems 100 in a virtual storage system 190 via the switch 170. The storage box 130 does not necessarily have to be connected to all the real storage systems 100 in the virtual storage system 190. Furthermore, a set of storage boxes 130, each of which is connected to a certain real storage system 100 and another real storage system 100, need not be exactly the same. The storage box 130 is shared in common by a number of real storage systems 100 via the switch 170. The storage management server 150 is an apparatus used by a storage administrator for managing the real storage system 100 and the storage box 130. The storage management server 150 is connected to the real storage system 100 via a network or the like. In the first example, the real storage system 100 does not have a capacity virtualization function.

FIG. 2 is a drawing showing the configuration of server port information related to the first example.

The server port information 198 is information held by each server port 195. The server 110, when issuing a read/write request to the real storage system 100, configures a storage system identifier, a logical volume identifier, and a path (storage port 197) identifier. Thus, the server port information 198 comprises a server port identifier 24000, one or more logical volume identifiers 24001 for access from the server port 195, a storage system identifier 24002 of a storage system, which comprises the logical volume of the logical volume identifier 24001, and a storage port identifier 24003 of the storage port 197 to which the logical volume of the logical volume identifier 24001 is connected. In a case where a single logical volume is connected to multiple storage ports 197, multiple storage port identifiers 24003 are configured corresponding to this logical volume.

In this example, an identifier for the virtual storage system 190 is configured in the storage system identifier 24002. However, in a case where the virtual storage system 190 does not exist, an identifier of the real storage system 100 is configured in the storage system identifier 24002. Also, an identifier for the storage port 197 is configured in the storage port identifier 24003.

A virtual logical volume identifier is configured in the logical volume identifier 24001. The virtual logical volume identifier is a unique value within the virtual storage system 190. Each real storage system 100 also has a logical volume. An identifier of the logical volume is unique within the real storage system 100. A server 110 read/write request comprises a virtual storage system identifier, a virtual logical volume identifier, and a storage port 197 identifier. Because the storage port 197 identifier is a real value, the real storage system 100, which receives the server 110 read/write request, is determined in accordance with this identifier. A virtual storage system 190 need not exist in this example, and as such, an identifier of a logical volume of the real storage system 100 is configured in the logical volume identifier 24001. Furthermore, in this example, the real storage system 100, which reads/writes from/to a virtual logical volume, is changed, and the server 110 changes the identifier of the storage port 197 at this time without changing the identifier of the read/write request virtual logical volume.

Figure 3:
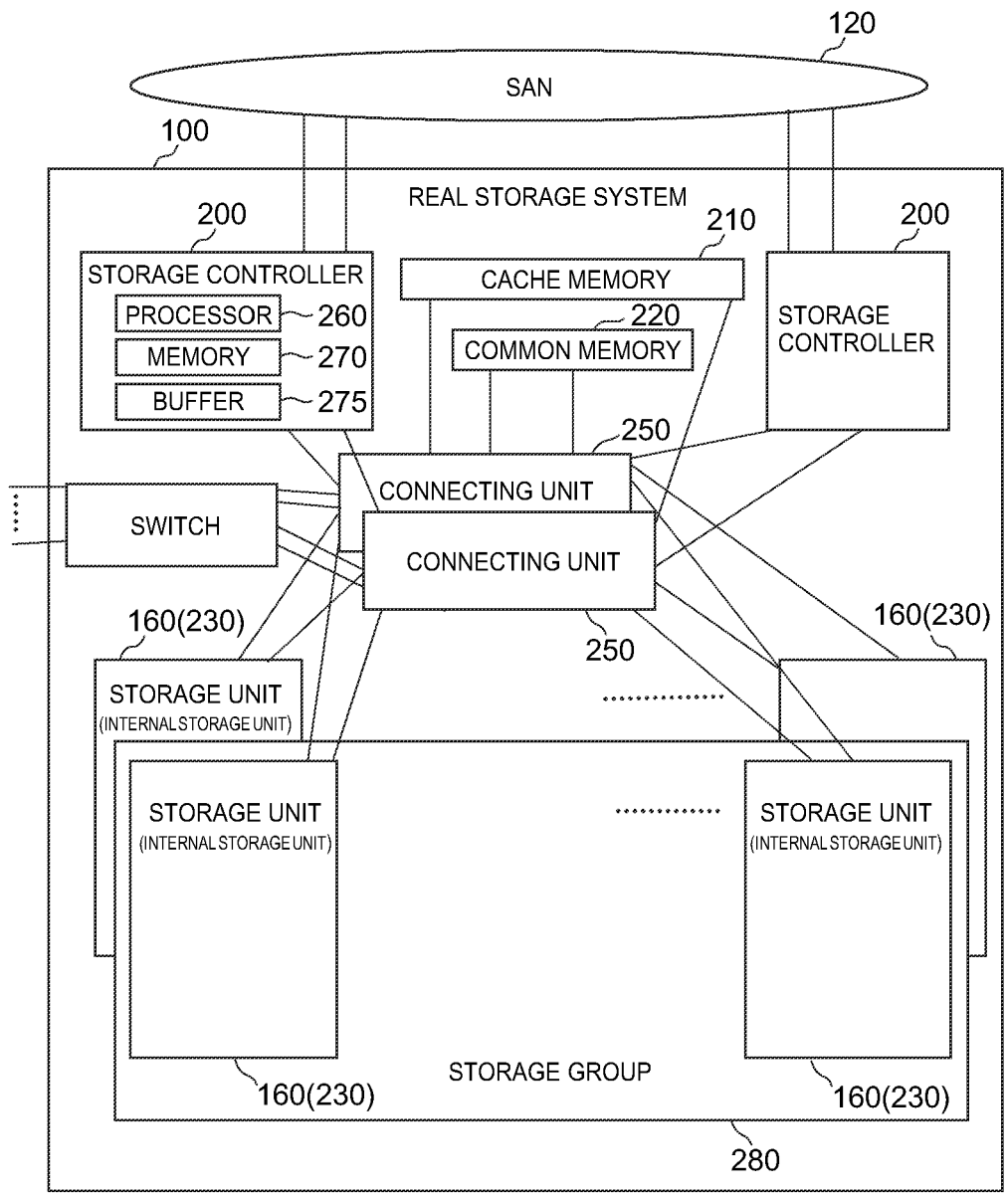
FIG. 3 is a drawing showing the configuration of a real storage system related to the first example.

FIG. 3 is a drawing showing the configuration of a real storage system related to the first example.

The real storage system 100 comprises one or more storage controllers 200, a cache memory 210, a common memory 220, a storage unit 160 (internal storage unit 230), one or more connecting units 250 for connecting the components, and a switch 170, which is the interface for the storage box 130. The storage unit 160 included inside the real storage system 100 is basically the same unit as the storage unit 160 included inside the storage box 130. In this example, the storage unit 160 included in the real storage system 100 may be called an internal storage unit 230. In this example, it is supposed here that the storage unit 160 represents both the internal storage unit 230 and a common storage unit 160. Furthermore, in this example, the real storage system 100 does not necessarily have to have an internal storage unit 230. Since this example is related to a compound storage system configured using one or more storage boxes 130, which are shared in common by multiple real storage systems 100, explanations of the processing executed by the storage controller 200 with respect to the internal storage unit 230, and information held in the common memory 220 will be omitted.

The storage controller 200 comprises a processor 260 which processes for a read/write request issued from the server 110, a memory 270 which stores a program and information, and a buffer 275. The buffer 275 is used as (1) a temporary storage area for storing information required for when generating parity data, which will be described further below, and the generated parity data, and (2) a temporary storage area when writing data, which is stored in a cache area corresponding to the storage unit 160, to a storage unit 160 for permanent storage.

The connecting unit 250 connects the respective components inside the real storage system 100. The characteristic feature of this example is the fact that one or more storage boxes 130 are connected via the connecting unit 250. This makes it possible for the storage controller 200 to execute a read/write with respect to the storage unit 160 inside the storage box 130. In this example, it is supposed that the storage box 130 is connected to one or more storage controllers 200 inside the real storage system 100.

The cache memory 210 and the common memory 220 are generally volatile memories, such as a DRAM, and are converted to nonvolatile memories in accordance with power being supplied by a battery or the like not shown in the drawing. In this example, the cache memory 210 and the common memory 220 are each duplexed for high reliability. The cache memory 210 and the common memory 220 do not need to be made nonvolatile or to be duplexed. Data, which is frequently accessed from the storage controller 200 from among the data stored in the internal storage unit 230 and the common storage unit 180, is stored in the cache memory 210. The storage controller 200 receives a read/write request from the server 110. At this time, the storage controller 200 writes data (write data), which has been received for writing to the storage unit 160, to the cache memory 210, and ends the relevant write request. The write request may also be ended at the stage when the write data has been stored in either the internal storage unit 230 or the common storage unit 180.

Figure 4:
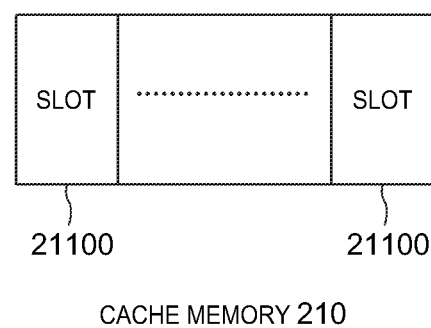
FIG. 4 is a drawing showing the configuration of a cache memory related to the first example.

FIG. 4 is a drawing showing the configuration of a cache memory related to the first example.

The cache memory 210 is partitioned into fixed-length slots 21100. The slot 21100 is the unit of allocation for read/write data.

Figure 62:
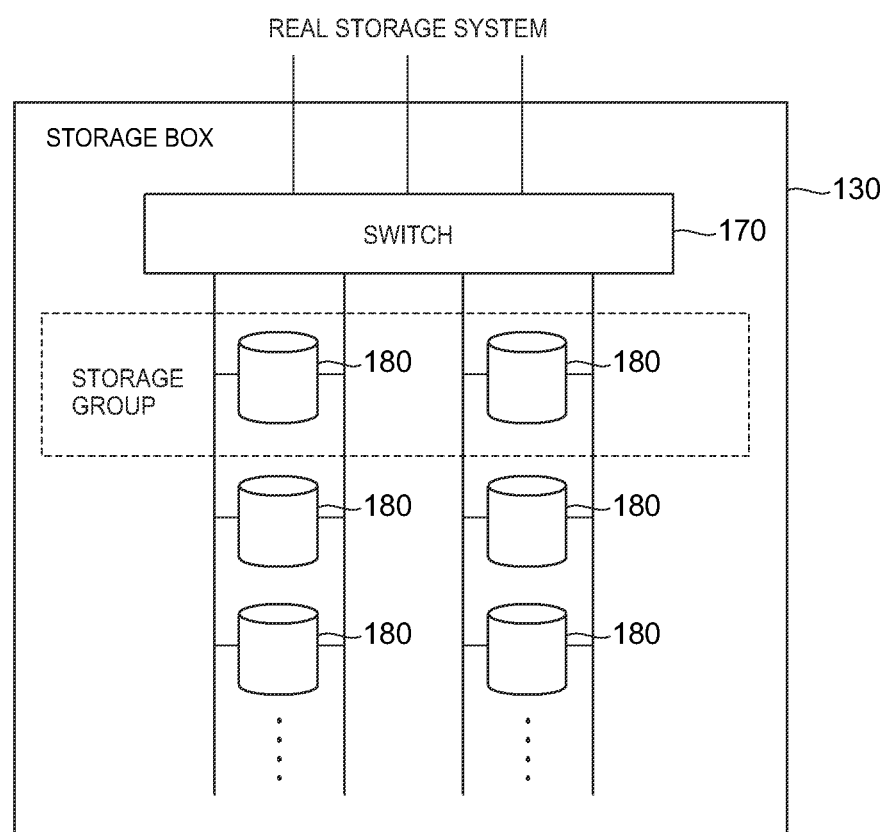
FIG. 62 is a drawing showing the internal configuration of the storage box related to the first example.

In this example, it is supposed that the storage controller 200 has a RAID (Redundant Arrays of Inexpensive (or Independent) Disks) function, which makes it possible to recover the data of a failed storage unit 160 even when one storage units 160 from among the storage units 160 fails. In a case where there is a RAID function, multiple of the same type storage units make up a single RAID configuration. A set of multiple storage units, which make up a single RAID configuration, is called a storage group 280 (refer to FIG. 3). In this example, the RAID configuration either comprises a set of common storage units 180 inside a single storage box 130 (refer to FIG. 62), or a set of internal storage units 230 inside a single real storage system 100. The storage controller 200 may not have the RAID function.

Figure 5:
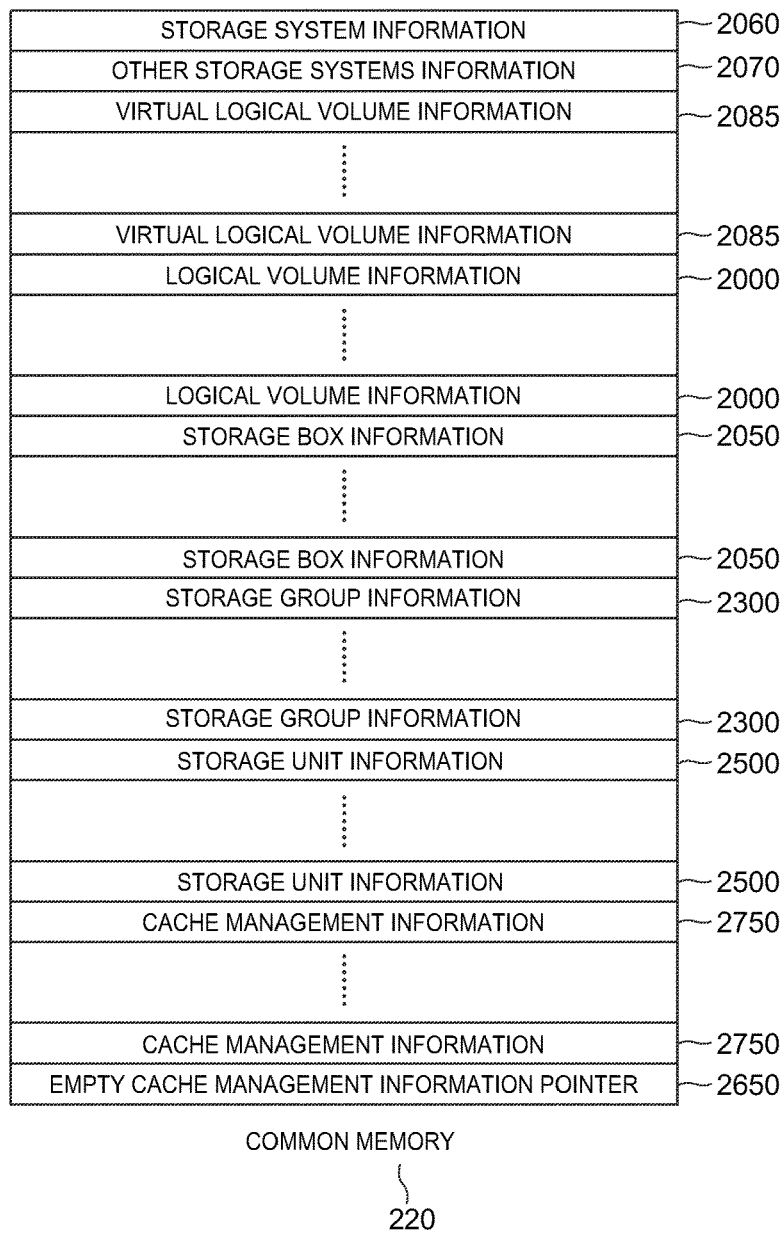
FIG. 5 is a drawing showing information, which is stored in a common memory of a storage system related to the first example.

FIG. 5 is a drawing showing information stored in a common memory of a storage system related to the first example.

The common memory 220 stores storage system information 2060, other storage systems information 2070, virtual logical volume information 2085, logical volume information 2000, storage box information 2050, storage group information 2300, storage unit information 2500, cache management information 2750, and an empty cache management information pointer 2650.

Figure 6:
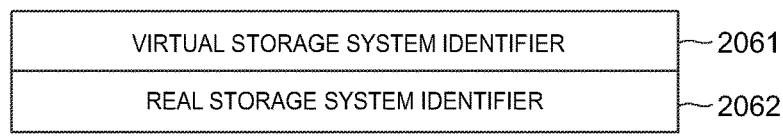
FIG. 6 is a drawing showing the configuration of storage system information related to the first example.

FIG. 6 is a drawing showing the configuration of storage system information related to the first example.

The storage system information 2060 is related to the real storage system 100 to which the common memory 220 storing this storage system information 2060 belongs. The storage system information 2060 comprises a virtual storage system identifier 2061 and a real storage system identifier 2062 in the first example. The virtual storage system identifier 2061 is an identifier of the virtual storage system 190 comprising the real storage system 100 shown by the storage system information 2060. The real storage system identifier 2062 is an identifier of the real storage system 100 shown by the storage system information 2060.

Figure 7:
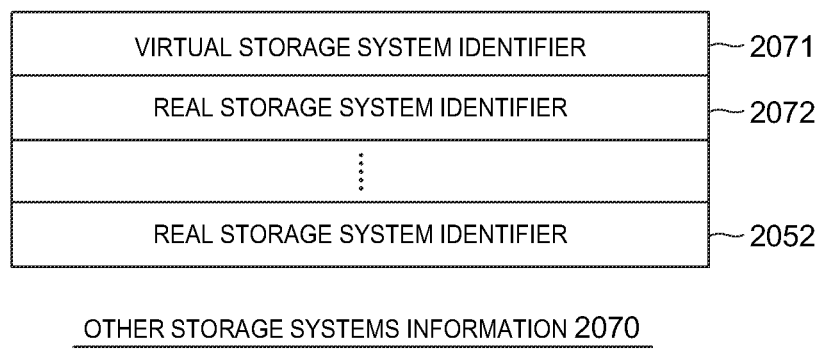
FIG. 7 is a drawing showing the configuration of other storage systems information related to the first example.

FIG. 7 is a drawing showing the configuration of other storage systems information related to the first example.

The other storage systems information 2070 is related to the other real storage systems 100 of the real storage system 100 to which the common memory 220 storing this other storage systems information 2070 belongs. The other storage systems information 2070 comprises a virtual storage system identifier 2071 and a real storage system identifier 2072. The virtual storage system identifier 2071 is the same as the virtual storage system identifier 2061 included in FIG. 6, and is the identifier of the virtual storage system 190 comprising the real storage system 100. The real storage system identifier 2072 is the identifier of the other real storage systems 100 included in the virtual storage system 190, which comprises the real storage system 100.

Figure 8:
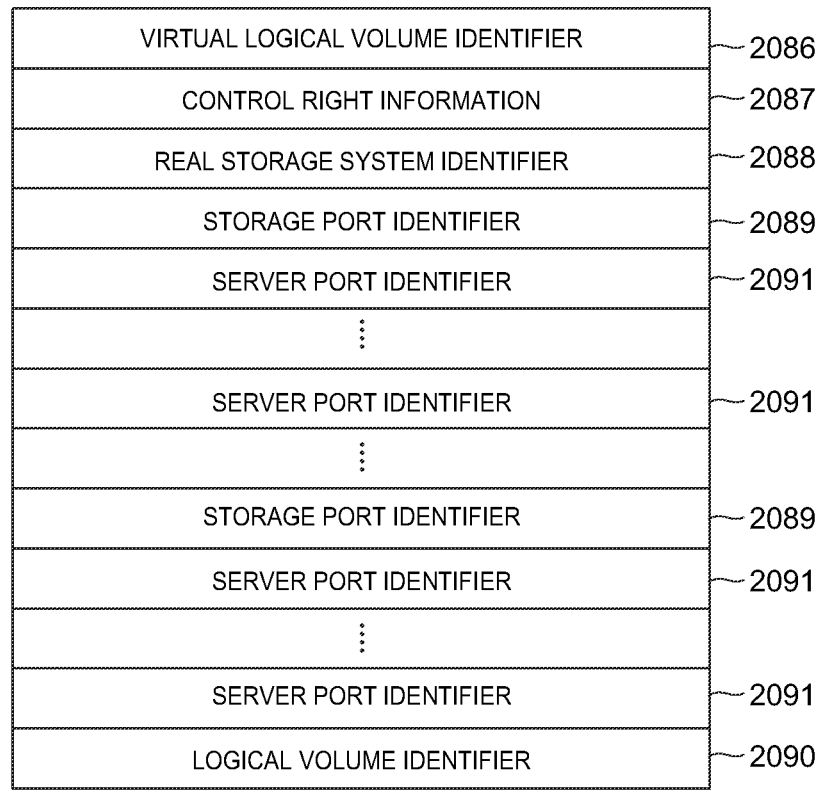
FIG. 8 is a drawing showing the configuration of virtual logical volume information related to the first example.

FIG. 8 is a drawing showing the configuration of virtual logical volume information related to the first example.

The virtual logical volume information 2085 is prepared for each virtual logical volume. The virtual logical volume information 2085 comprises a virtual logical volume identifier 2086, control right information 2087, a real storage system identifier 2088, a storage port identifier 2089, a server port identifier 2091, and a logical volume identifier 2090. The virtual logical volume identifier 2086 is the identifier of the virtual logical volume (referred to as the relevant virtual logical volume in the explanation of FIG. 8) shown by the virtual logical volume information 2085. In this example, any one of the real storage systems 100 has a right (control right) for performing a read/write with respect to the virtual logical volume. The control right information 2087 is for showing whether or not the real storage system 100 (referred to as the relevant real storage system 100 in the explanation of FIG. 8), to which the common memory 220 storing this virtual logical volume information 2085 belongs, has the control right for the relevant virtual logical volume. In a case where the relevant real storage system 100 does not have the control right for the relevant virtual logical volume, the real storage system identifier 2088 shows the identifier of the real storage system 100 having the control right for the relevant virtual logical volume, and the storage port identifier 2089 shows the identifier of one or more storage ports 197 to which the relevant virtual logical volume is connected. The logical volume identifier 2090 is the identifier of the logical volume corresponding to the relevant virtual logical volume inside the relevant real storage system 100, and in a case where a logical volume, which corresponds to the relevant virtual logical volume, does not exist in the relevant real storage system 100, is the identifier of the logical volume, which corresponds to the relevant virtual logical volume inside the real storage system 100 having the control right.

FIG. 9 is a drawing showing the configuration of logical volume information in the first example.

In this example, the storage unit with which the server 110 reads/writes data is a virtual logical volume. The server 110 specifies a virtual logical volume ID, an address inside the virtual logical volume, and a length of data to be read/written, and issues a read request or a write request. The real storage system 100, upon receiving the read request or the write request from the server 110, recognizes the identifier of the logical volume, which corresponds to the request, in accordance with the virtual logical volume information 2085. In this example, the logical volume identifier is unique information inside the real storage system 100. The logical volume information 2000 exists for each logical volume, and is related to the logical volume.

The logical volume information 2000 comprises a logical volume identifier 2001, a logical capacity 2002, a logical volume type 2005, a logical volume RAID group type 2003, an allocation extent 2006, a segment bit map 2014, a first read times 2007, a first write times 2008, a second read times 2009, a second write times 2010, a migration flag 2015, a migrated LUN 2016, a migration pointer 2017, a migration waiting flag 2018, a migration for closing flag 2019, a migrated LUN for closing 2021, and a cache management pointer 2022.

The logical volume identifier 2001 shows an ID of a logical volume, which corresponds to the logical volume information 2000 (hereinafter referred to as the relevant logical volume in the explanation of FIG. 9). The logical capacity 2002 is the capacity of the relevant logical volume. The logical volume type 2005 denotes the type of the relevant logical volume. In this example, the logical volume type 2005 shows whether the relevant logical volume is stored in the internal storage unit 230, or stored in the common storage unit 180. The logical volume RAID group type 2003 shows the RAID type (for example, RAID 0, RAID 1, and so forth) of the relevant logical volume. In a case where parity data of one unit-worth of capacity is stored with respect to the capacity of N units as in RAID 5, it is supposed that the logical volume RAID group type 2003 comprises the specific numeral N. However, an arbitrary RAID type cannot be specified in the logical volume RAID group type 2003; it must be a RAID type of at least one of the storage groups 280. The allocation extent 2006 shows the identifier of the storage group 280 allocated to the relevant logical volume, and the number of the segment having the smallest number. The segment bit map 2014 associates the segment having the smallest number with the initial bit 1, associates the segments of the subsequent numbers with the following bits, and shows whether the corresponding segment is allocated to the relevant logical volume or not for each bit.

The first read times 2007, the first write times 2008, the second read times 2009, and the second write times 2010 are information related to the number of times a read process/write process has been executed with respect to the relevant logical volume. In this example, the processor 260, upon receiving a read/write request for the relevant logical volume, increments either the first read times 2007 or the first write times 2008. In addition, at fixed intervals, the processor 260 copies the first read times 2007 to the second read times 2009, copies the first write times 2008 to the second write times 2010, and configures the first read times 2007 and the first write times 2008 to "0". In accordance with this, the read/write times for a certain period of time are stored in the second read times 2009 and the second write times 2010, making it possible to ascertain the performance characteristics of the relevant logical volume. Besides the read times and the write times, the data amount of either a read process or a write process may be measured. The storage controller 200 uses this information to reallocate a logical volume between the real storage systems 100.

The migration flag 2015 shows that the relevant logical volume is in the process of migration. The migrated LUN 2016 denotes identifiers of the real storage system 100 of the logical volume, which is a migration source, the storage port 197, and the logical volume, in a case where the relevant logical volume is in the process of being migrated. The migration pointer 2017 shows the block to which the migration process (the copy process) has progressed. The migration waiting flag 2018 shows a state in which the relevant logical volume is waiting for a migration. The migration for closing flag 2019 denotes a state in which a failure has occurred in another real storage system 100, and inherited data of the cache memory 210 and the common memory 220 of the real storage system 100 in which the failure occurred is being copied. Here, in a case where an attempt is being made to close the real storage system 100, the write data remaining in the cache memory 210 must be written to the common storage unit 180. Two methods are conceivable for writing the write data to the common storage unit 180. The one is a method in which the real storage system 100, which is being closed, writes the write data to the common storage unit 180. The other method is a method in which the write data is migrated to the cache memory 210 of another real storage system 100, and the other real storage system 100 writes the data to the common storage unit 180. In this example, either method may be used. In a case where the cache memory 210 has been duplexed and the one cache memory 210 is being closed, the migration of the write data to the cache memory 210 of the other real storage system 100 is faster, and makes it possible to achieve a state in which the data is duplexed, thereby being superior from the standpoint of reliability. In the first through the fourth examples below, the method in which the write data is migrated to the cache memory 210 of another real storage system 100, and the other real storage system 100 writes the data to common storage unit 180 will be described in detail. However, when a logical volume is migrated in any of the examples of the first through the fourth examples, the migration-source real storage system 100 may write the write data to the common storage unit 180.

A migration target LUN 2020 is information, which is configured in the logical volume that is to be the migration source, and the identifiers of a migration-destination real storage system 100, the storage port 197, and the logical volume are configured therein. The migrated LUN for closing 2021 is information, which is configured in the logical volume information 2000 of the logical volume that is the migration destination, and comprises the identifiers of the migration-source real storage system 100, the storage port 197, and the logical volume. The cache management pointer 2022 denotes whether or not a slot 21100 is allocated (stored in the cache memory 210) to each area obtained by partitioning the relevant logical volume into a capacity equivalent to the slot 21100. In a case where a slot 21100 is allocated, the cache management pointer 2022 points to the corresponding cache management information 2750. In a case where a slot 21100 is not allocated, the cache management pointer 2022 is a NULL state.

Figure 10:
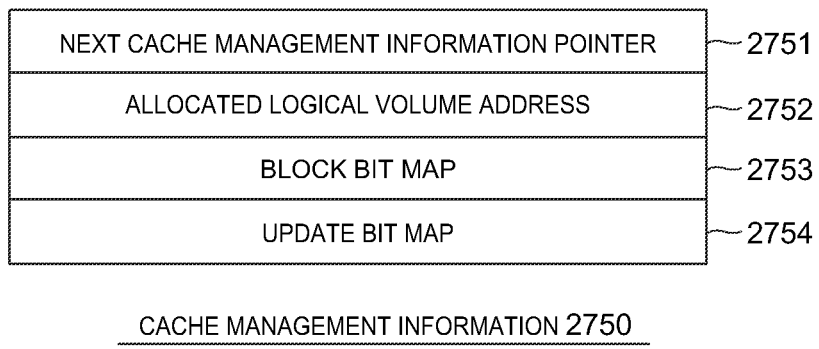
FIG. 10 is a drawing showing the configuration of cache management information related to the first example.

FIG. 10 is a drawing showing the configuration of cache management information related to the first example.

The cache management information 2750 is provided corresponding to a slot 21100. The cache management information 2750 comprises a next cache management information pointer 2751, an allocated logical volume address 2752, a block bit map 2753, and an update bit map 2754.

The next cache management information pointer 2751 is valid information in the cache management information 2750 corresponding to a slot 21100 (an empty slot 21100), which is in a state that is not storing data, and is a pointer showing the cache management information 2750 corresponding to the next empty slot 21100. The allocated logical volume address 2752 shows the address of the logical volume from which the area of the data stored in the slot 21100 corresponding to the cache management information 2750 starts. The block bit map 2753 is for showing a block (smallest unit of a read/write), which is stored in the cache memory 210, within the allocated area. The bit of the block bit map 2753 is configured to ON in a case where the block corresponding to the bit is stored in the cache memory 210. The update bit map 2754 is for showing a block, which was received from the server 110 related to a write request from the server 110, stored in the cache memory 210, and has yet to be written to the storage unit 160. The bit of the update bit map 2754 is configured to ON in a case where the block corresponding to the bit has not been written to the storage unit 160.

Figure 11:
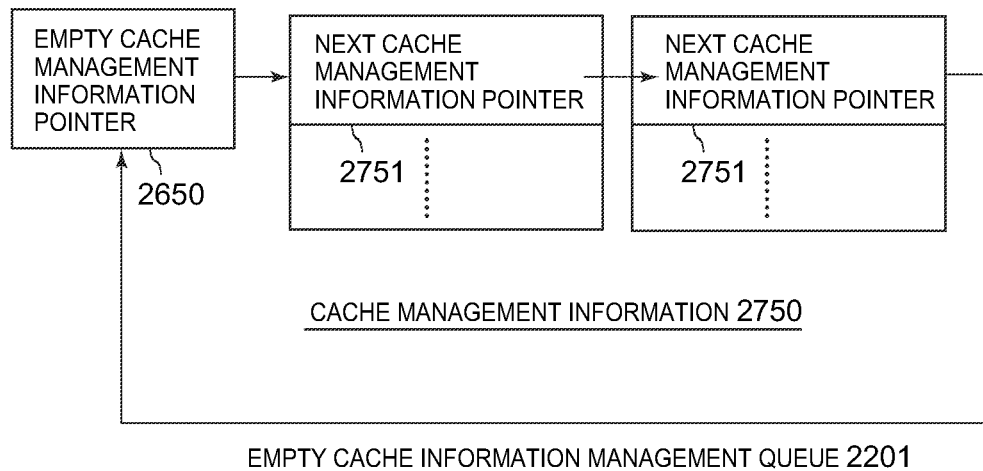
FIG. 11 is a drawing showing the configuration of an empty cache information management queue related to the first example.

FIG. 11 is a drawing showing the configuration of an empty cache information management queue related to the first example.

The empty cache information management queue 2201 is for managing a slot (an empty slot) in which data is not stored. In the empty cache information management queue 2201, the empty cache management information pointer 2650 points to a first cache management information 2750, which corresponds to an empty slot, and the next cache management information pointer 2751 of this cache management information 2750 points to cache management information 2750, which corresponds to the next empty slot in the sequence.

FIG. 12 is a drawing showing the configuration of storage box information related to the first example.

The storage box information 2050 is provided for each storage box 130. The storage box information 2050 comprises a storage box identifier 7000, connection information 7001, a number of storage units 7002, the number of connected storage units 7003, a number of paths 7004, a path identifier 7006, and a number of accessible paths 7005.

The storage box identifier 7000 is the identifier of a storage box 130 (referred to as the relevant storage box 130 in the explanation of FIG. 12), which corresponds to the storage box information 2050. The connection information 7001 shows whether the relevant storage box 130 is connected to the real storage system 100 or not. The number of storage units 7002 is the number of accessible storage units 160 in the relevant storage box 130. The number of connected storage units 7003 is the number of storage units 160 actually connected to the relevant storage box 130. The number of paths 7004 is the number of paths of the relevant storage box 130. The path identifier 7006 is the identifier for each of the paths. The number of accessible paths 7005 is the number of paths, which are actually accessible.

FIG. 13 is a drawing showing the configuration of storage group information related to the first example.

The storage group information 2300 comprises a storage group ID 2301, a storage group type 2306, a package group RAID type 2302, the number of segments 2303, the number of allocatable segments 2309, the number of empty segments 2304, an allocatable segment bit map 2308, an empty segment bit map 2307, a storage unit pointer 2305, a first R times 2310, a second R times 2311, a first W times 2312, and a second W times 2313.

The storage group ID 2301 is the identifier of the storage group 280 (referred to as the relevant storage group 280 in the explanation of FIG. 13) shown by this storage group information 2300. The storage group type 2306 is information showing whether the relevant storage group 280 comprises a common storage unit 180, or comprises an internal storage unit 230. In a case where the relevant storage group 280 comprises a common storage unit 180, this information also includes the identifier of the storage box 130, which comprises this common storage unit 160. The package group RAID type 2302 is the RAID type of the relevant storage group 280. The RAID type in this example is the same as was explained for the logical volume RAID group type 2003 of FIG. 9.

In the first example, since the storage controller 200 does not have a capacity virtualization function, a physical area equivalent to the capacity is reserved when a logical volume is defined. In this example, the capacity of the storage group 2800 is partitioned into units called segments. Therefore, when the capacity of the logical volume is defined, the smallest number of segments equal to or larger than this capacity is reserved in the logical volume. The number of segments 2303 shows the number of segments in the relevant storage group 280. The number of allocatable segments 2309 shows the number of segments, which the real storage system (referred to as the relevant real storage system in the explanation of FIG. 13) 100 which is storing the storage group information 2300, can allocate from among the segments in the relevant storage group 280, that is, the number of segments for which the real storage system 100 has the allocation right. For example, in the case of a storage group 280, which comprises only an internal storage unit 230 of the relevant real storage system 100, the relevant real storage system 100 has the allocation right for all the segments. Alternatively, in the case of a storage group 280, which comprises the common storage unit 180 inside the storage box 130, the common storage unit 180 is shared by multiple real storage systems 100, and as such, a set of segments having the allocation right is decided for each real storage system 100. The allocatable segment bit map 2308 denotes whether the relevant real storage system 100 has the allocation right (is allocatable) or not for each segment. The number of empty segments 2304 shows the number of segments in the empty state from among the segments for which the relevant storage group 280 has the allocation right. The empty segment bit map 2307 denotes whether each segment is empty or allocated for a segment for which the relevant storage group 280 has the allocation right. The number of storage unit pointers 2305 is the number of storage units 160, which belong to the relevant storage group 280. This number is a value decided by the storage group RAID type 2302. The storage unit pointer 2305 shows the identifier of the storage unit 160 belonging to the relevant storage group 280, and in a case where this storage unit 160 is the common storage unit 180, shows the connection path of the common storage unit 180. The first R times 2310, the second R times 2311, the first W times 2312, and the second W times 2313 are information related to the number of times that a read process/write process is executed in the relevant storage group 280. In this example, the processor 260, upon receiving a read/write request for a storage volume of the relevant storage group 280, increments either the first R times 2310 or the first W times 2312. In addition, at fixed intervals, the processor 260 copies the first R times 2310 to the second R times 2311, copies the first W times 2312 to the second W times 2313, and sets the first R times 2310 and the first W times 2312 to "0". In accordance with this, the read/write times for a certain period of time are stored in the second R times 2311 and the second W times 2313, making it possible to ascertain the performance characteristics of the relevant storage group 280. Besides the number of times, the data amount may be measured. In this example, the storage controller 200 uses the second R times 2311 and the second W times 2313 to reallocate a logical volume between the real storage systems 100.

Figure 59:
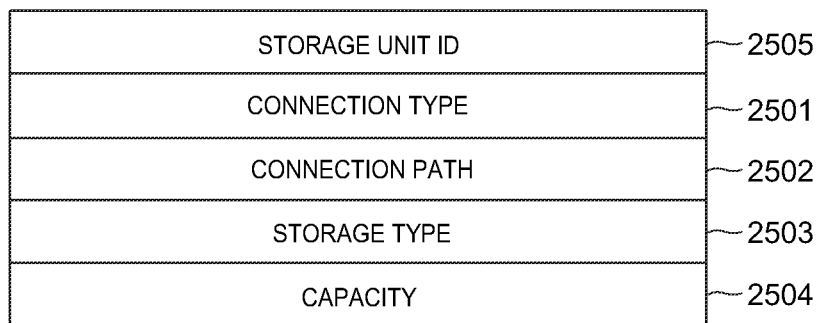
FIG. 59 is a drawing showing the configuration of storage unit information related to the first example.

FIG. 59 is a drawing showing the configuration of storage unit information related to the first example.

The storage unit information 2500 comprises a storage unit identifier 2505, a connection type 2501, a connection path 2502, a storage type 2503, and a capacity 2504.

The storage unit identifier 2505 is the identifier of the storage unit 160 (referred to as the relevant storage unit in the explanation of FIG. 59), which corresponds to the storage unit information 2500. The connection type 2501 shows whether the relevant storage unit 160 is a common storage unit 180 or an internal storage unit 230. The connection path 2502 shows the identifier of a connected path in the case of the common storage unit 180. The storage type 2503 shows what kind of storage medium the relevant storage unit 160 is, i.e., a HDD or a flash memory. The capacity 2504 is the capacity of the relevant storage unit 160. In this example, it is supposed that the storage type 2503 and the capacity 2504 of each storage unit 160 comprising the storage group 280 are the same.

Next, operations executed by the storage controller 200 will be explained using the management information explained hereinabove. The operations of the storage controller 200 are realized in accordance with the processor 260 inside the storage controller 200 executing a program stored in the memory 270.

Figure 14:
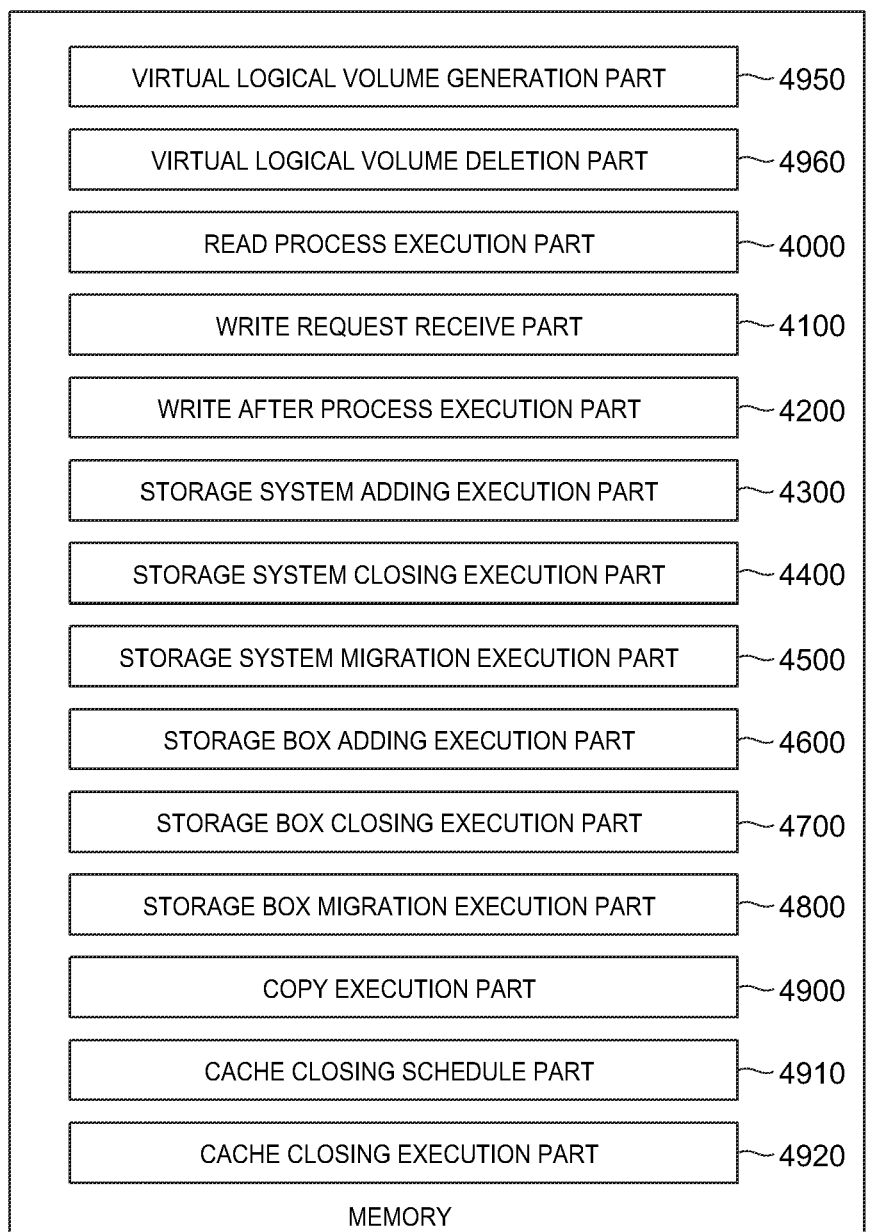
FIG. 14 is a drawing showing the configuration of storage controller-executed programs related to the first example.

FIG. 14 is a drawing showing the configuration of a program executed by the storage controller related to the first example.

As the programs related to this example, the memory 270 comprises a read process execution part 4000, a write request receive part 4100, a write after process execution part 4200, a storage system adding execution part 4300, a storage system closing execution part 4400, a storage system migration execution part 4500, a storage box adding execution part 4600, a storage box closing execution part 4700, a storage box migration execution part 4800, a copy execution part 4900, a cache closing schedule part 4910, a cache closing execution part 4920, a virtual logical volume generation part 4950, and a virtual logical volume deletion part 4960.

Figure 15A:
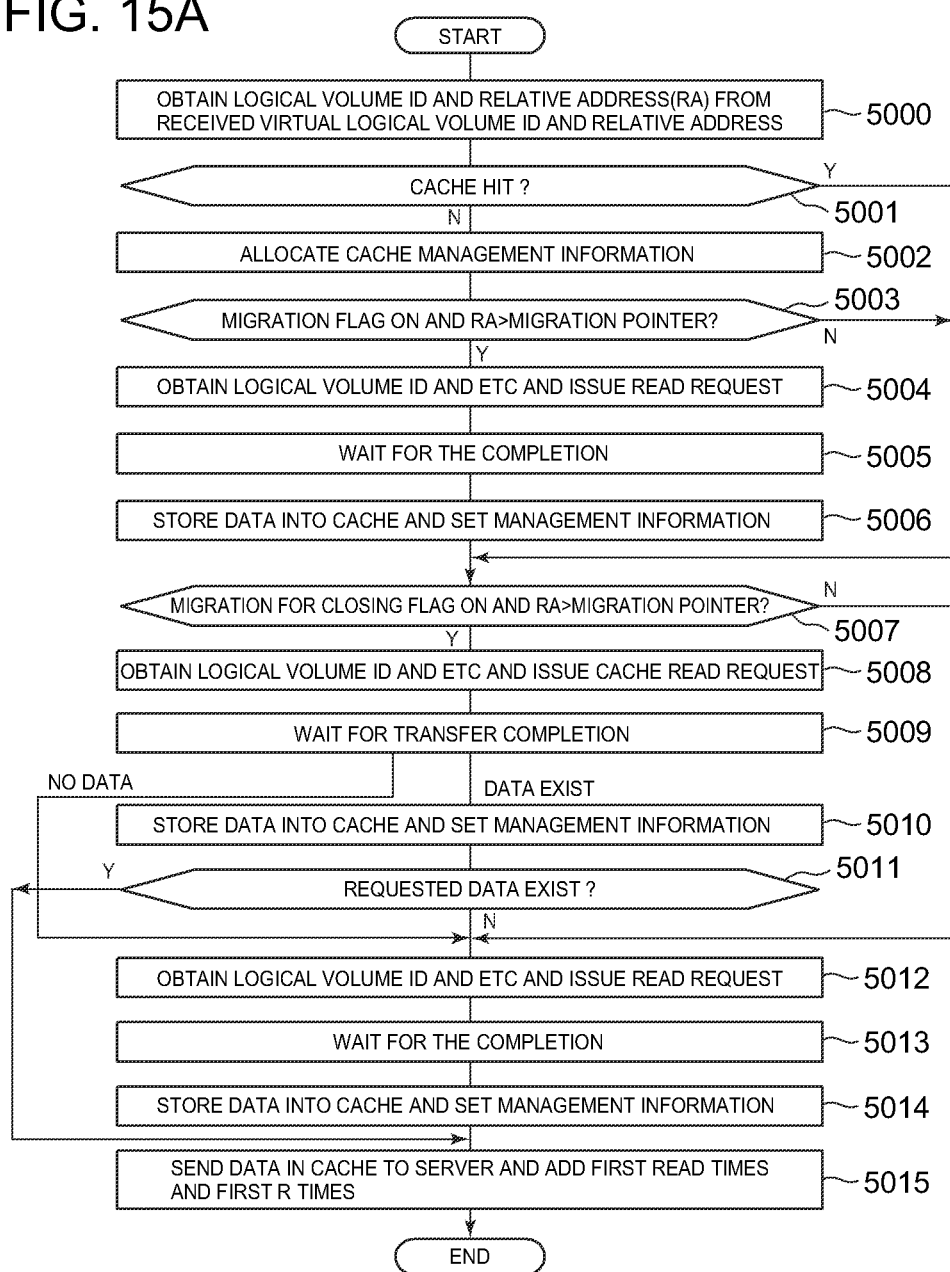
FIG. 15A is a drawing showing the processing flow of a read process execution part related to the first example.

FIG. 15A is a drawing showing the processing flow of a read process execution part related to the first example.

The read process execution part 4000 is executed by the processor 260 of the storage controller 200 when a read request has been received from the server 110.

Step 5000: The processor 260, based on the virtual logical volume information 2085, converts the identifier of the virtual logical volume, which is specified in the received read request, to the identifier of a logical volume (referred to as the relevant logical volume in the explanation of FIG. 15A), and obtains the logical volume information 2000 corresponding to the relevant logical volume.

Step 5001: The processor 260, based on the received read request address, the cache management pointer 2022, and the block bit map 2753 of the cache management information 2750, and so forth, checks whether or not there is a hit in the cache memory 210 for the data specified in the relevant read request. When the result is a miss (Step 5001: N), the processor 260 has the processing jump to Step 5002, and alternatively, when there is a hit (Step 5001: Y), has the processing jump to Step 5007.

Step 5002: The processor 260 allocates a slot 21100 of the cache memory 210 to the relevant logical volume by setting the first cache management information 2750 shown by the empty cache management information pointer 2650 to the cache management pointer 2022, which corresponds to the relevant logical volume information 2000. In addition, the processor 260 configures the relevant logical volume identifier and address in the allocated logical volume address 2752 of the cache management information 2750.

Step 5003: The processor 260 checks whether or not the migration flag 2015 in the logical volume information 2000 of the relevant logical volume is ON. When the result is that the migration flag 2015 is OFF (Step 5003: N), the processor 260 has the processing jump to Step 5007. Alternatively, when the migration flag 2015 is ON, the processor 260 also compares the address (RA) specified in the read request to the migration pointer 2017, and when the address is small (Step 5003: N), has the processing jump to Step 5007.

Step 5004: The processor 260 specifies the identifiers of the storage port and the logical volume stored in the migration LUN 2016, and the address specified in the read request, and requests the real storage system 100, which corresponds to the identifier stored in the migrated LUN 2016 of the logical volume information 2000 to read data. There may also be a case where the real storage system 100 is the relevant real storage system 100. In this case, the processor 260 recognizes the corresponding logical volume information 2000 based on the logical volume identifier stored in the migrated LUN 2016. In addition, the processor 260, based on the logical volume type 2005 of this logical volume information 2000, recognizes whether the relevant logical volume is stored in the common storage unit 180, or is stored in the internal storage unit 230. In addition, the processor 260 recognizes the storage group 280 to which the relevant storage unit 160 belongs, and based on the RAID type of the logical volume RAID group type 2003, recognizes the storage unit 160 and the address thereof, which comprise the requested data, and issues a corresponding data read request to the relevant storage unit 160.

Step 5005: The processor 260 waits for the read request to be completed.

Step 5006: The processor 260 stores the data received in response to the read request in the cache memory 210. In addition, the processor 260 sets the bit, which corresponds to the received data block in the block bit map 2753 of the cache management information 2750, to ON.

Step 5007: The processor 260 checks the migration for closing flag 2019 of the logical volume information 2000.

When the result is that the migration for closing flag 2019 is OFF (Step 5007: N), the processor 260 has the processing jump to Step 5012. In addition, in a case where the address (RA) specified in the relevant read request is smaller than the value of the migration pointer 2017 (Step 5007: N), the processor 260 has the processing jump to Step 5012.

Step 5008: The processor 260 specifies the identifiers of the storage port and the logical volume stored in the migrated LUN for closing 2021, and the address specified in the read request, and requests the real storage system 100, which corresponds to the identifier stored in the migrated LUN for closing 2021g, to read the write data of the corresponding slot.

Step 5009: The processor 260 waits for the issued request to be completed.

Step 5010: The processor 260 has the processing jump to Step 5012 in a case where information to the effect that there is no write data in the slot, which was requested to read the information. Alternatively, in a case where the data has been received from the slot, the processor 260 sets the bits, which correspond to the blocks received from the block bit map 2753 and the update bit map 2754. In addition, the processor 260 stores the received data in the cache memory 210.

Step 5011: The processor 260 references the block bit map 2753, and checks whether the requested data is stored in the cache memory 210. When the result is that the requested data exists (Step 5011: Y), the processor 260 has the processing jump to Step 5015.

Step 5012: The processor 260, based on the logical volume identifier, recognizes the corresponding logical volume information 2000. In addition, the processor 260 recognizes whether the relevant logical volume is stored in the common storage unit 180 or stored in the internal storage unit 230 based on the logical volume type 2005. In addition, the processor 260 recognizes the storage group 280 to which the relevant storage unit 160 belongs, and based on the RAID type of the logical volume RAID group type 2003, recognizes the storage unit 160 and address thereof, which comprise the requested data, and issues a read request for the corresponding data to the relevant storage unit 160.

Step 5013: The processor 260 waits for the issued read request to be completed.

Step 5014: The processor 260 stores the data received in response to the read request in the cache memory 210. In addition, the processor 260 sets the bit, which corresponds to the received block of the corresponding block bit map 2753.

Step 5015: The processor 260 transfers the received data to the server 110. The processor 260 also increments by 1 the first read times 2007 in the logical volume information 2000 of the logical volume, which corresponds to the transferred data, and the first R times 2310 in the storage group information 2300 corresponding to the storage group 280 to which the storage unit 160, which stored the transferred data, belongs, and ends the processing.

Figure 15B:
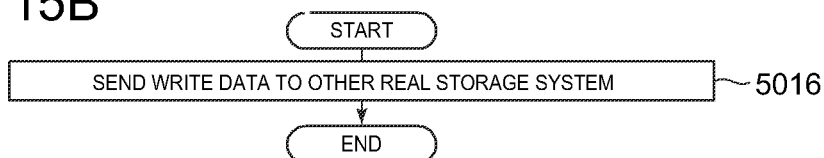
FIG. 15B is a drawing showing the processing flow of a real storage system, which has been requested to transfer write data of a cache memory related to the first example.

FIG. 15B is a drawing showing the processing flow of a real storage system, which has been requested to transfer write data of a cache memory related to the first example.

Step 5016: The processor 260 of the requested real storage system 100, in a case where there is write data in the area corresponding to the relative address of the requested logical volume, sends this data to the request source, and, alternatively, in a case where there is no write data, sends information to this effect to the request source. After sending this data, the processor 260 sets the cache management information 2750 corresponding to the write data to the empty state.

Figure 16A:
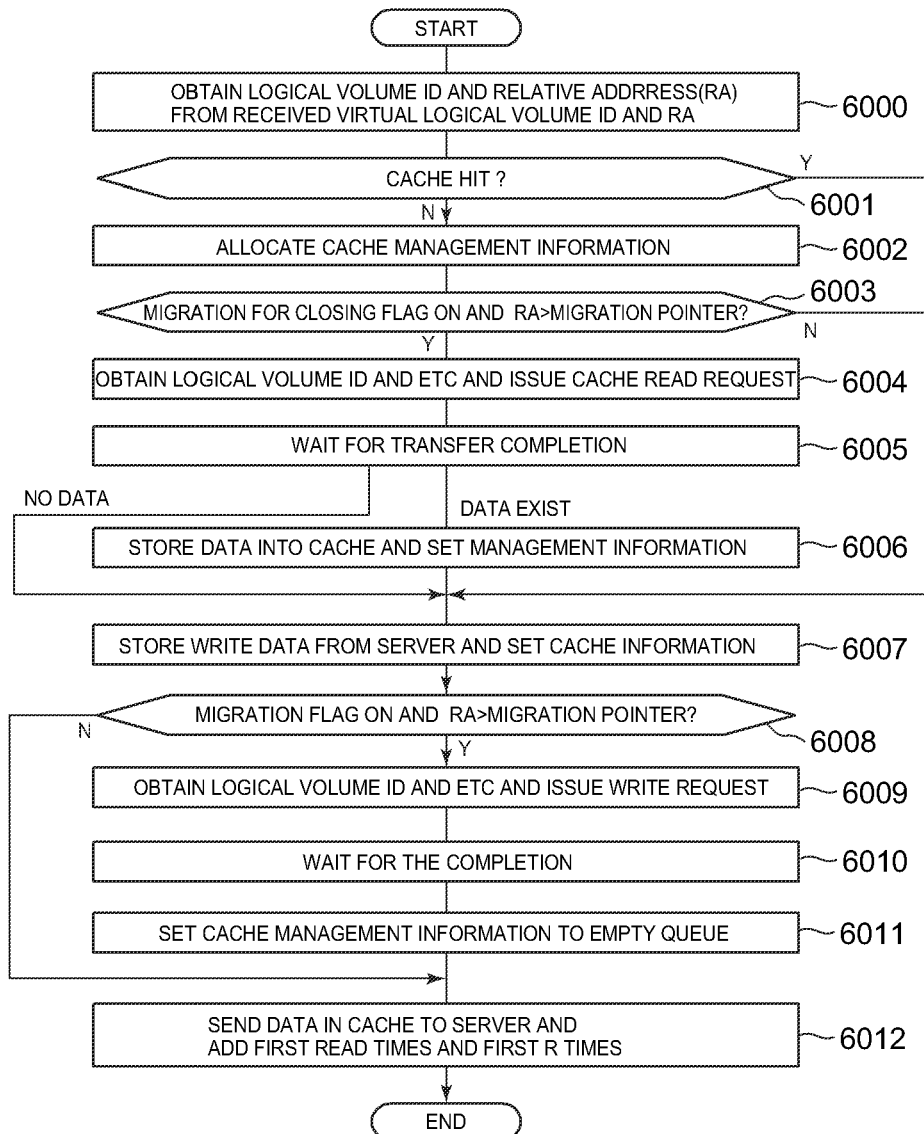
FIG. 16A is a drawing showing the processing flow of a write request receive part related to the first example.

FIG. 16A is a drawing showing the processing flow of a write request receive part related to the first example.

The write request receive part 4100 is executed by the processor 260 when the storage controller 200 has received a write request from the server 110.

Step 6000: The processor 260, based on the virtual logical volume information 2085, converts the identifier of the virtual logical volume specified in the received write request, to the identifier of the logical volume (referred to as the relevant logical volume in the explanation of FIG. 16A), and obtains the logical volume information 2000, which corresponds to the relevant logical volume.

Step 6001: The processor 260, based on the received write request address, the cache management pointer 2022, and the block bit map 2753 of the cache management information 2750, checks whether or not there is a hit in the cache memory 210 for the data specified in the relevant write request. When the result is amiss (Step 6001: N), the processor 260 has the processing jump to Step 6002, and alternatively, when there is a hit (Step 6001: Y), has the processing jump to Step 6007.

Step 6002: The processor 260 allocates a slot 21100 of the cache memory 210 to the relevant logical volume by setting the first cache management information 2750 shown by the empty cache management information pointer 2650 to the cache management pointer 2022, which corresponds to the relevant logical volume information 2000. In addition, the processor 260 configures the relevant logical volume identifier and address in the allocated logical volume address 2752 of the cache management information 2750.

Step 6003: The processor 260 checks the migration for closing flag 2019. When the result is that the migration for closing flag 2019 is OFF (Step 6003: N), the processor 260 has the processing jump to Step 6007. In addition, in a case where the address specified in the relevant write request is smaller than the migration pointer 2017 (Step 6003: N), the processor 260 has the processing jump to Step 6007.

Step 6004: The processor 260 specifies the identifiers of the storage port and the logical volume stored in the migrated LUN for closing 2021, and the address specified in the write request, and requests the real storage system 100 which corresponds to the identifier stored in the migrated LUN for closing 2021, to write the write data of the corresponding slot.

Step 6005: The processor 260 waits for the issued request to be completed.

Step 6006: The processor 260 does nothing in particular in a case where information has been received to the effect that there is no data in the slot, which was requested to read the write data. Alternatively, in a case where the data has been received from the slot, the processor 260 sets the bits, which correspond to the received blocks, of the block bit map 2753 and the update bit map 2754. In addition, the processor 260 stores the received data in the cache memory 210.

Step 6007: The processor 260 stores the write data received from the server 110 in the cache memory 210. Thereafter, the processor 260 configures the block bit map 2753 and the update bit map 2754 of the corresponding cache management information 2750.

Step 6008: The processor 260 checks whether or not the migration flag 2015 in the logical volume information 2000 of the relevant logical volume is ON. When the result is that the migration flag 2015 is OFF (Step 6008: N), the processor 260 has the processing jump to Step 6012. Alternatively, when the migration flag 2105 is ON, the processor 260 also compares the address (RA) specified in the write request to the migration pointer 2017, and when the address is small (Step 6008: N), has the processing jump to Step 6012.

Step 6009: The processor 260 checks whether or not the real storage system 100, which corresponds to the identifier stored in the migrated LUN 2016 of the logical volume information 2000, is the relevant real storage system 100. When the real storage system 100, which corresponds to the identifier stored in the migrated LUN 2016, is not the relevant real storage system 100, the processor 260 specifies the identifiers of the real storage system 100, the storage port, and the logical volume stored in the migrated LUN 2016, and the address specified in the write request, issues a write request for writing the received data, and sends the data stored in the cache memory 210.

Step 6010: The processor 260 waits for the write request to be completed.

Step 6011: The processor 260 is configured so that, when the write request has been completed, the empty cache management information pointer 2650 shows the corresponding cache management information 2750.

Step 6012: The processor 260 sends a completion report to the server 110, increments by 1 the first write times 2008 in the logical volume information 2000 of the logical volume, which corresponds to the written data, and the first W times 2311 in the storage group information 2300 corresponding to the storage group 280 to which the storage unit 160 that stored the written data belongs, and ends the processing.

Figure 16B:
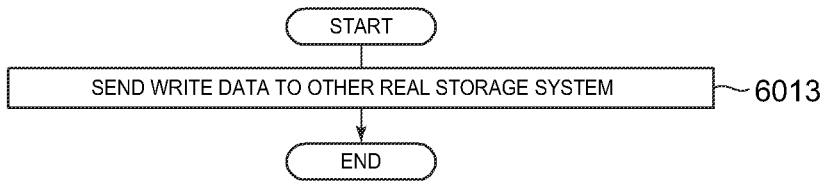
FIG. 16B is a drawing showing the processing flow of a real storage system, which has been requested to transfer write data of the cache memory related to the first example.

FIG. 16B is a drawing showing the processing flow of a real storage system 100, which has been requested to transfer write data of the cache memory related to the first example.

Step 6013: The processor 160 of the requested real storage system 100, in a case where there is write data in the area corresponding to the relative address of the requested logical volume, sends this data to the request source, and, alternatively, in a case where there is no write data, sends information to this effect to the request source. After sending this data, the processor 260 sets the corresponding cache management information 2750 to the empty state.

Figure 17:
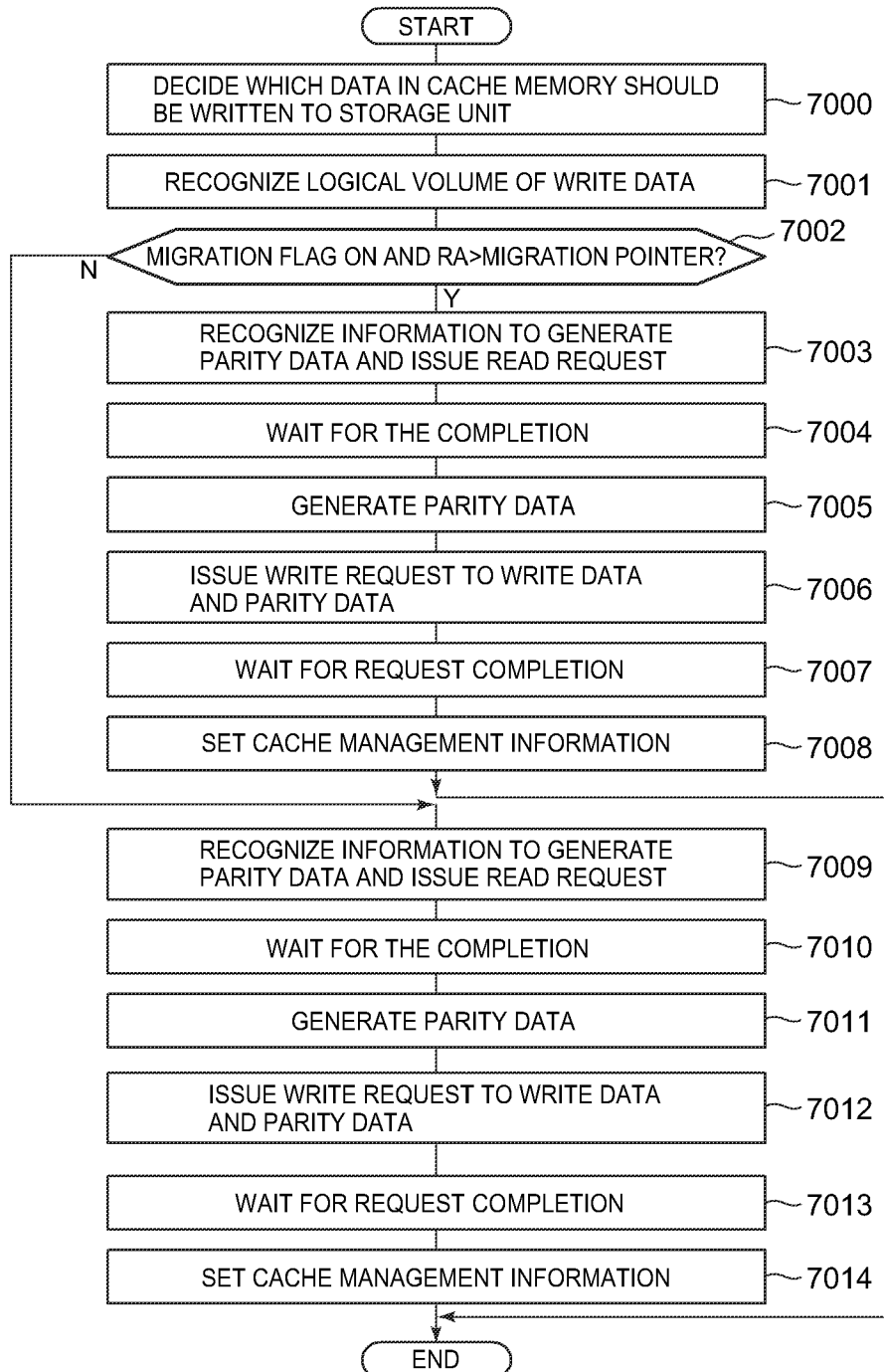
FIG. 17 is a drawing showing the processing flow of a write after process execution part related to the first example.

FIG. 17 is a drawing showing the processing flow of a write after process execution part related to the first example.

The write after process execution part 4200 is executed as needed by the processor 260.

Step 7000: The processor 260 searches the cache management information 2750 to find cache management information 2750 in which the update bit map 2754 is ON.

Step 7001: The processor 260 checks the allocated logical volume address 2752 in the discovered cache management information 2750, and recognizes the logical volume (referred to as the relevant logical volume in the explanation of FIG. 17), which corresponds to the slot corresponding to the cache management information 2750.

Step 7002: The processor 260 checks whether or not the migration flag 2015 in the logical volume information 2000 corresponding to the relevant logical volume is ON. When the result is that the migration flag 2015 is OFF (Step 7002: N), the processor 260 has the processing jump to Step 7009. In addition, the processor 260 also has the processing jump to Step 7009 when the real storage system 100, which corresponds to the identifier stored in the migrated LUN 2016, is this real storage system 100, and, in addition, when the address of the relevant logical volume is compared to the migration pointer 2017 and the address of the relevant logical volume is small (Step 7002: N).

Step 7003: The processor 260 recognizes the corresponding logical volume information 2000 based on the identifier of the logical volume stored in the migrated LUN 2016. In addition, the processor 260, based on the logical volume type 2005, recognizes whether the relevant logical volume is stored in the common storage unit 180 or is stored in the internal storage unit 230. In addition, the processor 260 recognizes the storage group 280 to which the relevant storage unit 160 belongs, and, based on the RAID type of the logical volume RAID group type 2003, recognizes the storage unit 160 and the address thereof for reading the information necessary to generate parity data corresponding to the write data, and issues a read request for the corresponding data to the corresponding storage unit 160.

Step 7004: The processor 260 waits for the issued read request to be completed.

Step 7005: The processor 260 generates parity data corresponding to the write data based on the data, which has been read in accordance with the read request.

Step 7006: The processor 260 recognizes the storage unit 160 and the address in which the data corresponding to a bit which shows the data updating of the update bit map 2754 and the generated parity data, and issues a write request for writing this data to this storage unit 160.

Step 7007: The processor 260 waits for the issued write request to be completed.

Step 7008: The processor 260 sets the bit corresponding to the written data of the update bit map 2754 to OFF. Thereafter, the processor 260 ends the processing.

Step 7009: The processor 260, based on the logical volume type 2005 in the logical volume information 2000 corresponding to the logical volume, recognizes whether the relevant logical volume is stored in the common storage unit 180, or is stored in the internal storage unit 230. In addition, the processor 260 recognizes the storage group 280 to which the relevant storage unit 160 belongs, and based on the RAID type of the logical volume RAID group type 2003, recognizes the storage unit 160 and address thereof for reading the information necessary to generate parity data corresponding to the write data, and issues a read request for the corresponding data to the relevant storage unit 160.

Step 7010: The processor 260 waits for the issued read request to be completed.

Step 7011: The processor 260 generates the parity data corresponding to the write data.

Step 7012: The processor 260 recognizes the storage unit 160 and the address thereof for storing the data corresponding to the bit, which shows that the update bit map 2754 has been updated, and the generated parity data, and issues a write request for writing this data to the relevant storage unit 160.

Step 7013: The processor 260 waits for the issued write request to be completed.

Step 7014: The processor 260 sets the bit corresponding to the written data of the corresponding update bit map 2754 to OFF. Thereafter, the processor 260 ends the processing.

Figure 18A:
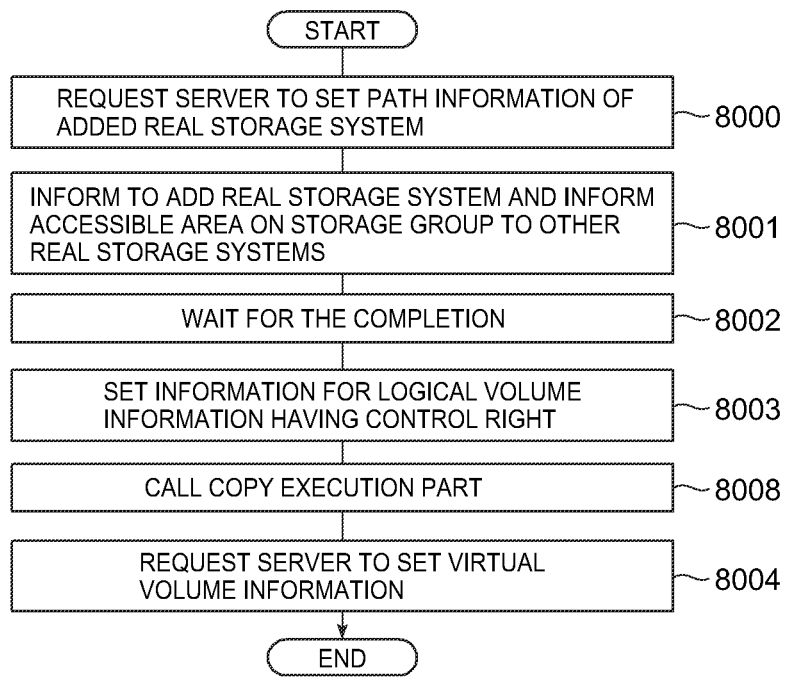
FIG. 18A is a drawing showing the processing flow of a storage system adding execution part related to the first example.

FIG. 18A is a drawing showing the processing flow of a storage system adding execution part related to the first example.

The process of this processing flow is executed by a real storage system 100, which has been added. Specifically, this process is realized in accordance with the processor 260 of the storage controller 200 in the added real storage system 100 executing the storage system adding execution part 4300.

Step 8000: The storage controller 200 of the added real storage system 100 communicates with the server 110, and requests that the identifier of the storage port 197 in the real storage system 100 be set in the server port information 198.

Step 8001: The storage controller 200 notifies the other real storage systems 100 in the same virtual storage system 190 of information showing that a real storage system 100 has been added inside the virtual storage system 190, and showing the storage box 130, which the relevant real storage system 100 is able to access.

Step 8002: The storage controller 200 waits for a response to the notification to be returned.

Step 8003: The storage controller 200 sets a set of logical volumes, which obtained a control right included in the response, in the virtual logical volume information 2085 and the logical volume information 2000. In addition, the storage controller 200 sets the information included in the response in the number of segments 2303, the number of allocatable segments 2309, the number of empty segments 2304, the allocatable segment bit map 2308, and the empty segment bit map 2307 in the segment group information 2300 corresponding to the storage group 280, which was given the allocation right.

Step 8008: In a case where a logical volume is to be migrated, the write data remaining in the cache memory 210 must be migrated to the cache memory 210 of the other real storage systems 100. In a case where write data written to the common storage unit 160 is in the write data of the logical volume of the migration-source real storage system 100, a process for migrating this write data to the cache memory 210 in the migration-destination real storage system 100 is begun. Thus, the storage controller 200 calls the copy execution part 4900.

Step 8004: Next, the storage controller 200 communicates with the server 110, and requests that information as to which virtual logical volume is connected to which storage port 197 be set in the server port information 198. After this, the storage controller 200 ends the processing.

Figure 18B:
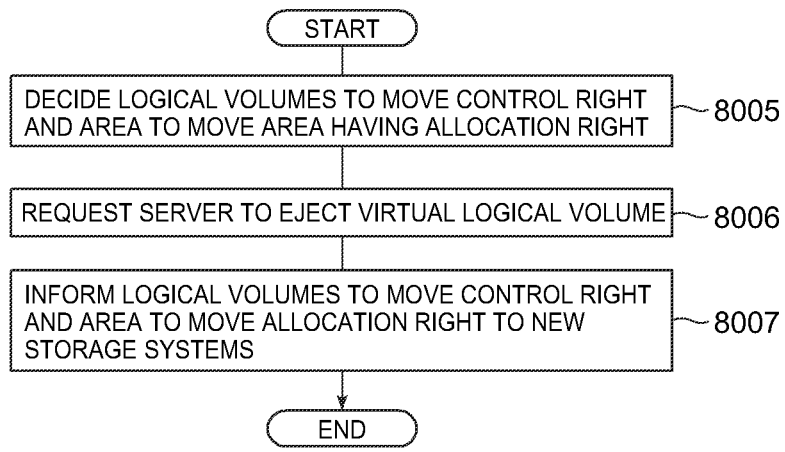
FIG. 18B is a drawing showing the processing flow of a real storage system, which has received a notification from an added real storage system related to the first example.

FIG. 18B is a drawing showing the processing flow of a real storage system, which has received a notification from an added real storage system related to the first example.

Step 8005: The storage controller 200 of the real storage system 100, which has received a notification, performs the following processing targeted at the storage box 130 for which the added real storage system 100 has the access right, and, in addition, the relevant real storage system 100 has the access right. In a case where there is no storage box 130 to be targeted for processing, the storage controller 200 notifies the added real storage system 100 to this effect. First, the storage controller 200 ascertains all the logical volumes, which have been defined on the processing-target storage box 130, and decides a set of logical volumes to move the control right to the added real storage system 100. When deciding this set of logical volumes, the storage controller 200 references the second read times 2009 and the second write times 2010 in the respective logical volume information 2000. The storage controller 200 also references the second R times 2311 and the second W times 2313 in the storage group information 2300 corresponding to the storage group 280, which is allocating the logical volumes. This makes it possible to ascertain an access frequency of each storage group 280 and an access frequency of each logical volume. Thus an access frequency of the storage group after migrating a logical volume for which control right is moved, can be estimated. Based on this estimate, the logical volume for moving control right is decided. In addition, the storage controller 200 decides on a portion of the empty areas for moving the allocation right from among the areas having the allocation right of the storage group 280 to which the processing-target storage box 130 belongs.

Step 8006: The storage controller 200 notifies the server 100 to the effect eject virtual logical volume from the storage port 197 to which the virtual logical volume, which corresponds to the logical volume decided on for moving the control right, has been connected up to this point.

Step 8007: The storage controller 200 notifies the added real storage system 100 of the set of logical volumes for moving the control right and the portion of empty areas for moving the allocation right, and ends the processing.

Figure 19A:
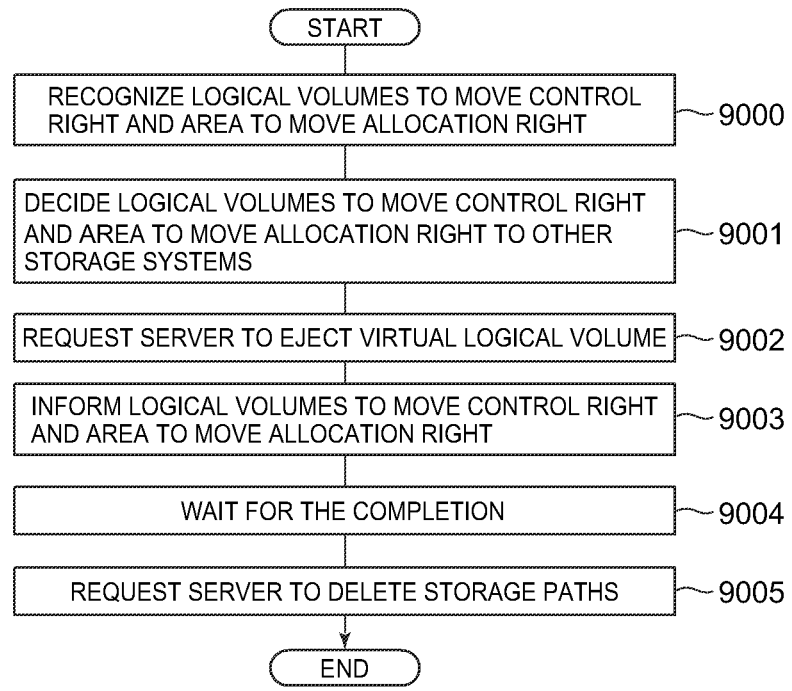
FIG. 19A is a drawing showing the processing flow of a storage system closing execution part related to the first example.

FIG. 19A is a drawing showing the processing flow of a storage system closing execution part related to the first example.

The process of this processing flow is executed by a real storage system 100, which is to be ejected. Specifically, this process is realized in accordance with the processor 260 in the storage controller 200 of the real storage system 100 to be ejected executing the storage system closing execution part 4400.

Step 9000: The storage controller 200 of the real storage system 100 to be ejected references the logical volume information 2000 and recognizes a logical volume defined in the storage box 130. In addition, the storage controller 200 recognizes an area and an empty area having the allocation right for each storage group 280 in each storage box 130.

Step 9001: The storage controller 200 decides the real storage system 100 to which to move the logical volume control right and the allocation right for each area for which the real storage system 100 to be ejected have these rights. At this time, the storage controller 200 references the second read times 2009 and the second write times 2010 of the respective logical volume information 2000. The storage controller 200 also references the second R times 2311 and the second W times 2313 of the storage group information 2300 corresponding to the storage group 280, which is allocating each logical volume. This makes it possible to ascertain an access frequency of each storage group 280 and an access frequency of each logical volume. Based on this information, the logical volume for moving control right is decided.

Step 9002: The storage controller 200 notifies the server 110 to the effect eject the virtual logical volume from the storage port 197 to which the virtual logical volume, which corresponds to the logical volume decided for moving the control right, has been connected.

Step 9003: The storage controller 200 notifies the relevant real storage system 100 of information on the virtual logical volume and the logical volume, which have been decided for moving the control right, and information on the area and empty area for moving the allocation right.

Step 9004: The storage controller 200 waits for a response to be returned from the notified real storage system 100.

Step 9005: Next, the storage controller 200 communicates with the server 110, notifies the server 110 that the storage port 197 of the relevant real storage system 100 has been closed, and ends the processing.

Figure 19B:
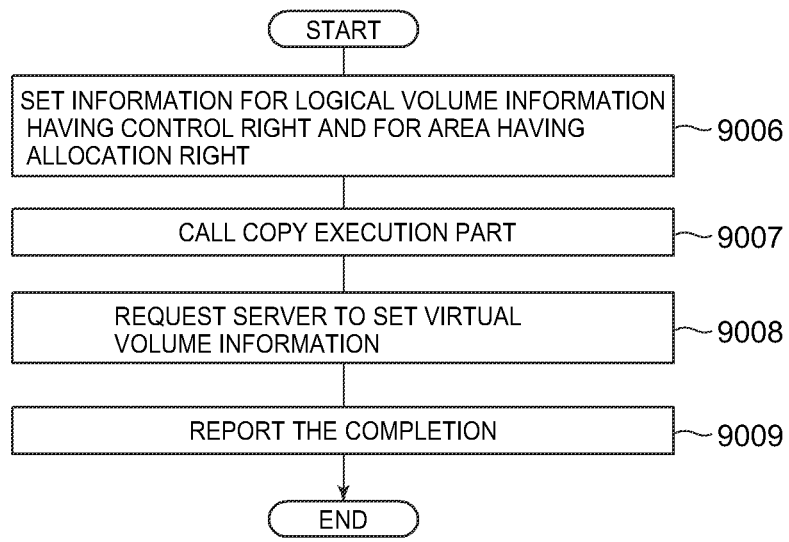
FIG. 19B is a drawing showing the processing flow of a real storage system, which has received a notification from a to-be-closed real storage system related to the first example.

FIG. 19B is a drawing showing the processing flow of a real storage system, which has received a notification from a to-be-closed real storage system related to the first example.

Step 9006: The storage controller 200 of the real storage system 100, which has received the notification, sets in the virtual logical volume information 2085 and the logical volume information 2000 a set of logical volumes for obtaining the control right notified from the real storage system 100, which is to be closed. In addition, the storage controller 200 sets the notified information in the number of segments 2303, the number of allocatable segments 2309, the number of empty segments 2304, the allocatable segment bit map 2308, and the empty segment bit map 2307 in the segment group information 2300 corresponding to the storage group 280, which was given the allocation right.

Step 9007: In a case where the real storage system 100 is to be closed, the write data remaining in the cache memory 210 must be migrated to the cache memories 210 of the other real storage systems 100. In particular, in a case where the cache memory 210 has been duplexed, a failure has occurred in the one cache memory 210, and it has been closed, migrating the write data to other real storage systems 100, setting the cache memory 210 of this real storage system 100 in the duplexed state, and closing the real storage system 100 in which the failure occurred is effective for enhancing reliability. Therefore, in a case where the real storage system 100 is to be closed, the write data remaining in the cache memory 210 must be written to the common storage unit 180. In a case where there is write data to be written to the common storage 180 in the logical volume of the real storage system 100 to be closed at this point, a process for migrating this write data to the cache memory 210 in the migration-destination real storage system 100 is begun. Thus, the storage controller 200 calls the copy execution part 4900.

Step 9008: The storage controller 200 reports to the server 110 as to the storage port 197 to which the virtual logical volume corresponding to the logical volume, which was decided on for moving the control right, is connected.

Step 9009: Thereafter, the storage controller 200 reports the completion of processing to the real storage system 100 to be closed. The storage controller 200 ends the processing after this. The above processing is the processing flow when closing a real storage system 100, but the same processing may be performed in a case where a logical volume is being migrated between real storage systems 100 in order to balance the loads on the real storage systems 100. An area for which the real storage system have the allocation right may also be migrated between the real storage systems 100. These processes can be realized in accordance with the following processing flow. For the sake of convenience, an explanation will be given here using FIG. 19A and FIG. 19B. The following processing adopts a method in which the write data in the cache memory 210 of a migration-source real storage system 100 is migrated to a migration-destination real storage system 100, and, as has been described already, the migration-source real storage system 100 may write the write data to the common storage unit 180. The same holds true for any of the second through the fourth examples, which will be described further below.

First, the processing by the migration-source real storage system 100 with respect to either the logical volume or the empty area allocation right will be explained.

Step 9001: The storage controller 200 of the migration-source real storage system 100 decides on the real storage system 100 to which the logical volume control right and allocation right for each area for which the migration-source storage system 100 have these rights (may be either one) will be moved At this time, the storage controller 200 references the second read times 2009 and the second write times 2010 of the respective logical volume information 2000. The storage controller 200 also references the second R times 2311 and the second W times 2313 of the storage group information 2300 corresponding the storage group 280, which is allocating each logical volume.

Step 9002: The storage controller 200 notifies the server 110 to the effect eject the virtual logical volume from the storage port 197, which connects the virtual logical volume corresponding to the logical volume to which it was decided to move the control right (this step is not executed when moving only the allocation right).

Step 9003: The storage controller 200 notifies the relevant real storage system 100 of information on the virtual logical volume and the logical volume, which have been decided for moving the control right, and information on the area and empty area for moving the allocation right (may be either one).

Next, the processing by the migration-destination real storage system 100 with respect to either the logical volume control right or the empty area allocation right will be explained.

Step 9006: The storage controller 200 of the migration-destination real storage system 100 of either the logical volume control right or the empty area allocation right sets in the virtual logical volume information 2085 and the logical volume information 2000 a notified set of logical volumes for obtaining the control right. In addition, the storage controller 200 sets the notified information in the number of segments 2303, the number of allocatable segments 2309, the number of empty segments 2304, the allocatable segment bit map 2308, and the empty segment bit map 2307 in the segment group information 2300 corresponding to the storage group 280, which was given the allocation right.

Step 9007: The storage controller 200 calls the copy execution part 4900.

Step 9008: The storage controller 200 reports to the server 100 regarding the storage port 197 to which the virtual logical volume corresponding to the logical volume, which was decided on for obtaining the control right, is connected (this step is not executed when moving only the allocation right).

Figure 20A:
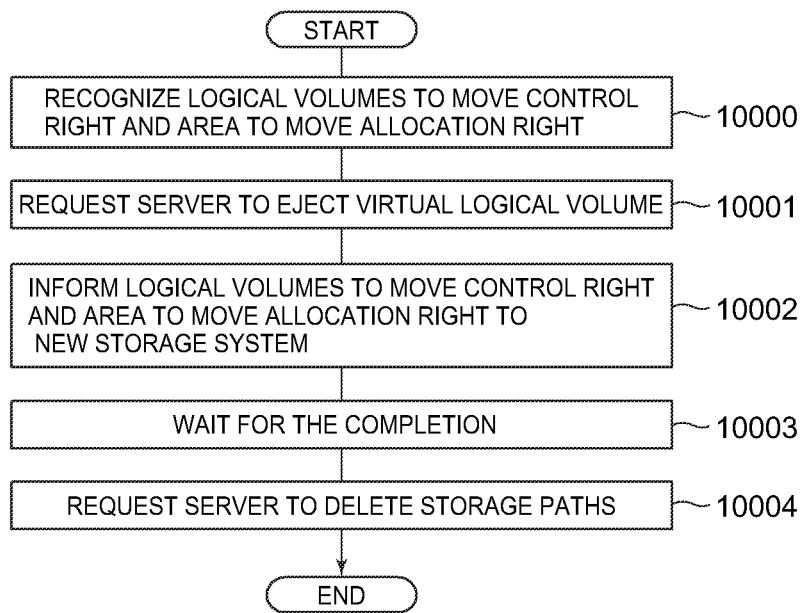
FIG. 20A is a drawing showing the processing flow of a storage system migration execution part related to the first example.

FIG. 20A is a drawing showing the processing flow of a storage system migration execution part related to the first example.

The process of this processing flow is executed by a migration-source real storage system 100. Specifically, this process is realized in accordance with the processor 260 in the storage controller 200 of the migration-source real storage system 100 executing the storage system migration execution part 4500.

Step 10000: The storage controller 200 of the migration-source real storage system 100 references the logical volume information 2000 and recognizes a logical volume, which has been defined in the storage box 130. In addition, the storage controller 200 recognizes an empty area and an area having the allocation right, for each storage group 280 of the respective storage boxes 130.

Step 10001: The storage controller 200 notifies the server 110 to the effect eject the virtual logical volume from the storage port 197 to which the virtual logical volume, which corresponds to the logical volume (here, all the logical volumes of the migration-source storage system 100) decided for moving the control right, is connected.

Step 10002: The storage controller 200 notifies the migration-destination real storage system 100 of information on the virtual logical volume and the logical volume, which have been decided for moving the control right, and information on the area and empty area for moving the allocation right.

Step 10003: The storage controller 200 waits for a response to be returned from the notified real storage system 100.

Step 10004: Next, the storage controller 200 communicates with the server 110, notifies the server 110 that the storage port 197 of the relevant real storage system 100 is closed, and ends the processing.

Figure 20B:
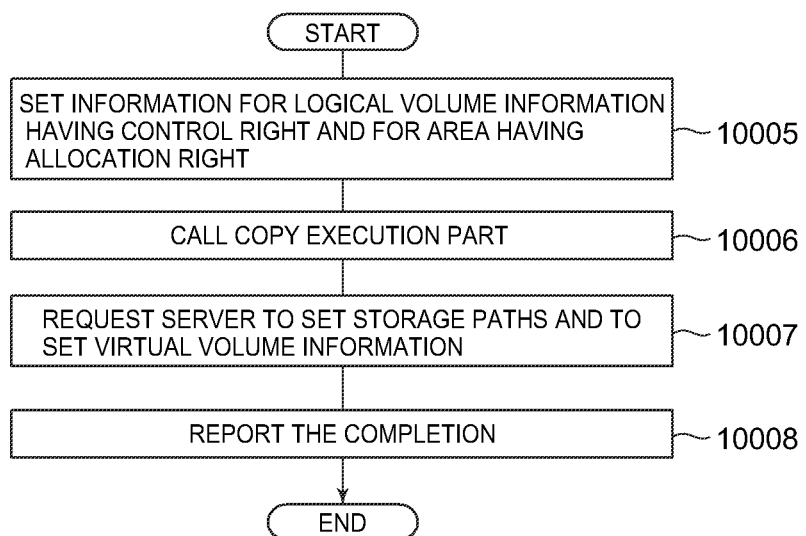
FIG. 20B is a drawing showing the processing flow of a migration-destination real storage system, which has received a notification from a migration-source real storage system related to the first example.

FIG. 20B is a drawing showing the processing flow of a migration-destination real storage system, which has received a notification from a migration-source real storage system related to the first example.

Step 10005: The storage controller 200 of the migration-destination real storage system 100 sets in the virtual logical volume information 2085 and the logical volume information 2000 a notified set of logical volumes for obtaining the control right. In addition, the storage controller 200 sets the notified information in the number of segments 2303, the number of allocatable segments 2309, the number of empty segments 2304, the allocatable segment bit map 2308, and the empty segment bit map 2307 in the segment group information 2300 corresponding to the storage group 280, which was given the allocation right.

Step 10006: In a case where the migration-source real storage system 100 is to be closed, write data remaining in the cache memory 210 must be written to the common storage unit 180. Here, with respect to a migration-source logical volume, when there is write data to be written to the common storage 180 in the cache memory 210 of the migration-source real storage system 100, a process for migrating this write data to the cache memory 210 in the migration-destination real storage system 100 is begun. Thus, the storage controller 200 calls the copy execution part 4900.

Step 10007: The storage controller 200 has the server 110 set the storage port 197 of the migration-destination real storage system 100 in the server port information 198. In addition, the storage controller 200 reports to the server 110 regarding the storage port 197 to which the virtual logical volume corresponding to the logical volume, which was decided for obtaining the control right, is connected. Thereafter, the storage controller 200 reports the completion of the processing to the migration-source real storage system 100. The storage controller 200 ends the processing after this.

Figure 21A:
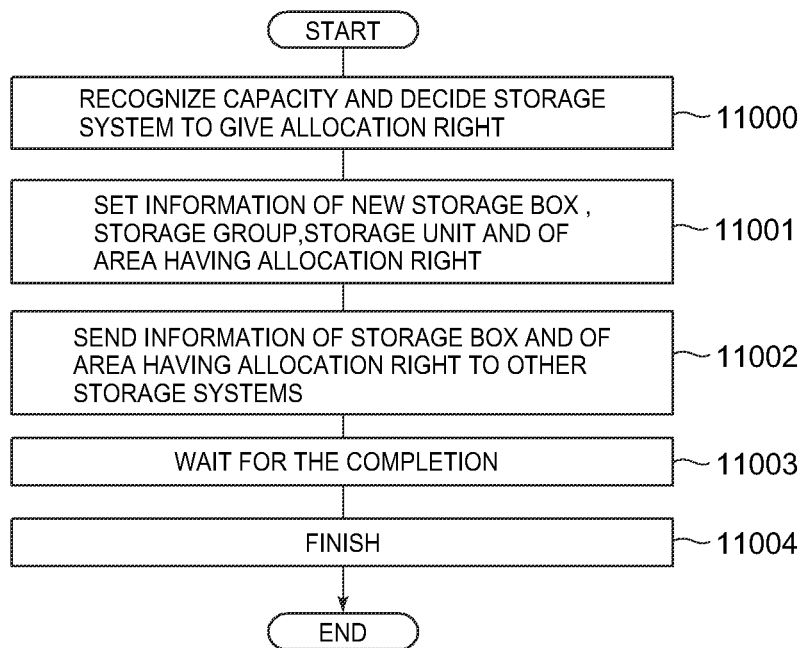
FIG. 21A is a drawing showing the processing flow of a storage box adding execution part related to the first example.

FIG. 21A is a drawing showing the processing flow of a storage box adding execution part related to the first example.

The storage box adding execution part 4600 is executed by the storage controller 200 when a storage box 130 has been added. That is, when a storage box 130 is added, the real storage system 100, which is connected to this storage box 130, is activated, and the storage controller 200 of the real storage system 100 executes the following processing.

Step 11000: The storage controller 200 of the real storage system 100 recognizes the capacity of the added storage box 130. Then, the storage controller 200 decides which allocation right area to give to which real storage system 100.

Step 11001: The storage controller 200, based on information on the recognized storage box 130 and information on the area for which its own real storage system 100 has the allocation right, sets the storage box information 2050, the storage group information 2300, and the storage unit information 2500.

Step 11002: The storage controller 200 sends the information of the recognized storage box 130 and the information of the area for giving the allocation right to each real storage system 100 to the corresponding real storage system 100.

Step 11003: The storage controller 200 waits for reports from the other real storage systems 100.

Step 11004: The storage controller 200 receives the completion reports and ends the processing.

Figure 21B:
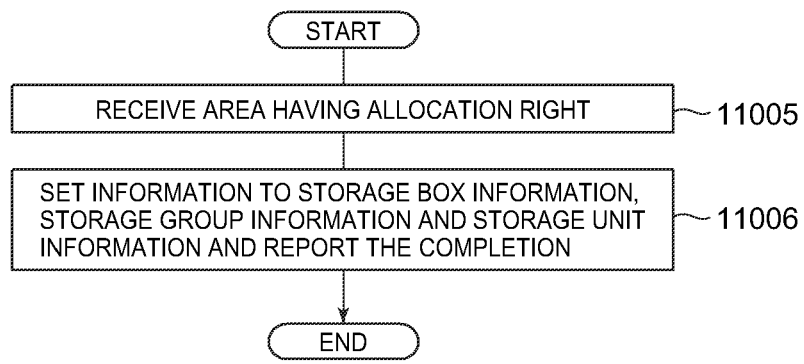
FIG. 21B is a drawing showing the processing flow of a real storage system, which has received information from a real storage system that recognizes a storage box related to the first example.

FIG. 21B is a drawing showing the processing flow of a real storage system, which has received information from a real storage system that recognizes a storage box related to the first example.

Step 11005: The storage controller 200 of the real storage system 100, which has received information, receives storage box 130 information and information on an area for giving the allocation right to the relevant real storage system 100.

Step 11006: The storage controller 200 sets the storage box information 2050, the storage group information 2300, and the storage unit information 2500 in accordance with the received information. Thereafter, the storage controller 200 makes a completion report to the real storage system 100, which sent the information, and ends the processing.

Figure 22:
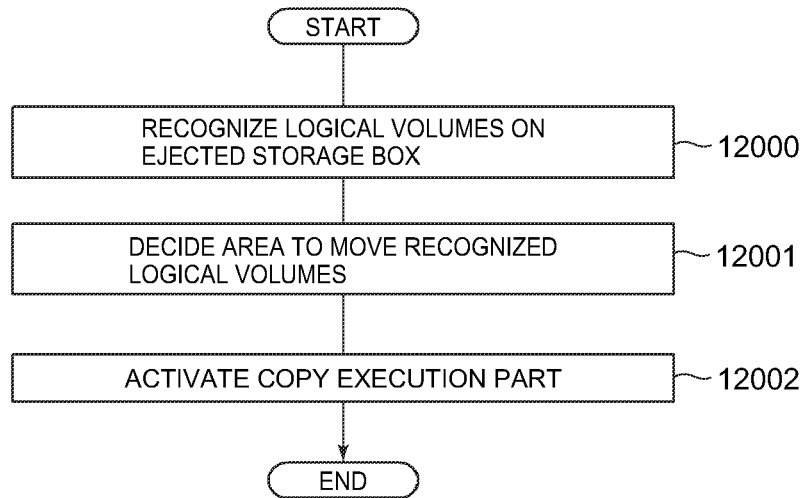
FIG. 22 is a drawing showing the processing flow of a storage box closing execution part related to the first example.

FIG. 22 is a drawing showing the processing flow of a storage box closing execution part related to the first example.

The storage box closing execution part 4700 is processing executed by the storage controller 200 when a storage box 130 is to be ejected. When it has been decided that a storage box 130 will be ejected, one of the real storage systems 100 connected to this storage box 130 is activated, and the storage controller 200 of this real storage system 100 executes the following processing.

Step 12000: The storage controller 200 of the real storage system 100 recognizes a logical volume, which has been defined in the storage box 130 to be ejected.

Step 12001: The storage controller 200, from among the empty areas of the internal storage group 280 in its own real storage system 100 and the allocation right-possessing empty areas of the relevant real storage system 100 inside a storage box 130 other than the storage box 130 to be ejected, decides an area for migrating the logical volume, which has been defined in the storage box 130 to be ejected, and defines the relevant area as a migration-destination logical volume. At this time, the storage controller 200 references the second read times 2009 and the second write times 2010 of the respective logical volume information 2000. The storage controller 200 also references the second R times 2311 and the second W times 2313 of the storage group information 2300 corresponding the storage group 280, which is allocating each logical volume to decide on a migration destination. Specifically, the storage controller 200 secures new logical volume information 2000 and sets the required information. In particular, at this point the storage controller 200 sets the identifier of the relevant real storage system 100, the identifier of the logical volume defined in the to-be-ejected storage box 130, and an area of the storage box 130 in which this logical volume has been defined in the migrated LUN 2016. The storage controller 200 also sets the migration flag 2015 to ON for one piece of logical volume information 2000, which, from among the logical volume information 2000, corresponds to the multiple logical volumes to be migrated, and sets the migration pointer 2017 to the first address. The storage controller 200 sets the migration waiting flag 2018 to ON for the remaining logical volume information 2000.

Step 12002: The storage controller 200 activates the copy execution part 4900. The storage controller 200 ends the processing thereafter.

Figure 23:
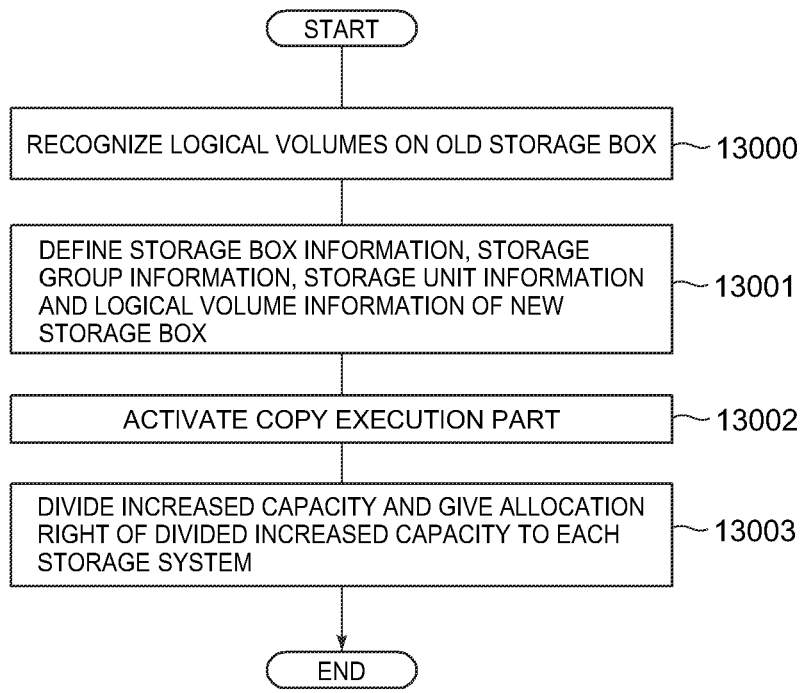
FIG. 23 is a drawing showing the processing flow of a storage box migration execution part related to the first example.

FIG. 23 is a drawing showing the processing flow of a storage box migration execution part related to the first example.

The storage box migration execution part 4800 is executed by the storage controller 200 when an old storage box 130 is replaced with a new storage box 130. When it has been decided that a storage box 130 is to be replaced, the real storage system 100 connected to the old storage box 130 is activated, and the storage controller 200 of the activated real storage system 100 executes the following processing.

Step 13000: The storage controller 200 of the real storage system 100 recognizes a logical volume, which has been defined in the old storage box 130.

Step 13001: The storage controller 200 decides an area inside the new storage box 130 for storing the recognized logical volume, and defines the decided area as the migration-destination logical volume. Specifically, the storage controller 200 secures new logical volume information 2000 and sets the required information. In particular, at this point the storage controller 200 sets the identifier of the relevant real storage system 100, the identifier of the logical volume defined in the to-be-ejected storage box 130, and the area on the new storage box 130 in which this logical volume has been defined in the migrated LUN 2016 of the logical volume information 2000. The storage controller 200 also sets the migration flag 2015 to ON for one piece of logical volume information 2000, which, from among the logical volume information 2000, corresponds to the multiple logical volumes to be migrated, and sets the migration pointer 2017 to the first address. The storage controller 200 sets the migration waiting flag 2018 to ON for the remaining logical volume information 2000.

Step 13002: The storage controller 200 activates the copy execution part 4900.

Step 13003: The storage controller 200, in a case where the storage capacity of the new storage box 130 is larger than that of the old storage box 130, decides an allocation amount by equally dividing an increased capacity by the number of real storage systems 100 connected to the new storage box 130, decides an area, which corresponds to this allocation amount, and updates the number of empty segment 2304, and empty segment bit map 2308 in the storage group information 2300. Thereafter, the storage controller 200 ends the processing.

Figure 24A:
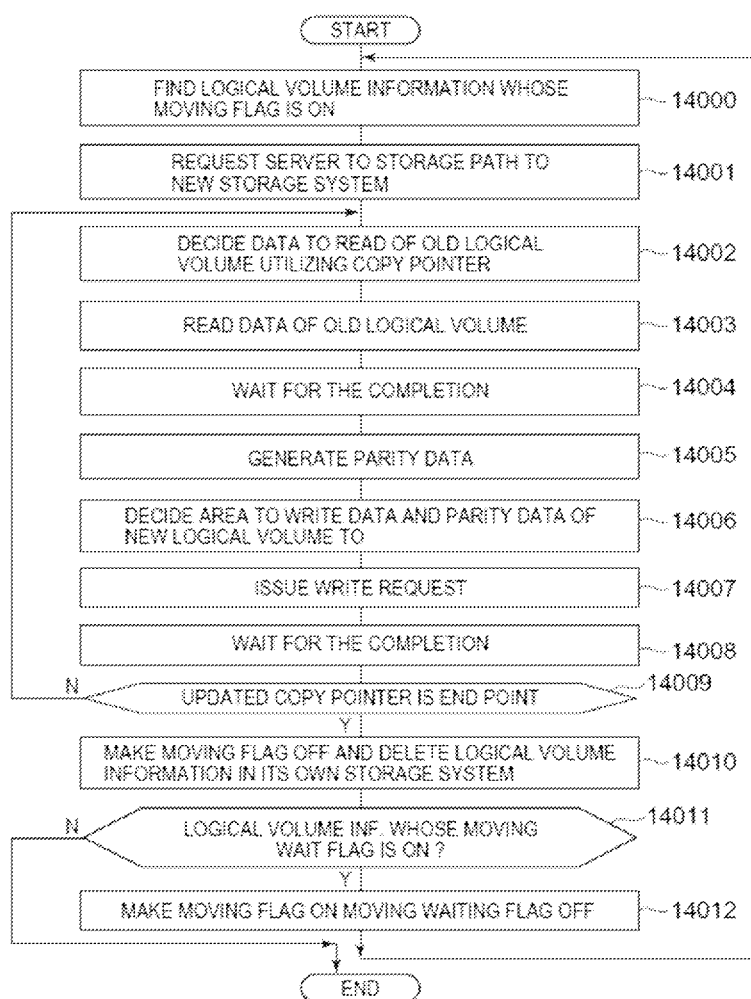
FIG. 24A is a drawing showing the processing flow of a copy execution part related to the first example.

FIG. 24A is a drawing showing the processing flow of a copy execution part related to the first example.

The copy execution part 4900 is activated by another execution part and the storage controller 200 commences execution.

Step 14000: The storage controller 200 finds logical volume information 2000 in which the migration flag 2015 is ON.

Step 14001: The storage controller 200 sets the identifier of the relevant logical volume to the identifier of the virtual logical volume corresponding to the virtual logical volume identifier, which is set in the migrated LUN 2016 of the relevant logical volume information 2000. (The identifier of the migration-destination logical volume is copied to the identifier of the migration-source logical volume.) In addition, the storage controller 200, in a case where the migration-source logical volume is being managed by a real storage system 100 other than the relevant real storage system 100, switches the storage port 197 to which the corresponding virtual logical volume is connected to a new storage port 197 in the server port information 198 of the server 110.

Step 14002: The storage controller 200, based on the logical volume information 2000 corresponding to the logical volume (the migration-source logical volume) of the logical volume identifier, which is stored in the migration LUN 2016 of the logical volume information 2000 of the migration-source logical volume, the package group RAID type 2302 of the storage group information 2300, which corresponds to the storage group 280 in which the migration-source logical volume is stored, and the migration pointer 2017, decides an area in which parity data is able to be generated from read data as the area to be read from the migration-source logical volume. In a case where the identifier of the real storage system 100 in the migration LUN 2016 is the identifier of the relevant real storage system 100, the storage controller 200 decides a physical area of the storage unit 160 for performing a read based on the package group RAID type 2302 in the storage group information 2300 corresponding to the storage group 280, and the storage unit information 2500 (parity data for the migration-source logical volume is not read at this time).

Step 14003: The storage controller 200 reads the data of the migration-source logical volume, and issues a request. At this time, in a case where the identifier of the real storage system 100 in the migrated LUN 2016 is not the identifier of the relevant real storage system 100, the storage controller 200 issues a read request with respect to the real storage system 100, which corresponds to the identifier in the migrated LUN 2016. In a case where the identifier of the real storage system 100 in the migrated LUN 2016 is the identifier of the relevant real storage system 100, the storage controller 200 issues a read request with respect to the area in the storage unit 160, which is decided for performing a read in Step 14002. Whereas a virtual logical volume is specified in a read request issued by the server 110, a logical volume is specified in this read request.

Step 14004: The storage controller 200 waits for the read request to be completed.

Step 14005: The storage controller 200 generates parity data from the data, which has been read.

Step 14006: The storage controller 200, based on the logical volume information 2000 of the migration-destination logical volume and the storage group 280 in which the migration-destination logical volume is stored, decides an area on the migration-destination logical volume for writing the read data and the parity data.

Step 14007: The storage controller 200 issues a write request with respect to the decided migration-destination logical volume.

Step 14008: The storage controller 200 waits for the write request to be completed.

Step 14009: The storage controller 200 updates the migration pointer 2017. In a case where the copying has not been completed for all the logical volumes to be migrated, the storage controller 200 has the processing jump to Step 14002.

Step 14010: The storage controller 200 sets the migration flag 2015 to OFF. In a case where the real storage system 100 of the migration-source logical volume information 2000 is the relevant real storage system 100 (in a case where the migration-source logical volume and the migration-destination logical volume are belong to the same real storage system), the storage controller 200 invalidates the logical volume information 2000 corresponding to the migrated LUN 2016.

Step 14011: The storage controller 200 finds the logical volume information 2000 in which the migration waiting flag 2018 is ON. In a case where logical volume information 2000 in which the migration waiting flag 2018 is ON does not exist, the storage controller 200 ends the processing.

Step 14012: The storage controller 200 sets the migration waiting flag 2018 to OFF, and sets the migration flag 2015 to ON. Thereafter, the storage controller 200 has the processing jump to step 14000.

Figure 24B:
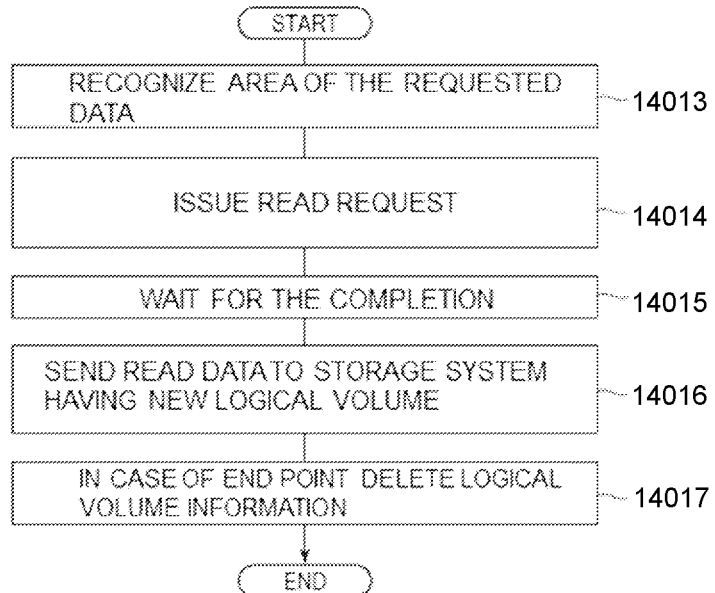
FIG. 24B is a drawing showing the processing flow of a real storage system comprising a migration-source logical volume, the real storage system being instructed to read specified area in a logical volume by the real storage system comprising a migration-destination logical volume related to the first example.

FIG. 24B is a drawing showing the processing flow of a real storage system comprising a migration-source logical volume, the real storage system being instructed to read specified area in a logical volume by the real storage system comprising a migration-destination logical volume related to the first example.

Step 14013: The storage controller 200 recognizes the logical volume information 2000 of a specified logical volume. The storage controller 200 recognizes the storage unit 160 and an area for performing the read based on the storage system group information 23000, and the storage unit information 2500.

Step 14014: The storage controller 200 issues a read request to the relevant storage unit 160.

Step 14015: The storage controller 200 waits for the issued read request to be completed.

Step 14016: When the issued read request is completed, the storage controller 200 transfer the read data to the real storage system 100 which requests to transfer the data of the relevant logical volume.

Step 14017: In a case where the last data of the relevant logical volume is transferred, the storage controller 200 deletes logical volume information corresponding the relevant logical volume. The storage controller 200 sets the bit corresponds the segment which is allocated to the relevant logical volume to ON, and increases the number of this segment to the number of empty segment 2307.

Figure 25:
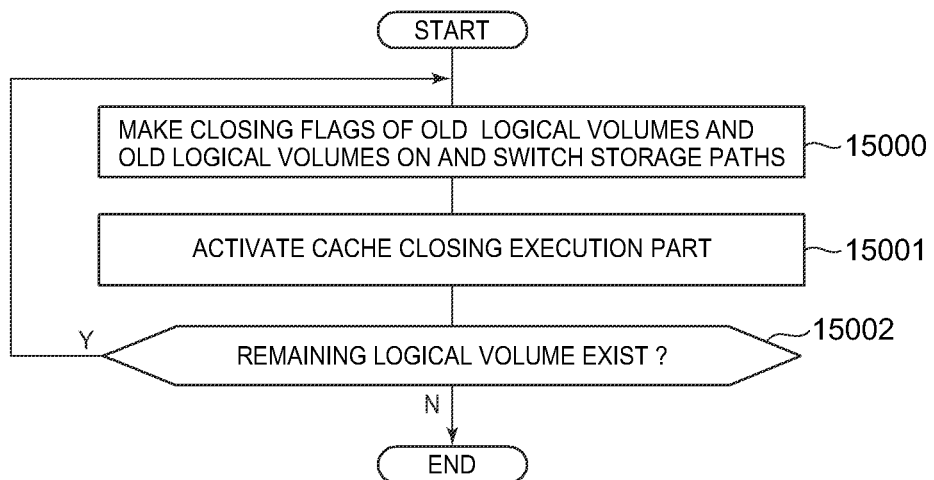
FIG. 25 is a drawing showing the processing flow of a cache closing schedule part related to the first example.

FIG. 25 is a drawing showing the processing flow of a cache closing schedule part related to the first example.

The cache closing schedule part 4910 is executed by the storage controller 200 in a real storage system 100, which inherits a logical volume from the real storage system 100 to be closed, and in the migration-destination real storage system 100 of the logical volume.

Step 15000: The storage controller 200 sets to ON the migration for closing flag 2019 in the logical volume information 2000, which corresponds to either the inherited logical volume, or to all of the logical volumes constituting the migration destination, and sets the information of the migration-source logical volume, the migration-source real storage system 100, and the storage port 197 in the migrated LUN for closing 2021.

Step 15001: The storage controller 200 activates the cache closing execution part 4920.

Step 15002: The storage controller 200 checks whether or not the processing for either the inherited logical volume, or all of the logical volumes constituting the migration destination has ended. In a case where the result is that processing has not ended (Step 15002: Y), the storage controller 200 has the processing jump to step 15000, and, alternatively, in a case where the processing has ended (Step 15002: N), ends the processing.

Figure 26A:
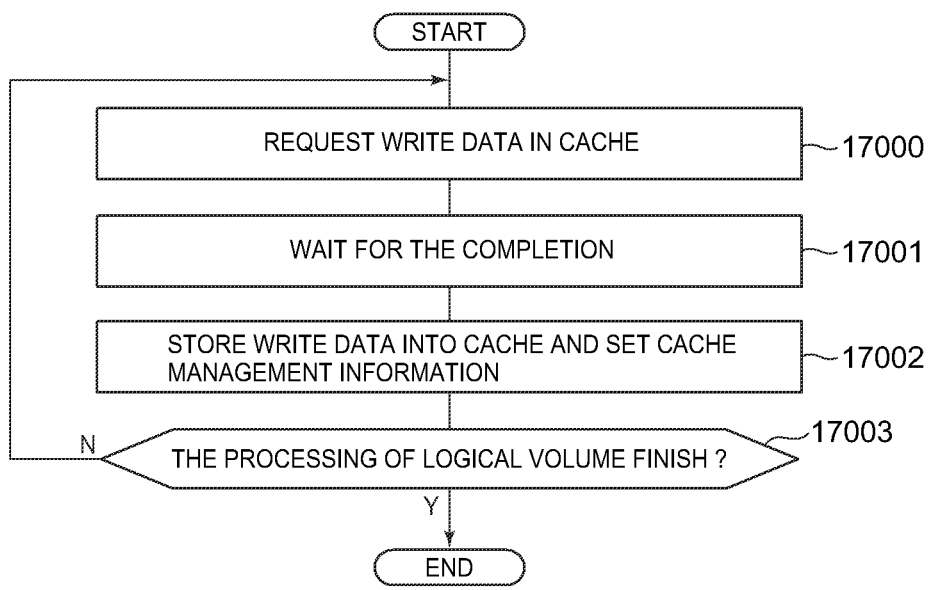
FIG. 26A is a drawing showing the processing flow of a cache closing execution part related to the first example.

FIG. 26A is a drawing showing the processing flow of a cache closing execution part related to the first example.

The cache closing execution part 4920 is executed by the storage controller 200 of either the real storage system 100, which inherits the logical volume, or the logical volume migration-destination real storage system 100.

Step 17000: The storage controller 200 specifies the identifiers of the real storage system 100 and the logical volume, which are included in the migrated LUN 2016, and the address of the migration pointer 2017 of the logical volume information 2000 corresponding to either the inherited logical volume or the migration-destination logical volume, and requests that the real storage system 100 transfer write data remaining in the cache memory 210 at and after this address.

Step 17001: The storage controller 200 waits for the data to be sent.

Step 17002, Step 17003: A case in which the data has not been sent (Step 17003: Y) signifies that all the data has been received, and as such, the storage controller 200 ends the processing. In a case where the data has been sent (Step 17003: N), the storage controller 200 stores this data in the cache memory 210. In addition, the storage controller 200 sets the next address of the sent data in the migration pointer 2017, and moves the processing to step 17000.

Figure 26B:
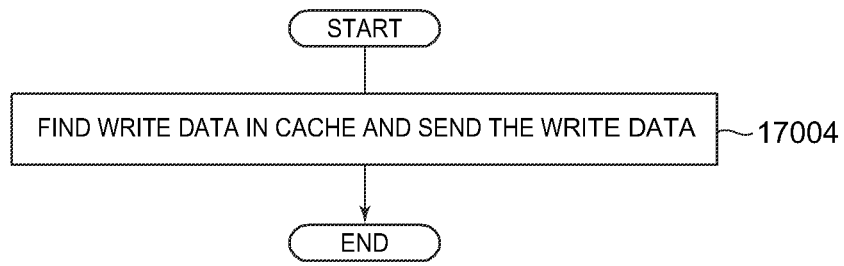
FIG. 26B is a drawing showing the processing flow of a migration-source real storage system related to the first example.

FIG. 26B is a drawing showing the processing flow of a migration-source real storage system related to the first example.

Step 17004: The storage controller 200 of the migration-source real storage system 100, based on the address of the logical volume received from the migration-destination real storage system 100, searches to find out whether or not write data to be written to the storage unit 160 remains in the cache memory 210. In a case where write data to be written to the storage unit 160 is found, the storage controller 200 transfers this write data and the address on the logical volume to the migration-destination real storage system 100. Thereafter, the storage controller 200 ends the processing.

Figure 27:
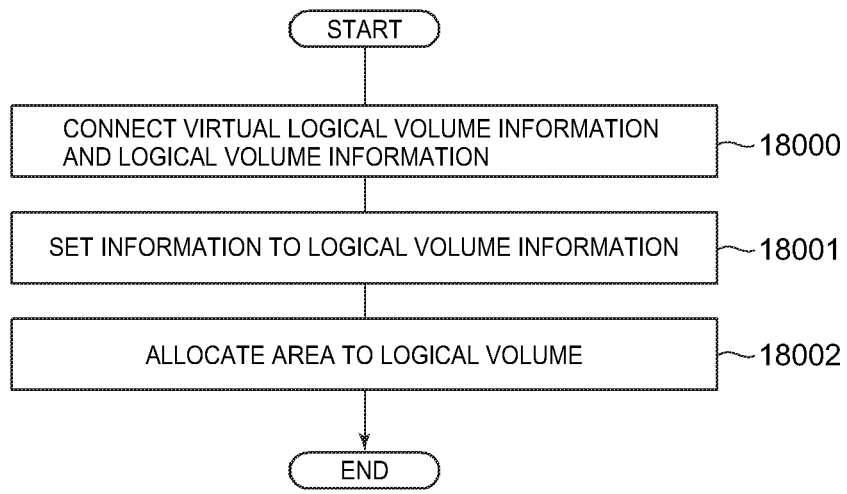
FIG. 27 is a drawing showing the processing flow of a virtual logical volume generation part related to the first example.

FIG. 27 is a drawing showing the processing flow of a virtual logical volume generation part related to the first example.

The virtual logical volume generation part 4950 is executed by the storage controller 200 when a virtual logical volume is defined. In accordance with this, the storage controller 200 of the real storage system 100 having the control right for the relevant virtual logical volume executes the virtual logical volume generation part 4950. When the virtual logical volume generation part 4950 is executed, the identifier of the virtual logical volume, the identifier of the logical volume, and the capacity of the logical volume are specified.

Step 18000: The storage controller 200 finds the virtual logical volume information 2085, which has the identifier of the specified virtual logical volume, and sets the identifier of the specified logical volume in the logical volume identifier 2090 of the virtual logical volume information 2085.

Step 18001: The storage controller 200 finds the logical volume information 2000, which has the identifier of the specified logical volume, and sets the specified capacity in the logical capacity 2002 of the logical volume information 2000.

Step 18002: The storage controller 200 executes a process for searching the storage group information 2300 and allocating a logical volume area to the storage group 280, which has an empty area corresponding to the specified capacity. Thereafter, the storage controller 200 ends the processing.

Figure 28:
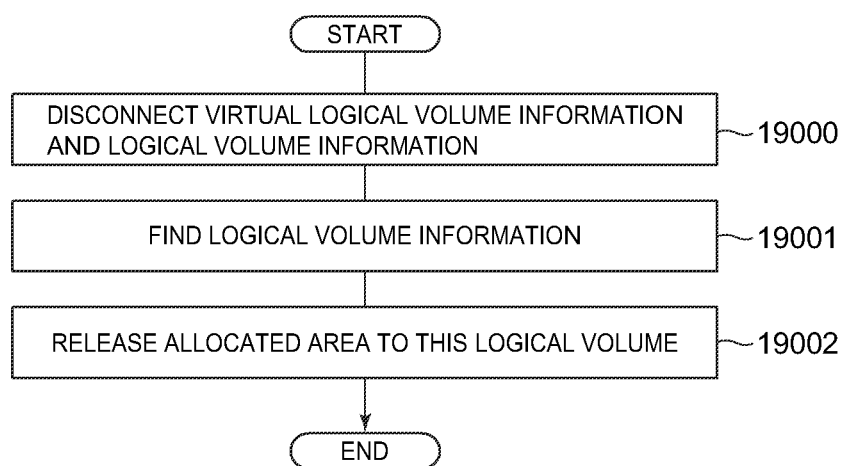
FIG. 28 is a drawing showing the processing flow of a virtual logical volume deletion part related to the first example.

FIG. 28 is a drawing showing the processing flow of a virtual logical volume deletion part related to the first example.

The virtual logical volume deletion part 4960 is executed when deleting a virtual logical volume. In accordance with this, the virtual logical volume deletion part 4960 is executed by the storage controller 200 of the real storage system 100 having the control right for the virtual logical volume to be deleted. When the virtual logical volume deletion part 4960 is executed, the identifier of the deletion-target virtual logical volume is specified.

Step 19000: The storage controller 200 finds the virtual logical volume information 2085 having the identifier of the specified virtual logical volume, stores the identifier of the logical volume stored in the logical volume identifier 2090 separately, and deletes the value of the logical volume identifier 2090.

Step 19001: The storage controller 200 finds the logical volume information 2000 having the identifier of the logical volume, which is stored separately.

Step 19002: The storage controller 200 changes the area, which has been allocated to the virtual logical volume to be deleted, to an empty area. The storage controller 200 searches the allocated storage group information 2300, and changes the area, which has been allocated to the to-be-deleted virtual logical volume, to an empty area. Thereafter, the storage controller 200 ends the processing.

Example 2

Next, an information system related to a second example will be explained.

In the information system related to a second example, a single real storage system 100 has a storage box 130 access right and logical volume allocation right. The configuration of the information system in the second example is the same as that of the first example.

The configuration of the server port information 198 related to the second example is the same as the server port information 198 related to the first example. Furthermore, the configuration of the real storage system 100 related to the second example is the same as that of the real storage system 100 related to the first example.

The configuration of the cache memory 210 related to the second example is the same as that of the cache memory 210 related to the first example.

The information in the common memory 220 of the real storage system 100 related to the second example is the same as that in the common memory 220 related to the first example. The storage system information 2060 related to the second example is the same as the storage system information 2060 related to the first example. The virtual logical volume information 2085 related to the second example is the same as the virtual logical volume information 2085 related to the first example.

The configuration of the logical volume information 2000 related to the second example is the same as that of the logical volume information 2000 related to the first example. Furthermore, the configuration of the cache management information 2750 related to the second example is the same as that of the cache management information 2750 related to the first example.

FIG. 29 is a drawing showing the configuration of storage box information related to the second example.

The difference between the storage box information 2050 related to the second example and the storage box information 2050 related to the first example is the fact that there is a control right storage system 7006 in the storage box information 2050. In the information system related to the second example, a real storage system 100 having the control right is fixed for each storage box 130. The control right storage system 7006 is the identifier of the real storage system 100 having the control right for the storage box 130 corresponding to the storage box information 2050. The other information of the storage box information 2050 is the same as that of the storage box information 2050 related to the first example.

Figure 30:
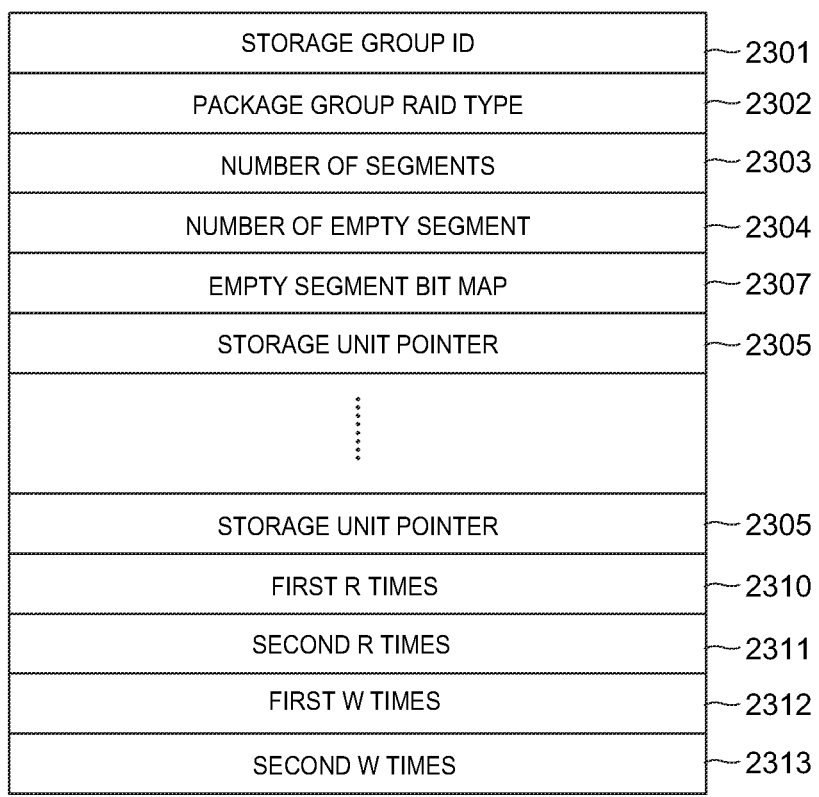
FIG. 30 is a drawing showing the configuration of storage group information related to the second example.

FIG. 30 is a drawing showing the configuration of storage group information related to the second example.

The difference between the storage group information 2300 related to the second example and the storage group information 2300 related to the first example is the fact that the storage group information 2300 related to the second example does not have the number of allocatable segments 2309 and the allocatable segment bit map 2308. This is because the real storage system 100 having the control right for the storage group 280 is fixed.

The configuration of the storage unit information 2500 related to the second example is the same as that of the storage unit information 2500 related to the first example.

Next, the operations executed by the storage controller 200 will be explained using the above-described management information. The operations of the storage controller 200 are realized in accordance with the processor 260 inside the storage controller 200 executing a program stored in the memory 270. In the second example, the programs stored in the memory 270 are the same as in the first example.

The processing flows of the read process execution part 4000, the write request receive part 4100, and the write after process execution part 4200 are the same as in the first example.

Figure 31A:
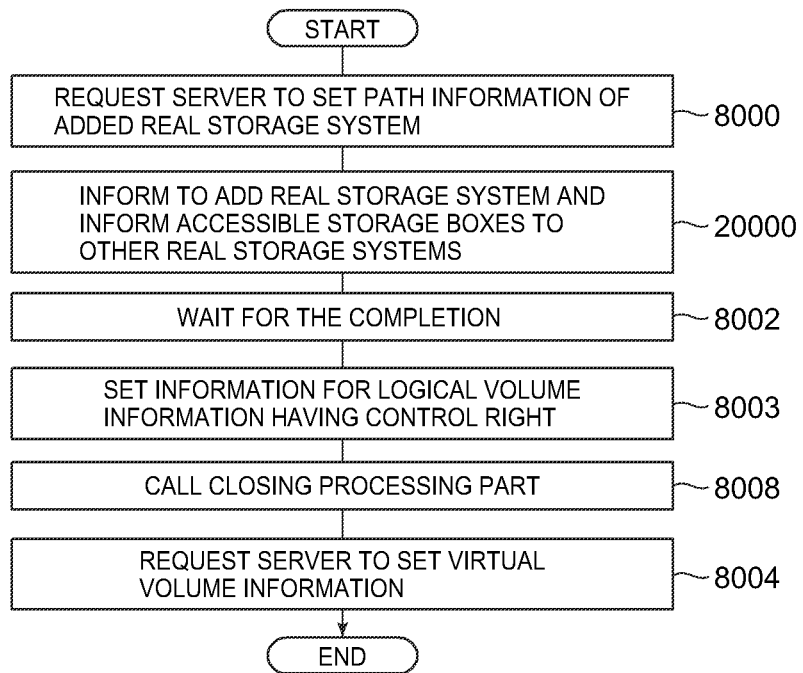
FIG. 31A is a drawing showing the processing flow of a storage system adding execution part related to the second example.

FIG. 31A is a drawing showing the processing flow of a storage system adding execution part related to the second example.

The process of this processing flow is executed by an added real storage system 100. Specifically, this process is realized in accordance with the processor 260 in the storage controller 200 of the added real storage system 100 executing the storage system adding execution part 4300.

The processing flow of the storage system adding execution part 4300 related to the second example differs from the processing flow of the storage system adding execution part 4300 related to the first example as follows.

Step 20000: The storage controller 200 notifies the other real storage systems 100 in the same virtual storage system 190 of information showing that a real storage system 100 has been added inside the virtual storage system 190 and the storage box 130, which is accessible by the relevant real storage system 100. Thus, in the second example, the allocation right is given in units of storage boxes 130.

Figure 31B:
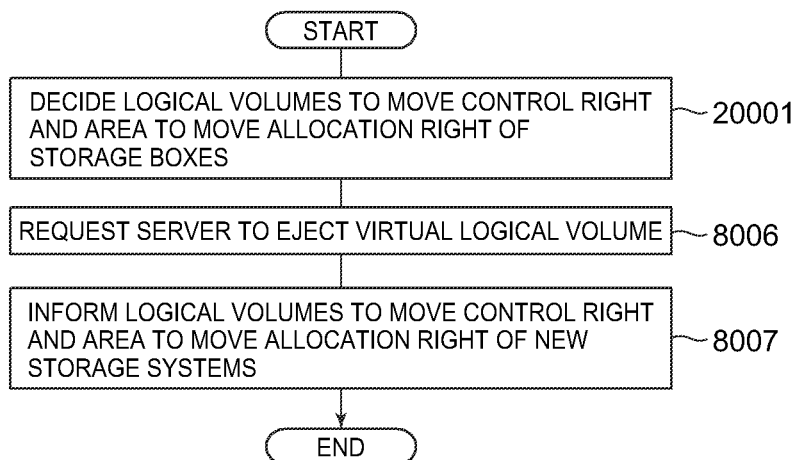
FIG. 31B is a drawing showing the processing flow of a real storage system, which has received a notification from an added real storage system related to the second example.

FIG. 31B is a drawing showing the processing flow of a real storage system, which has received a notification from an added real storage system related to the second example.

Step 20001: The storage controller 200 decides a storage box 130 for moving the control right to the added real storage system 100 from inside the notified storage box 130. In the second example, the allocation right is moved having the storage box 130 as a unit. At this time, the storage controller 200 references the second read times 2009 and the second write times 2010 in the respective logical volume information 2000. The storage controller 200 also references the second R times 2311 and the second W times 2313 in the storage group information 2300 corresponding to the storage group 280, which is allocating each logical volume.

Figure 32A:
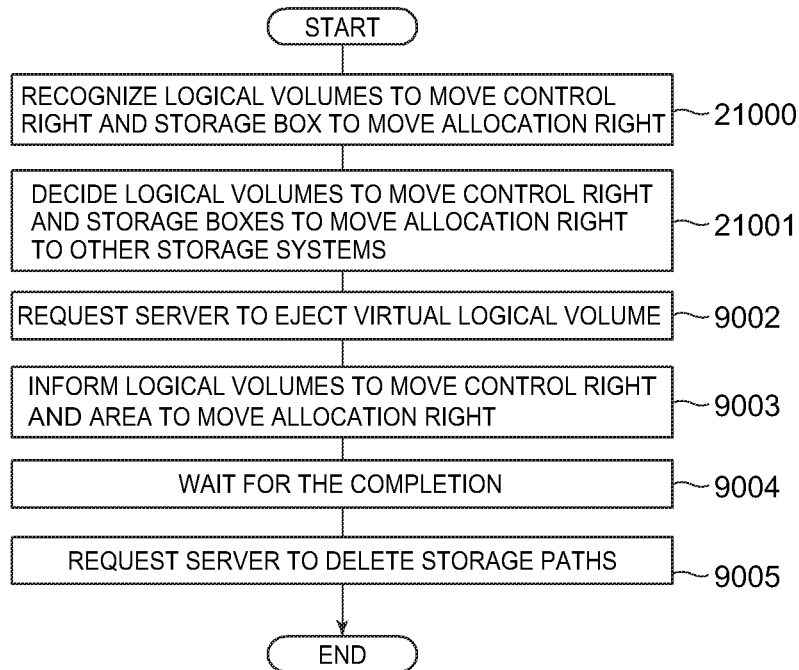
FIG. 32A is a drawing showing the processing flow of a storage system closing execution part related to the second example.

FIG. 32A is a drawing showing the processing flow of a storage system closing execution part related to the second example.

The process of this processing flow is executed by a real storage system 100, which is to be ejected. Specifically, this process is realized in accordance with the processor 260 in the storage controller 200 of the to-be-ejected real storage system 100 executing the storage system closing execution part 4400.

The processing flow of the storage system closing execution part 4400 related to the second example differs from the processing flow of the storage system closing execution part 4400 related to the first example as follows.

Step 21000, Step 21001: These steps correspond to Steps 9000 and 9001, but in the second example, a process for moving the allocation right for the storage box 130 is performed. At this time, the storage controller 200 references the second read times 2009 and the second write times 2010 in the respective logical volume information 2000. The storage controller 200 also references the second R times 2311 and the second W times 2313 in the storage group information 2300 corresponding to the storage group 280, which is allocating each logical volume.

Figure 32B:
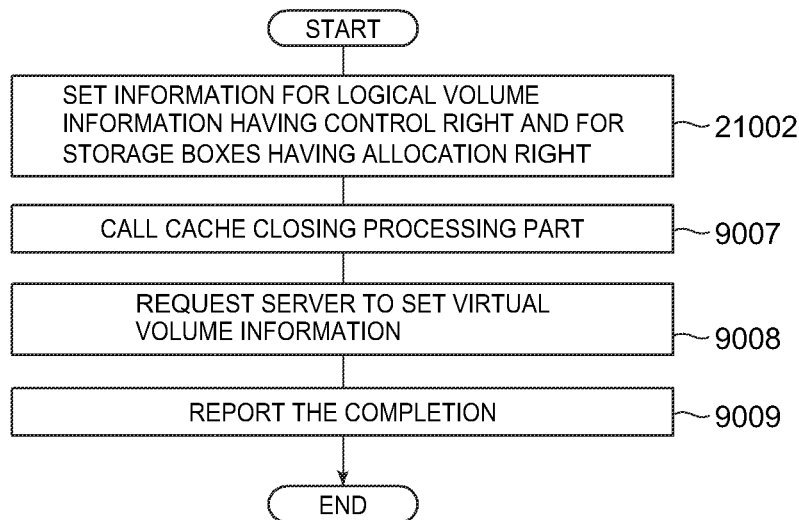
FIG. 32B is a drawing showing the processing flow of a real storage system, which has received a notification from a to-be-ejected real storage system related to the second example.

FIG. 32B is a drawing showing the processing flow of a real storage system, which has received a notification from a to-be-ejected real storage system related to the second example.

Step 21002: This step corresponds to Step 9006, but in Step 21002, the storage controller 200 is configured to obtain the allocation right in storage box 130 units.

In the second example, the same process may be performed when migrating a logical volume between real storage systems 100 to balance the loads of the real storage systems 100. An area for which the real storage system has the allocation right may also be migrated between real storage systems 100. In accordance with this, Steps 21000, Step 21001, and Step 21002 are executed in this process.

Figure 33A:
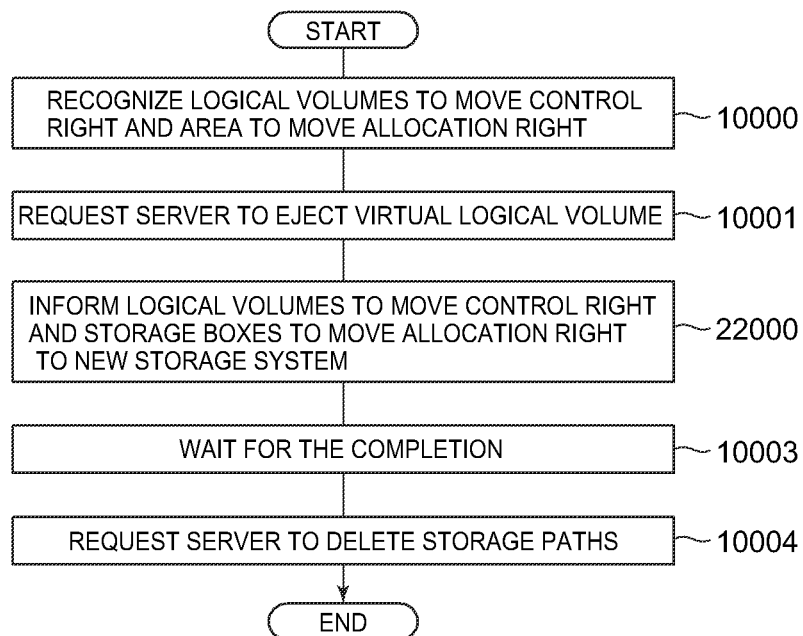
FIG. 33A is a drawing showing the processing flow of a storage system migration execution part related to the second example.

FIG. 33A is a drawing showing the processing flow of a storage system migration execution part related to the second example.

The process of this processing flow is executed by a migration-source real storage system 100. Specifically, this process is realized in accordance with the processor 260 in the storage controller 200 of the migration-source real storage system 100 executing the storage system migration execution part 4500.

The processing flow of the storage system migration execution part 4500 related to the second example differs from the processing flow of the storage system migration execution part 4500 related to the first example as follows.

Step 22000: This step corresponds to Step 10002, but in Step 22000, the storage controller 200 migrates the allocation right for the storage box 130.

Figure 33B:
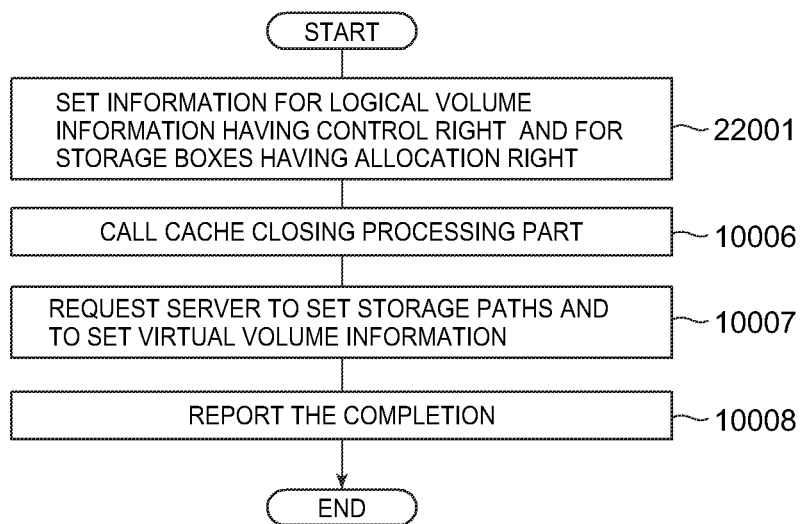
FIG. 33B is a drawing showing the processing flow of a real storage system, which has received a notification from a migration-destination real storage system related to the second example.

FIG. 33B is a drawing showing the processing flow of a real storage system, which has received a notification from a migration-destination real storage system related to the second example.

Step 22001: This step corresponds to Step 10005, but in Step 22001, the storage controller 200 is configured to obtain the allocation right in storage box 130 units.

Figure 34A:
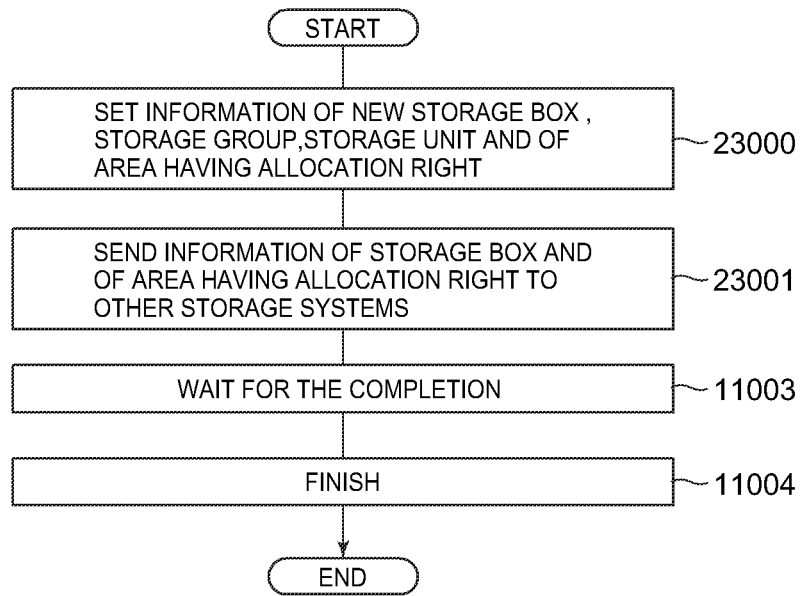
FIG. 34A is a drawing showing the processing flow of a storage box adding execution part related to the second example.

FIG. 34A is a drawing showing the processing flow of a storage box adding execution part related to the second example. The storage box adding execution part 4600 is executed by the storage controller 200 when a storage box 130 has been added. When the storage box 130 is added, the real storage system 100 connected to this storage box 130 is activated, and the storage controller 200 of this real storage system 100 executes the following processing.

The processing flow of the storage box adding execution part 4600 related to the second example differs from the processing flow of the storage box adding execution part 4600 related to the first example in that the real storage system 100 having the allocation right executes the processing as follows.

Step 23000: The storage controller 200 sets the storage box information 2050, the storage group information 2300, and the storage unit information 2500.

Step 23001: The storage controller 200 sends to the other real storage systems 100 information on the recognized storage box 130, and information to the effect the relevant storage system 100 has the allocation function.

Figure 34B:
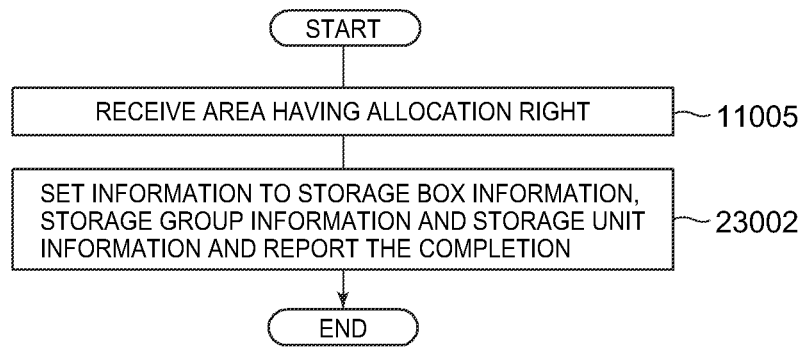
FIG. 34B is a drawing showing the processing flow of a real storage system, which has received information from a real storage system having a storage box allocation right related to the second example.

FIG. 34B is a drawing showing the processing flow of a real storage system, which has received information from a real storage system having a storage box allocation right related to the second example.

Step 23002: The storage controller 200 sets the storage box information 2050, the storage group information 2300, and the storage unit information 2500 in accordance with the received information, and ends the processing.

Figure 60:
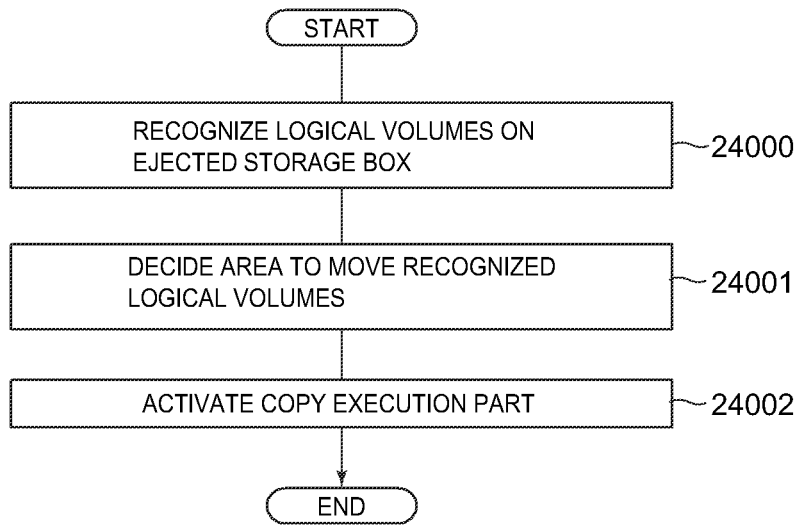
FIG. 60 is a drawing showing the processing flow of a storage box closing execution part related to the second example.

FIG. 60 is a drawing showing the processing flow of a storage box closing execution part related to the second example.

The storage box closing execution part 4700 is executed by the storage controller 200 when a storage box 130 is to be ejected. When it has been decided that the storage box 130 is to be ejected, the real storage system 100 having the control right for this storage box 130 is activated, and the storage controller 200 of this real storage system 100 executes the following processing.

Step 24000: The storage controller 200 of the real storage system 100 recognizes the logical volume defined in the to-be-ejected storage box 130.

Step 24001: The storage controller 200, from among the empty areas of the internal storage group 280 inside its own real storage system 100 and the storage box 130 for which the relevant real storage system 100, which is inside a storage box 130 other than the to-be-ejected storage box 130, has the allocation right, decides an area for migrating the logical volume, which has been defined in the to-be-ejected storage box 130, and defines the relevant area as a migration-destination logical volume. At this time, the storage controller 200 references the second read times 2009 and the second write times 2010 of the respective logical volume information 2000. The storage controller 200 also references the second R times 2311 and the second W times 2313 of the storage group information 2300 corresponding the storage group 280, which is allocating the logical volumes. Specifically, the storage controller 200 secures new logical volume information 2000 and sets the required information. In particular, at this point the storage controller 200 sets the identifier of the relevant real storage system 100, the identifier of the logical volume defined in the to-be-ejected storage box 130, and the area on the storage box 130 in which this logical volume has been defined in the migrated LUN 2016. The storage controller 200 also sets the migration flag 2015 to ON for one piece of logical volume information 2000, which, from among the logical volume information 2000, corresponds to the multiple logical volumes to be migrated, and sets the migration pointer 2017 to the first address. The storage controller 200 sets the migration waiting flag 2018 to ON for the remaining logical volume information 2000.

Step 24002: The storage controller 200 activates the copy execution part 4900. The storage controller 200 ends this processing thereafter.

Figure 35:
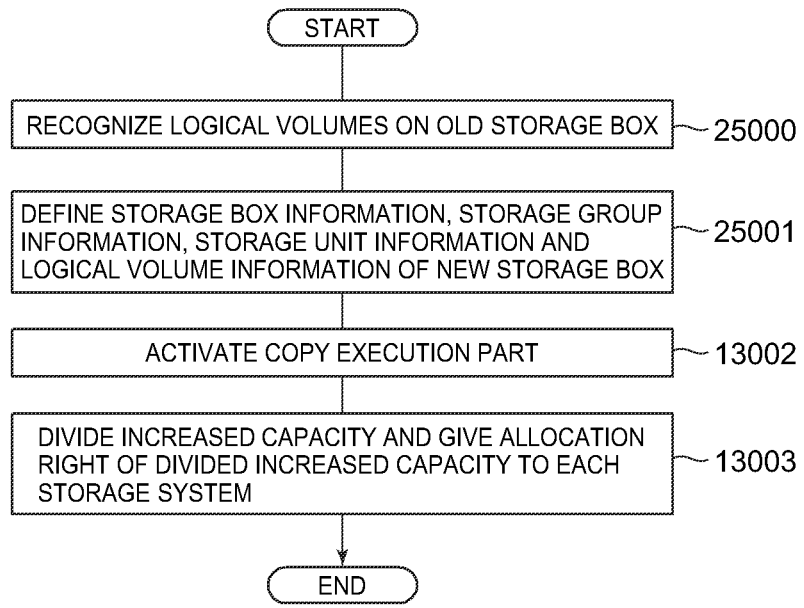
FIG. 35 is a drawing showing the processing flow of a storage box migration execution part related to the second example.

FIG. 35 is a drawing showing the processing flow of a storage box migration execution part related to the second example.

The storage box migration execution part 4800 is executed when an old storage box 130 is to be replaced with a new storage box 130. When it has been decided that a storage box 130 is to be replaced, the real storage system 100 having the control right for the old storage box 130 is activated, and the storage controller 200 of the activated real storage system 100 executes the following processing.

Step 25000: The storage controller 200 of the real storage system 100 recognizes a logical volume, which has been defined in the old storage box 130.

Step 25001: Storage controller 200 decides an area inside the new storage box 130 for storing the recognized logical volume, and defines the decided area as the migration-destination logical volume. Specifically, the storage controller 200 secures new logical volume information 2000 and sets the required information. In particular, at this point the storage controller 200 sets the identifier of the relevant real storage system 100, the identifier of the logical volume defined in the to-be-ejected storage box 130, and the area on the new storage box 130 in which this logical volume has been defined in the migrated LUN 2016 of the logical volume information 2000. The storage controller 200 also sets the migration flag 2015 to ON for one piece of logical volume information 2000, which, from among the logical volume information 2000, corresponds to the multiple logical volumes to be migrated, and sets the migration pointer 2017 to the first address. The storage controller 200 sets the migration waiting flag 2018 to ON for the remaining logical volume information 2000.

Step 25002: The storage controller 200 activates the copy execution part 4900.

The processing flow of the copy execution part 4900 related to the second example is the same as the processing flow of the copy execution part 4900 related to the first example.

Furthermore, the processing flow of the cache closing schedule part 4910 related to the second example is the same as the processing flow of the cache closing schedule part 4910 related to the first example.

The processing flow of the cache closing execution part 4920 related to the second example is the same as the processing flow of the cache closing execution part 4920 related to the first example.

Figure 36:
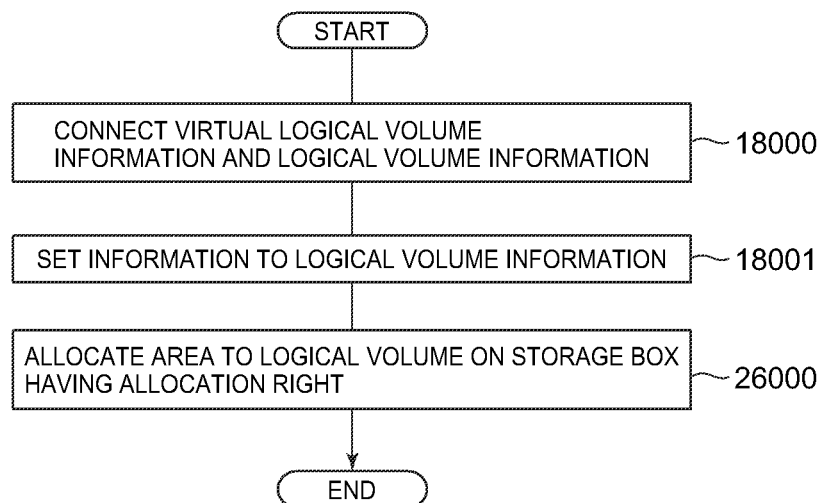
FIG. 36 is a drawing showing the processing flow of a virtual logical volume generation part related to the second example.

FIG. 36 is a drawing showing the processing flow of a virtual logical volume generation part related to the second example.

The processing flow of the virtual logical volume generation part 4950 related to the second example differs from the processing flow of the virtual logical volume generation part 4950 related to the first example as follows.

Step 26000: The storage controller 200 defines a logical volume inside the storage box 130 for which the relevant real storage system 100 has the allocation right.

The processing flow of the virtual logical volume deletion part 4960 related to the second example is the same as the processing flow of the virtual logical volume deletion part 4960 related to the first example.

Example 3

Next, an information system related to a third example will be explained.

The configuration of the information system related to the third example is the same as that of the information system related to the first example. In the third example, the real storage system 100 has a capacity virtualization function.

The configuration of the real storage system 100 related to the third example is the same as that of the real storage system 100 related to the first example. The configuration of the server port information 198 related to the third example is the same as that of the server port information 198 related to the first example.

The configuration of the cache memory 210 related to the third example is the same as that of the cache memory 210 related to the first example.

Figure 37:
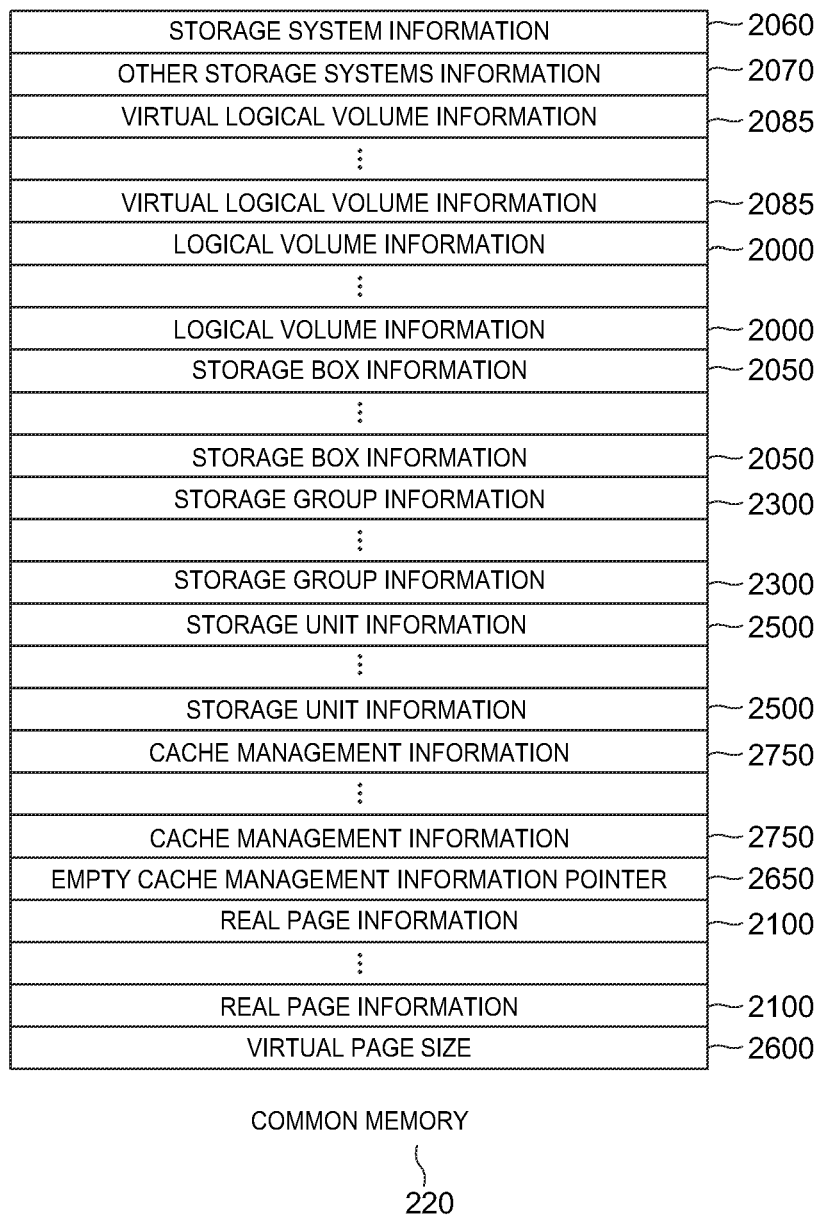
FIG. 37 is a drawing showing information stored in a common memory relate to a third example.

FIG. 37 is a drawing showing information stored in a common memory related to the third example.

The common memory 220 stores storage system information 2060, other storage systems information 2070, virtual logical volume information 2085, logical volume information 2000, storage box information 2050, a real page information 2100, storage group information 2300, storage unit information 2500, a virtual page size 2600, cache management information 2750, and an empty cache management information pointer 2650. The storage system information 2060 related to the third example is the same as the storage system information 2060 related to the first example. Furthermore, the virtual logical volume information 2085 related to the third example is the same as the virtual logical volume information 2085 related to the first example. The virtual logical volume information 2085 is created corresponding to each virtual logical volume.

FIG. 38 is a drawing showing the configuration of logical volume information related to the third example.

The logical volume information 2000 related to the third example differs from the logical volume information 2000 related to the first example in that it comprises a real page pointer 2004 instead of an allocation extent 2006. In the third example, the real storage system 100 has a capacity virtualization function. The capacity virtualization function is for allocating a page, which comprises a written area, for the first time when there is a write request, rather than allocating a physical area when the logical volume is defined. The logical volume is partitioned into page-size pages, a page in a virtual volume space is called a virtual page, and the page, which is actually allocated, is called the real page. Thus, the logical volume information 2000 has the real page pointers 2004 in the number obtained by dividing the defined capacity of the logical volume by the size of the virtual page, and the address of this real page information 2100 is configured in the real page pointer 2004 when a real page has been allocated to a virtual page.

In the third example, the storage system 100 supports the capacity virtualization function. Ordinarily, the storage area allocation unit in the capacity virtualization function is called a page. The logical volume is ordinarily a logical storage unit with respect to which the server 110 performs a read/write. However, in this example, an area of the storage unit used for caching is defined as the logical volume. The capacity virtualization function is also applied to this logical volume to secure a real storage area by allocating a page. Furthermore, in this example, it is supposed that the virtual volume space is partitioned using a unit called a virtual page, and that the actual storage group 280 is partitioned using a unit called a real page. In capacity virtualization, the storage capacity of the virtual volume is made to appear larger than the capacity of the actual storage medium. Thus, the number of virtual pages is generally larger than the number of real pages. In a case where the capacity virtualization function has been realized, the storage controller 200 allocates a real page when a real page has yet to be allocated to a virtual page, which comprises an address to which a write has been instructed by a write request from the server 110. The virtual page size 2600 is the capacity of the virtual page. However, in this example, the virtual page size 2600 does not equal the capacity of the real page. This is because the capacity of the real page comprises parity data, which differs in accordance with the RAID type. Therefore, the capacity of the real page is decided in accordance with the RAID type of the storage group 280 to which this real page is allocated. For example, in a case where data is written in duplicate as in RAID 1, the capacity of the real page is twice that of the virtual page size 2600. In a case where parity data for one storage unit worth of capacity is stored for N storage units of capacity as in RAID 5, a capacity of (N+1)/N of the virtual page size 2600 is secured. Naturally, in a case where there is no parity as in RAID 0, a capacity equal to the virtual page size 2600 constitutes the capacity of the real page. In this example, the virtual page size 2600 is consistent inside the real storage system 100, but the real storage system 100 of which the virtual page size 2600 differs may exist. Furthermore, in this example, it is supposed that the respective storage groups are configured using RAID 5. Of course, a storage group may be configured using an arbitrary RAID group.

The configuration of the cache management information 2750 related to the third example is the same as the configuration of the cache management information 2750 related to the first example.

The data configuration of the empty cache information management queue 2201, which is managed using the empty cache management information pointer 2650 related to the third example, is the same as the data configuration of the empty cache information management queue 2201 related to the first example.

The configuration of the storage box information 2050 related to the third example is the same as that of the storage box information 2050 related to the first example.

Figure 39:
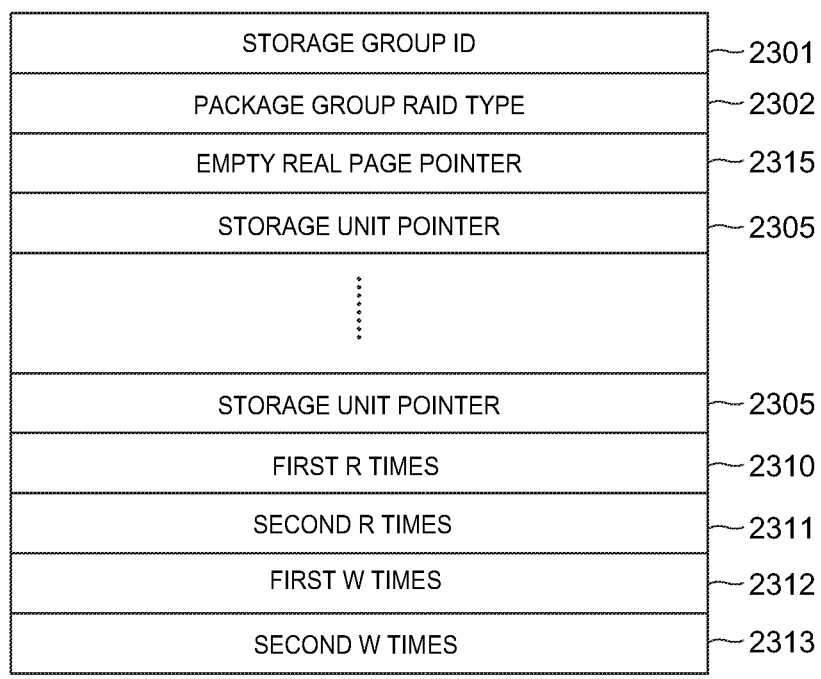
FIG. 39 is a drawing showing the configuration of storage group information related to the third example.

FIG. 39 is a drawing showing the configuration of storage group information related to the third example.

The storage group information 2300 related to the third example comprises an empty real page pointer 2315 instead of the number of segments 2303, the number of allocatable segments 2309, the number of empty segments 2304, the allocatable segment bit map 2308, and the empty segment bit map 2307 included in the storage group information 2300 related to the first example.

Figure 40:
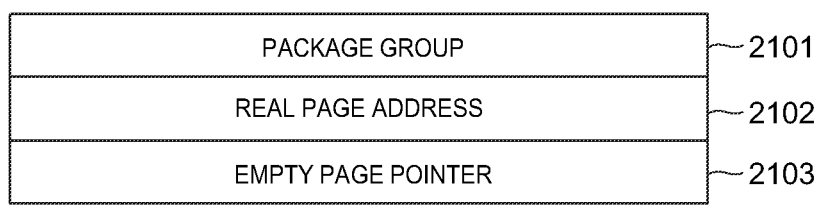
FIG. 40 is a drawing showing the configuration of real page information related to the third example.

FIG. 40 is a drawing showing the configuration of real page information related to the third example.

The real page information 2100 is management information which exists for each real page for managing the real pages. The real page information 2100 comprises a package group 2101, a real page address 2102, and an empty page pointer 2103.

The package group 2101 shows the storage unit 160 to which a real page corresponding to the real page information 2100 is allocated. The real page address 2102 is information showing a relative address to which a real page is allocated inside the storage group 280. The real page pointer 2103 is a valid value when a virtual page is not allocated to this real page. The value of the empty page pointer 2103 in a case where a virtual page is not allocated to this real page points to the real page information 2100, which corresponds to the next empty page to which a virtual page is not allocated inside the storage group 280.

Figure 41:
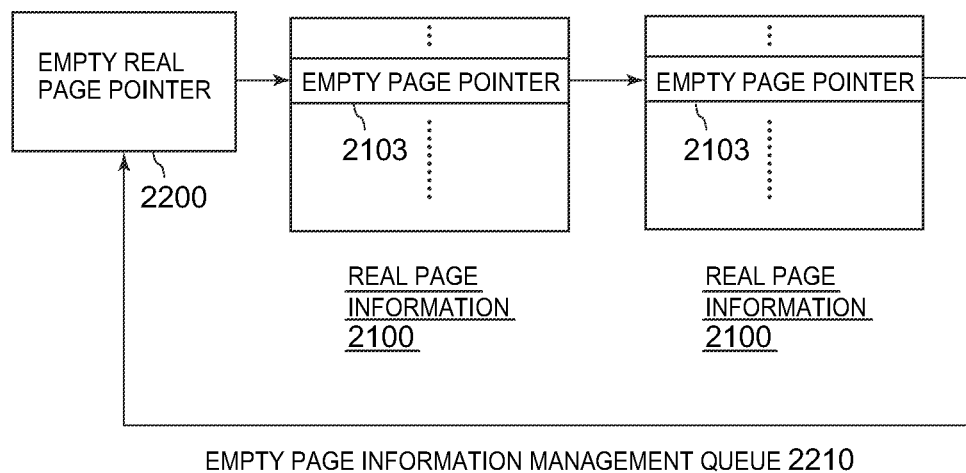
FIG. 41 is a drawing showing the configuration of an empty page information management queue related to the third example.

FIG. 41 is a drawing showing the configuration of an empty page information management queue related to the third example.

An empty real page pointer 2200 is information provided for each storage group 280. The empty page information management queue 2210 represents a set of empty real pages managed in accordance with the empty real page pointer 2200. An empty real page signifies a real page, which is not allocated to a virtual page. The real page information 2100 corresponding to the empty real page is called the empty real page information 2100. The empty real page pointer 2200 points to the address of the first empty real page information 2100. An empty page pointer 2103 inside the first empty real page information 2100 indicates the next empty real page information 2100. In FIG. 41, the empty real page pointer 2103 of the last empty real page information 2100 shows the empty real page pointer 2200, but may be a NULL value. The storage controller 200, upon receiving a write request for a virtual page, which is not allocated to a real page, searches for an empty real page based on the empty real page pointer 2200, which corresponds to any storage group 280 that corresponds to the logical volume RAID group type 2003 and the allocation extent 2006, for example, the storage group 280 having the largest number of empty real pages from among the relevant storage groups 280, and allocates this empty real page to the virtual page.

The configuration of the storage unit information 2500 related to the third example is the same as the configuration of the storage unit information 2500 related to the first example.

Next, the operations executed by the storage controller 200 will be explained using the above-described management information. The operations of the storage controller 200 are realized in accordance with the processor 260 inside the storage controller 200 executing a program stored in the memory 270. In the third example, the programs stored in the memory 270 are the same as in the first example.

Figure 42A:
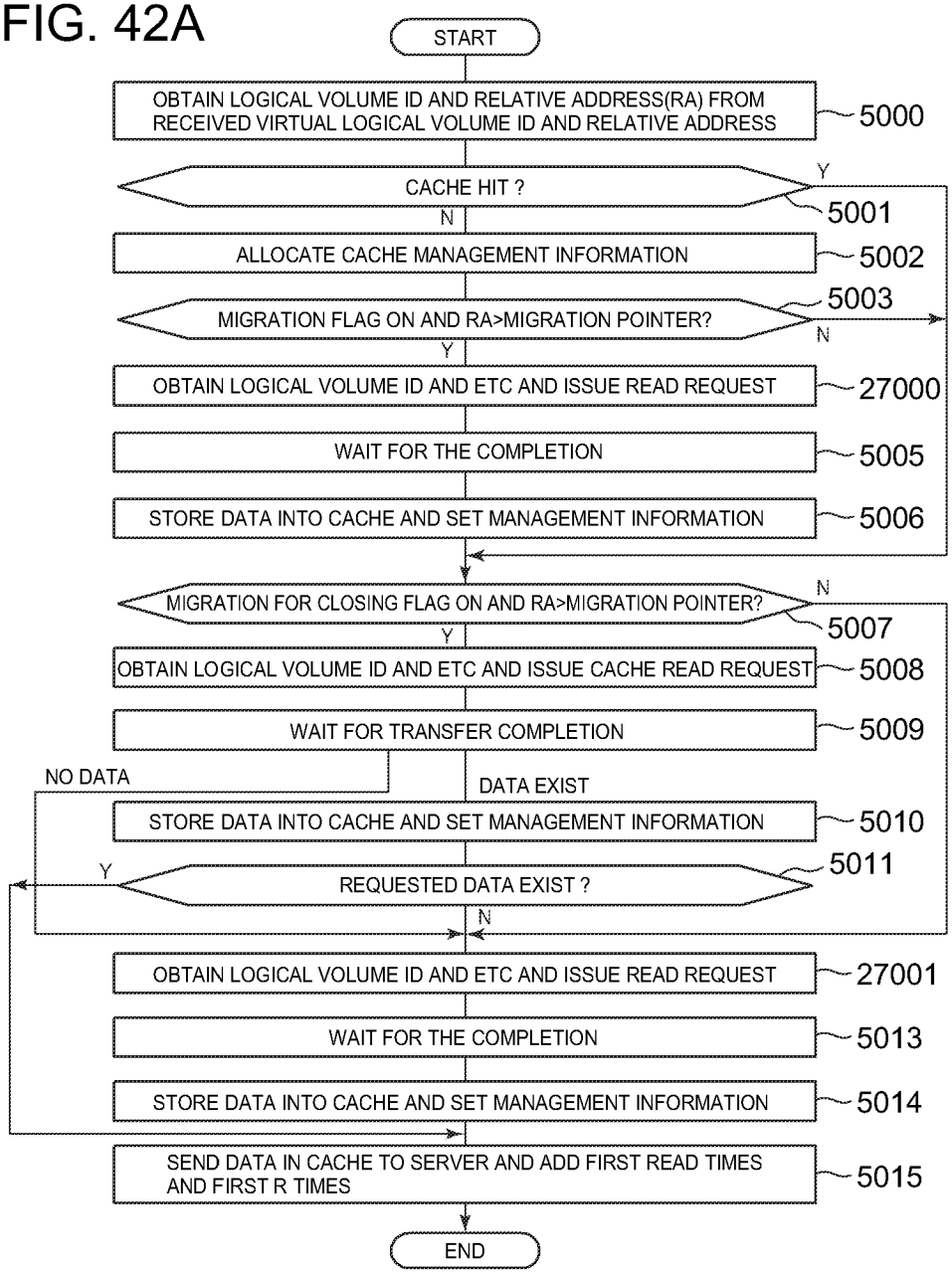
FIG. 42A is a drawing showing the processing flow of a read process execution part related to the third example.
Figure 42B:
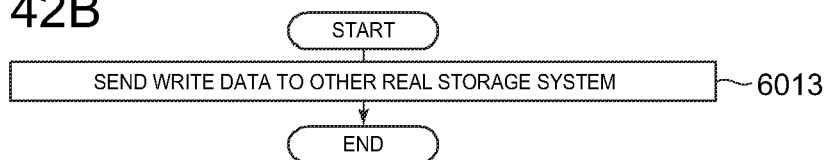
FIG. 42B is a drawing showing the processing flow of a real storage system, which has been requested to transfer write data of a cache memory related to the third example.

FIG. 42A is a drawing showing the processing flow of a read process execution part related to the third example. FIG. 42B is a drawing showing the processing flow of a real storage system, which has been requested to transfer write data of a cache memory related to the third example.

The read process execution part 4000 is executed when the storage controller 200 has received a read request from the server 110. The processing flow of the read process execution part 4000 related to the third example differs from the processing flow of the read process execution part 4000 related to the first example as follows.

The following step is executed in place of Step 5004.

Step 27000: The storage controller 200 requests that the real storage system 100, which corresponds to the identifier stored in the migrated LUN 2016 of the logical volume information 2000 corresponding to a logical volume shown by the read request, read data by specifying the storage port and the logical volume identifier stored in the migrated LUN 2016, and the address specified in the read request. There may be cases where the real storage system 100 is its own real storage system 100. In accordance with this, the storage controller 200, based on the identifier of the logical volume stored in the migrated LUN 2016, recognizes the corresponding logical volume information 2000. The storage controller 200 references the real page pointer 2004 of the corresponding address, recognizes the storage group information 2300, which corresponds to the storage group 280 comprising the real page, recognizes, based on the RAID type and so forth, the storage unit 160 comprising the requested data and the address thereof, and issues a read request to the relevant storage unit 160.

The following step is executed in place of Step 5012.

Step 27001: The storage controller 200, based on the identifier of the logical volume, recognizes the corresponding logical volume information 2000. The storage controller 200 references the real page pointer 2004 of the corresponding address, recognizes the storage group information 2300, which corresponds to the storage group 280 comprising the real page, recognizes, based on the RAID type and so forth, the storage unit 160 comprising the requested data and the address thereof, and issues a read request to the relevant storage unit 160.

Figure 43A:
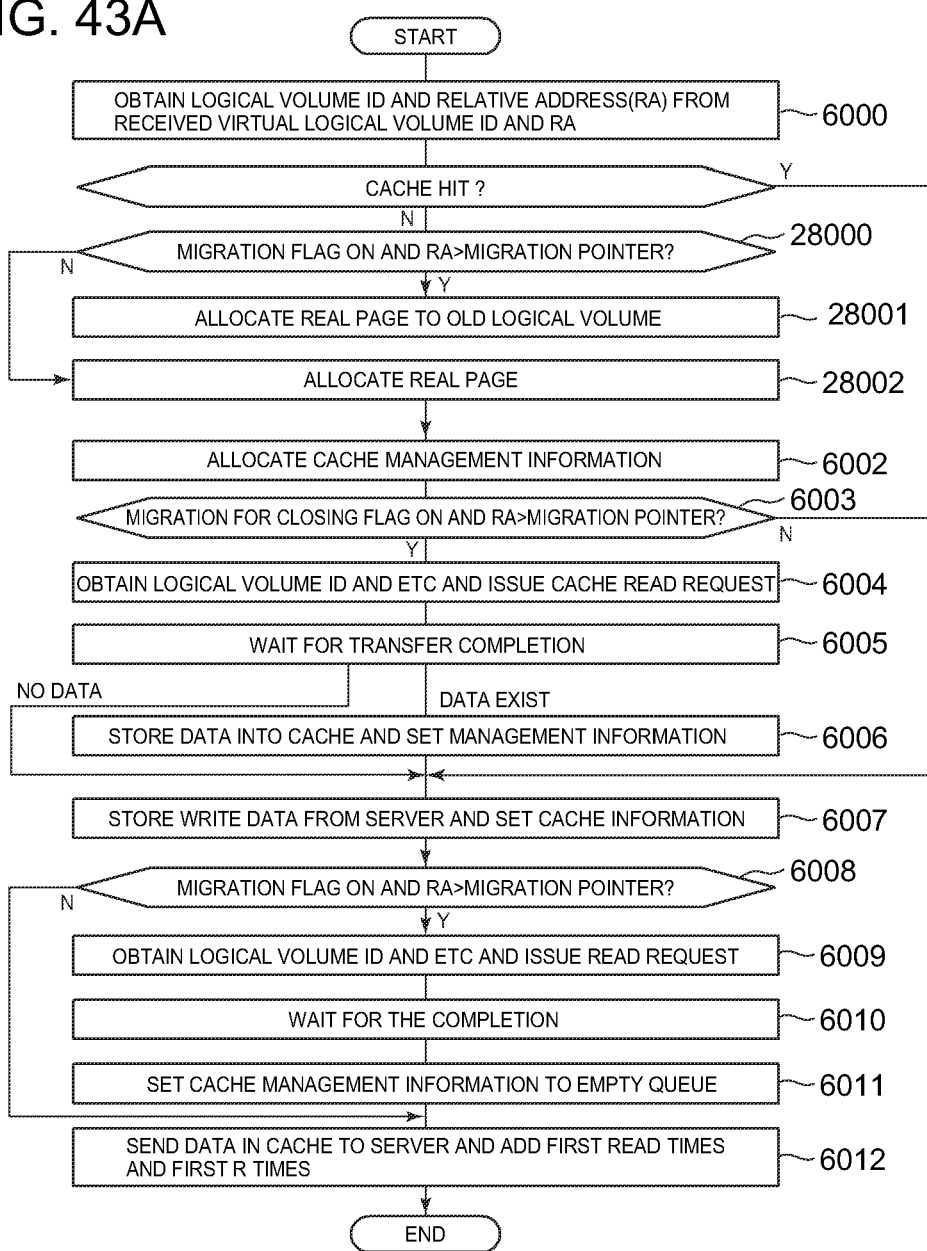
FIG. 43A is a drawing showing the processing flow of a write request receive part related to the third example.
Figure 43B:
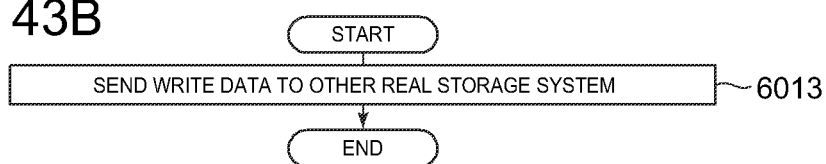
FIG. 43B is a drawing showing the processing flow of a real storage system, which has been requested to transfer write data of the cache memory related to the third example.

FIG. 43A is a drawing showing the processing flow of a write request receive part related to the third example. FIG. 43B is a drawing showing the processing flow of a real storage system, which has been requested to transfer write data of the cache memory related to the third example.

The write request receive part 4100 is executed when the storage controller 200 has received a write request from the server 110.

The difference between the processing flow of the write request receive part 4100 related to the third example and the processing flow of the write request receive part 4100 related to the first example will be explained here.

The following step is inserted in front of Step 6002.

Step 28000: The storage controller 200 checks the migration flag 2015 of the processing-target logical volume information 2000, and in a case where the migration flag 2015 is OFF (Step 28000: N), has the processing jump to Step 28002. Alternatively, in a case where the migration flag 2015 is ON, the storage controller 200 checks whether or not the migration flag 2015 is smaller than the address to be written to, and in a case where the migration flag 2015 is smaller than the address to be written to (Step 28000: N), has the processing jump to Step 28002.

Step 28001: The storage controller 200 references the migrated LUN 2016 of the logical volume information 2000, and in a case where a copy-source logical volume is the logical volume of the relevant real storage system 100, references the corresponding real page pointer 2004, and in a case where a real page is not allocated, selects the storage group information 2300 of the appropriate storage group, identifies the real page information 2100 from the empty real page information pointer 2315, and allocates a real page. Thereafter, the storage controller 200 has the processing jump to Step 6002.

Step 28002: The storage controller 200 references the real page pointer 2004 based on the address to be written to, references whether or not a real page is allocated to the area of the address to be written to, and in a case where a real page is not allocated, selects the storage group information 2300 of the appropriate storage group 280, identifies the real page information 2100 from the empty real page information pointer 2315, and allocates a real page.

Figure 44:
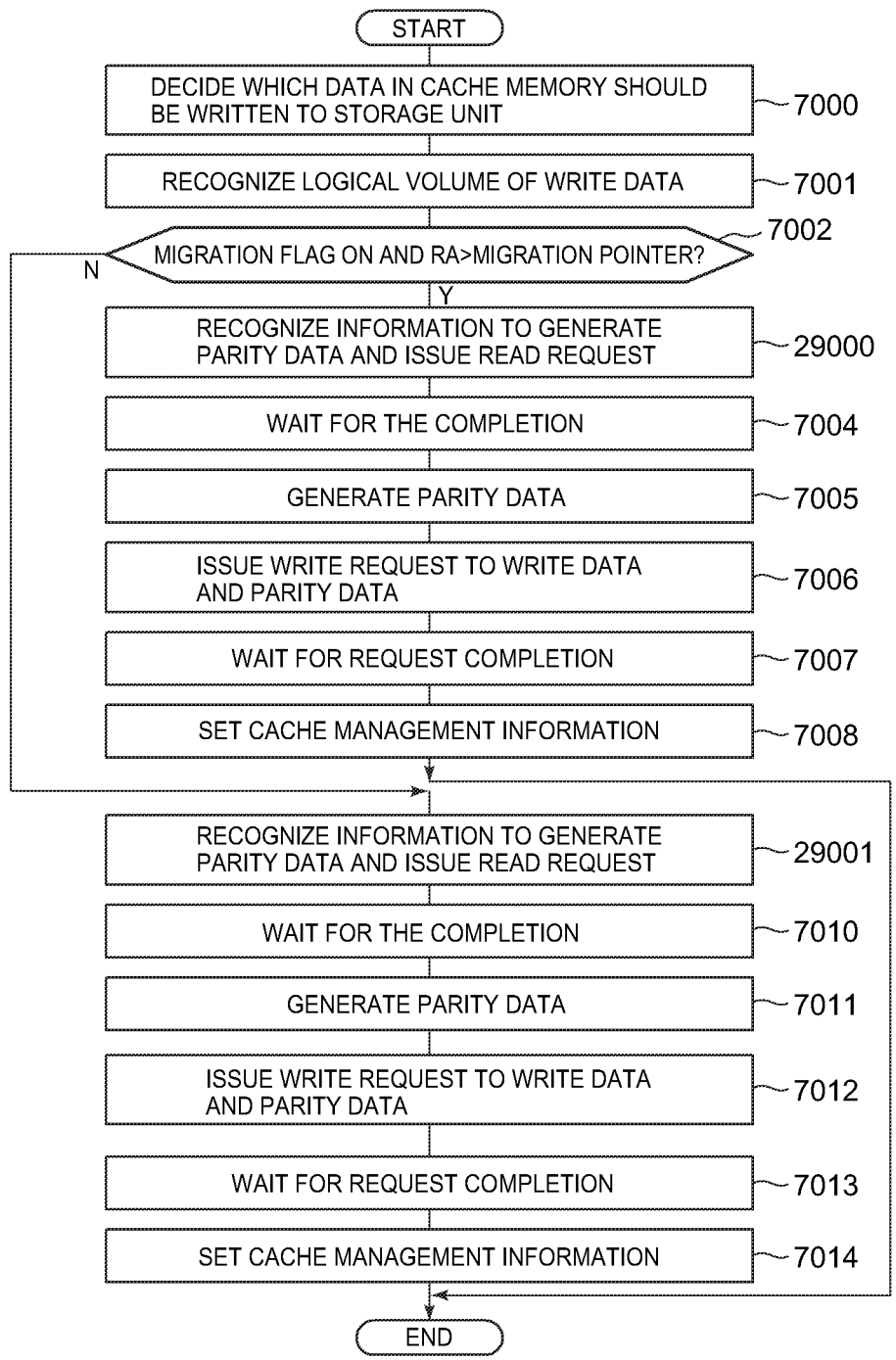
FIG. 44 is a drawing showing the processing flow of a write after process execution part related to the third example.

FIG. 44 is a drawing showing the processing flow of a write after process execution part related to the third example.

The difference between the processing flow of the write after process execution part 4200 related to the third example and the processing flow of the write after process execution part 4200 related to the first example will be explained here.

The following step is inserted in place of Step 7003.

Step 29000: The processor 260 recognizes the corresponding logical volume information 2000 based on the identifier of the logical volume stored in the migrated LUN 2016. In addition, the processor 260 recognizes the real page pointer 2004, and recognizes the address of the real page to which the write will be performed. Based on the RAID type and so forth, the processor 260 recognizes the storage unit 160 and the address thereof, and issues a read request to the relevant storage unit 160 in order to read the information required to generate parity data corresponding to the write data.

The following step is inserted in place of Step 7009.

Step 29001: The processor 260 references the real page pointer 2004 of the logical volume information 2000 corresponding to the logical volume, recognizes the corresponding storage group 280, and recognizes the area to be written to. In addition, the processor 260, based on the RAID type and so forth, recognizes the storage unit 160 and the address thereof for reading the information required to generate parity data, which corresponds to the write data, and issues a read request to the relevant storage unit 160.

Figure 45A:
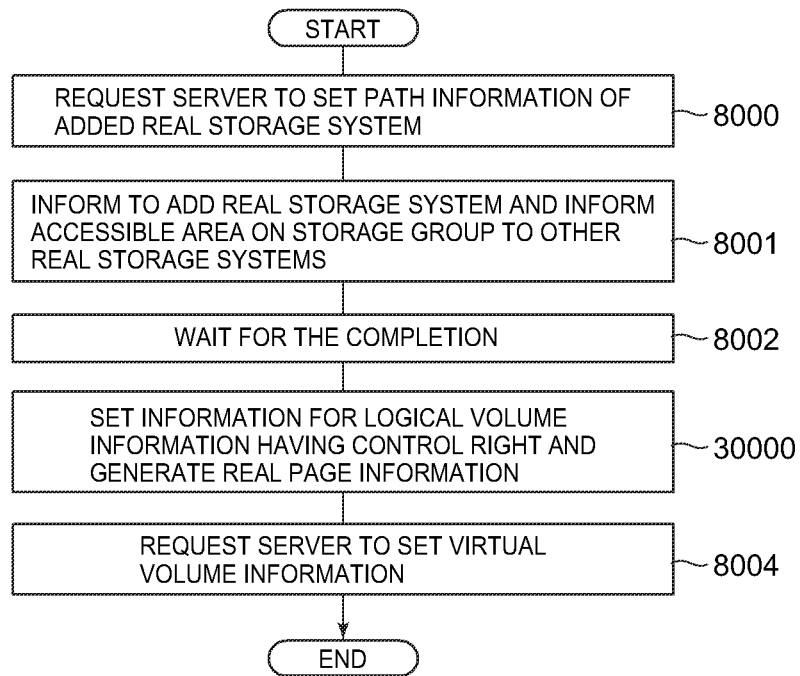
FIG. 45A is a drawing showing the processing flow of a storage system adding execution part related to the third example.

FIG. 45A is a drawing showing the processing flow of the storage system adding execution part 4300 related to the third example.

The process of this processing flow is executed by a real storage system 100, which has been added. The difference between the processing flow of the storage system adding execution part 4300 related to the third example and the processing flow of the storage system adding execution part 4300 related to the first example will be explained here.

The following step is inserted in place of Step 8003.

Step 30000: The storage controller 200 sets a set of logical volumes, which have obtained the control right, in the virtual logical volume information 2085 and the logical volume information 2000. The storage controller 200 also generates real page information 2100 for each real page of a set of real pages allocated to the logical volume and performs the required information settings, and sets the corresponding real page pointer 2004 so as to show the real page information 2100. In addition, the storage controller 200 generates real page information 2100 related to a real page to which the allocation right was given, and registers this real page information 2100 in the empty real page pointer 2315 of the storage group information 2300, which corresponds to the corresponding storage group 280.

Figure 45B:
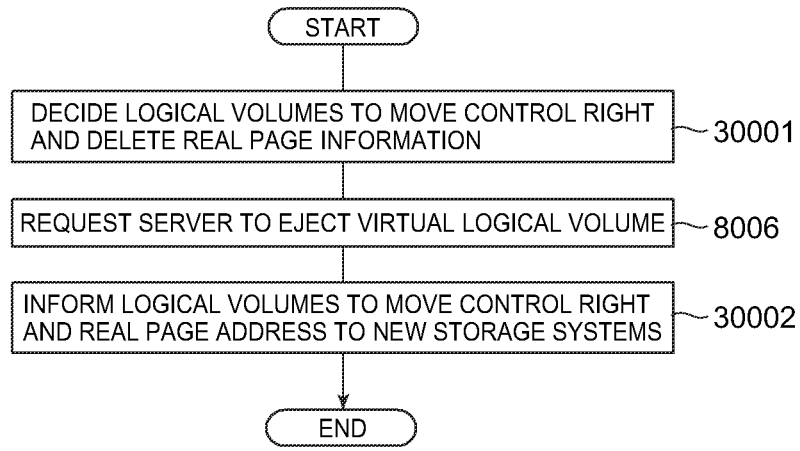
FIG. 45B is a drawing showing the processing flow of a real storage system, which has received a request from an added real storage system related to the third example.

FIG. 45B is a drawing showing the processing flow of a real storage system, which has received a request from an added real storage system related to the third example.

The following step is inserted in place of Step 8005.

Step 30001: The storage controller 200 of the real storage system 100, which received the notification, performs the following processing having as the processing target the storage box 130 for which the added real storage system 100 has the access right, and, in addition, the relevant real storage system 100 has the access right. In a case where there is no processing-target storage box 130, the storage controller 200 notifies the added real storage system 100 to this effect. First, the storage controller 200 ascertains all of the logical volumes defined on the processing-target storage box 130, decides on a set of logical volumes for moving the control right in the added real storage system 100, and, in addition, references the real page pointer 2004, recognizes the address of the real page from the allocated real page information 2100, and deletes the corresponding real page information 2100. When deciding this set of logical volumes, the storage controller 200 references the second read times 2009 and the second write times 2010 of the respective logical volume information. The storage controller 200 also references the second R time 2311 and the second W times 2313 of the storage group information 2300 corresponding to the storage group 280, which is allocating each logical volume. In addition, the storage controller 200 decides an empty real page for moving the allocation right inside the storage group 280 to which the processing-target storage box 130 belongs. The storage controller 200 recognizes the address of the real page from the real page information 2100, which corresponds to the decided empty real page. In addition, the storage controller 200 removes this real page information 2100 from the empty page information management queue 2210, and deletes this real page information 2100.

The following step is inserted in place of Step 8007.

Step 30002: The storage controller 200 notifies the added real storage system 100 of a virtual logical volume and a set of logical volumes for moving the control right, and of address information of the real page allocated to the corresponding logical volume and a set of addresses of the real page for moving the allocation right, and ends the processing.

Figure 46A:
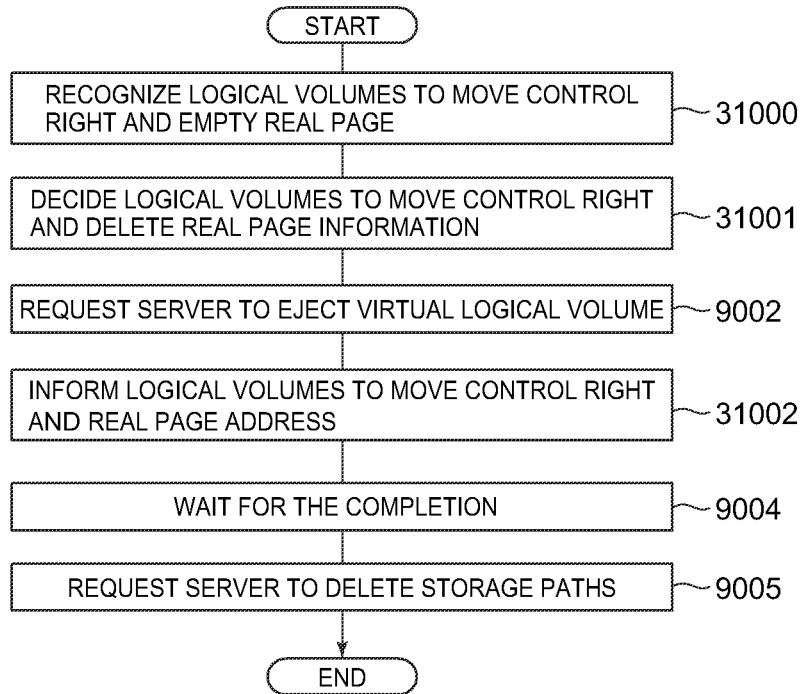
FIG. 46A is a drawing showing the processing flow of a storage system closing execution part related to the third example.

FIG. 46A is a drawing showing the processing flow of a storage system closing execution part related to the third example.

The process of this processing is executed by a real storage system 100, which is to be ejected. The same reference signs are appended to steps, which are the same as those of the processing flow of the storage system closing execution part 4400 related to the first example, and explanations of these steps will be omitted.

Step 31000: The storage controller 200 of the to-be-ejected real storage system 100 references the logical volume information 2000, and recognizes the logical volume defined in the storage box 130. In addition, the storage controller 200 recognizes an empty real page for each storage group 280 of the respective storage boxes 130.

Step 31001: The storage controller 200 decides the real storage system 100 to which each real page having the control right and the allocation right for the logical volume is to be migrated. The storage controller 200 ascertains the address of the real page allocated to the logical volume, deletes the corresponding real page information 2100, ascertains the address of the real page for moving the allocation right, and deletes the corresponding real page information 2100. When deciding the logical volume for moving the control right and the real page for moving the allocation right, the storage controller 200 references the second read times 2009 and the second write times 2010 of the respective logical volume information 2000. The storage controller 200 also references the second R times 2311 and the second W times 2313 of the storage group 280, which allocates each logical volume.

Step 31002: The storage controller 200 notifies the relevant real storage system 100 of the virtual logical volume decided for moving the control right and the set of logical volumes for moving the control right, and the address information of the real page allocated to the corresponding logical volume and the set of addresses of the real page for moving the allocation right.

Figure 46B:
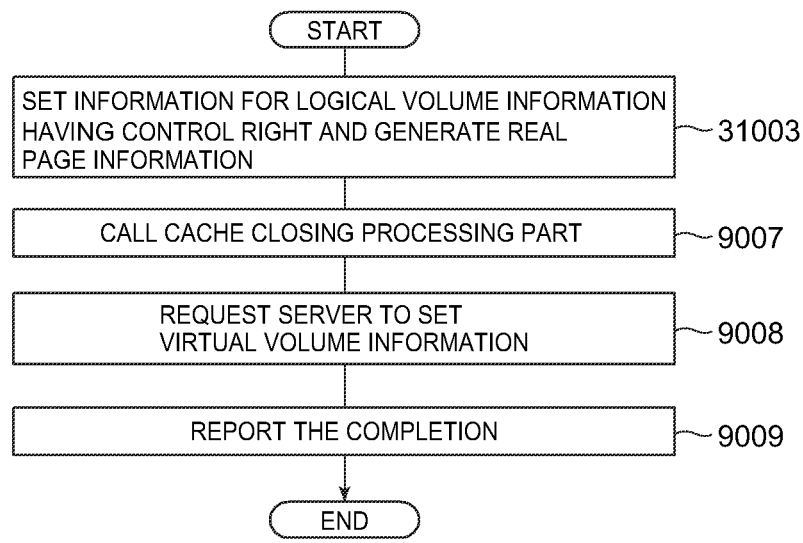
FIG. 46B is a drawing showing the processing flow of a real storage system, which has received a request from a to-be-closed real storage system related to the third example.

FIG. 46B is a drawing showing the processing flow of a real storage system, which has received a request from a to-be-closed real storage system related to the third example.

Step 31003: The storage controller 200 of the real storage system 100, which received the notification, sets virtual logical volume information and logical volume information received from the to-be-closed real storage system 100 as the virtual logical volume information 2085 and the logical volume information 2000 of its own common memory 220. However, the relevant real storage system 100 decides the logical volume identifier and sets this identifier in the virtual logical volume information 2085 and the logical volume information 2000. The storage controller 200 also generates the real page information 2100 for each real page allocated to the logical volume, and sets the real page address 2102 and other such required information in the real page information 2100. The storage controller 200 also sets the address of the real page information 2100 in the corresponding real page pointer 2004. The storage controller 200 generates, in the real storage system 100, the real page information 2100 corresponding to the real page, which has been decided for moving the allocation right, sets the required information, and registers the generated real page information 2100 in the empty page information management queue 2210.

In the third example as well, the same processing as was described hereinabove may be performed when migrating a logical volume between real storage systems 100 in order to balance the loads on the real storage systems 100. An area for which the real storage system has the allocation right may also be migrated between real storage systems 100. In accordance with this, in this process, the storage controller 200 executes Step 31000, Step 31001, Step 31002, and Step 31003.

Figure 47A:
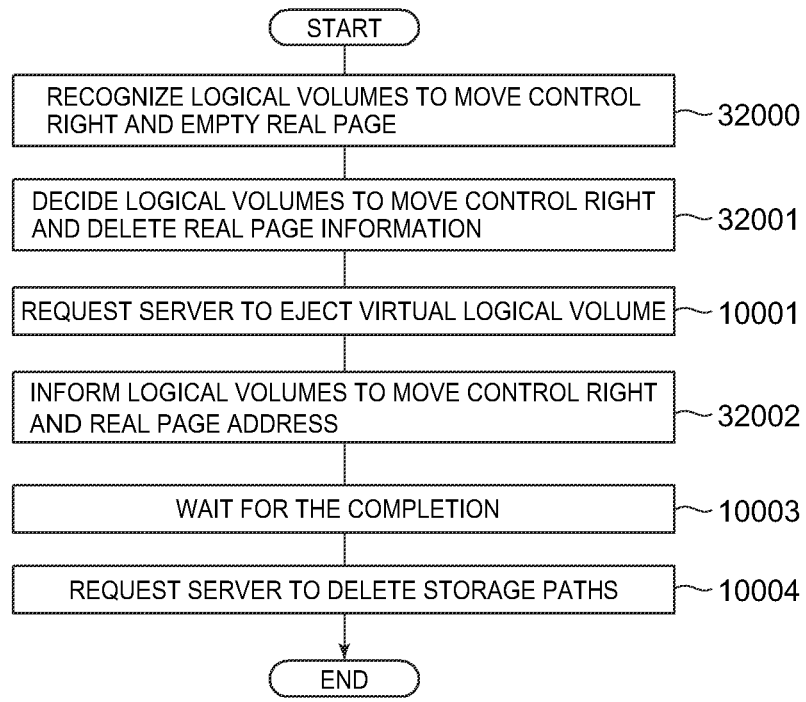
FIG. 47A is a drawing showing the processing flow of a storage system migration execution part related to the third example.

FIG. 47A is a drawing showing the processing flow of a storage system migration execution part related to the third example.

The process of this processing is executed by a migration-source real storage system 100.

Step 32000: The storage controller 200 of the migration-source real storage system 100 references the logical volume information 2000, and recognizes the logical volume defined in the storage box 130. In addition, the storage controller 200 recognizes an empty real page for each storage group 280 of the respective storage boxes 130.

Step 32001: The storage controller 200 decides the real storage system 100 to which each of the control right of the logical volume and the real page having the allocation right is to be migrated. The storage controller 200 ascertains the address of the real page allocated to the logical volume, deletes the corresponding real page information 2100, ascertains the address of the real page for moving the allocation right, and deletes the corresponding real page information 2100.

Step 32002: The storage controller 200 notifies the migration-destination real storage system 100 of the virtual logical volume decided for moving the control right and the set of logical volumes for moving the control right, and the address information of the real page allocated to the corresponding logical volume and the set of addresses of the real page for moving the allocation right.

Figure 47B:
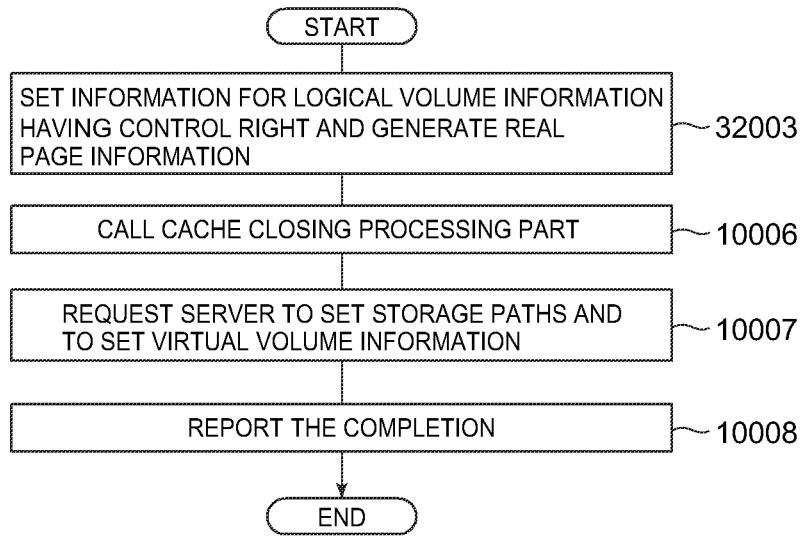
FIG. 47B is a drawing showing the processing flow of a real storage system, which has received a request from a migration-destination real storage system related to the third example.

FIG. 47B is a drawing showing the processing flow of a real storage system, which has received a request from a migration-destination real storage system related to the third example.

Step 32003: The storage controller 200 of the migration-destination real storage system 100 sets virtual logical volume information and logical volume information, which were received from the migration-destination real storage system 100 in the virtual logical volume information 2085 and the logical volume information 2000. However, the relevant real storage system 100 decides the identifier of the logical volume, and sets this identifier in the logical volume identifier 2090 of the virtual logical volume information 2085 and in the logical volume identifier 2001 of the logical volume information 2000. The storage controller 200 also generates the real page information 2100 for each real page in the logical volume, and sets the real page pointer 2004 and other such required information. The storage controller 200 generates, in the real storage system 100, the real page information 2100 corresponding to the real page, which has been decided for moving the allocation right, sets the required information, and registers the generated real page information 2100 in the empty page information management queue 2210.

Figure 48A:
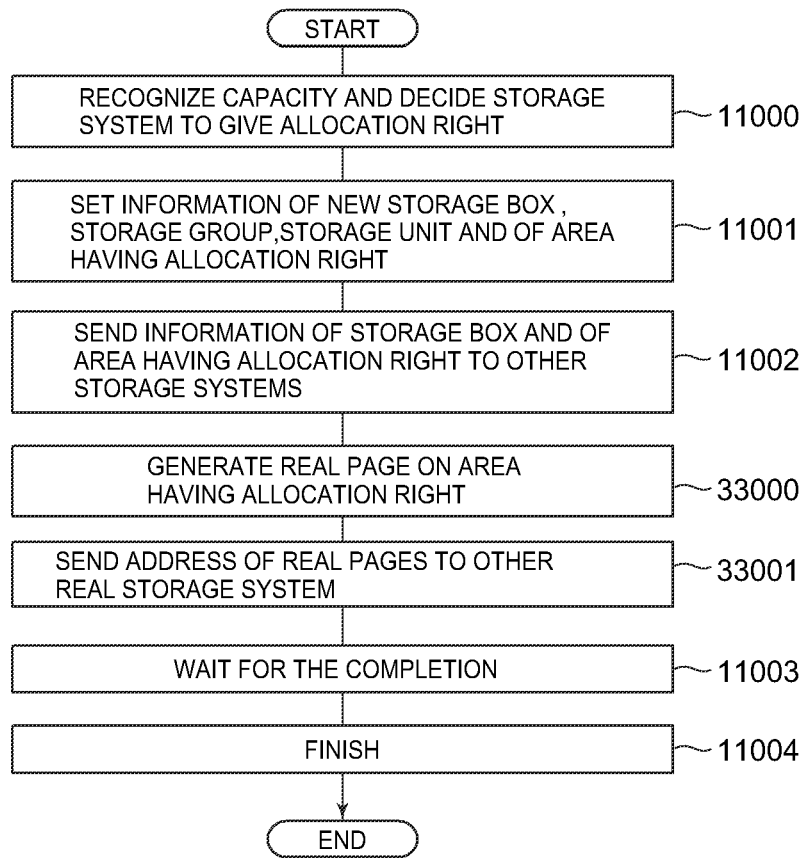
FIG. 48A is a drawing showing the processing flow of a storage box adding execution part related to the third example.

FIG. 48A is a drawing showing the processing flow of the storage box adding execution part related to the third example.

The difference between the processing flow of the storage box adding execution part 4300 related to the third example and the processing flow of the storage box adding execution part 4300 related to the first example is as follows.

The following steps are inserted after Step 11002.

Step 33000: The storage controller 200 generates the real page information 2100 of the area for which the relevant real storage system 100 has the allocation right, and registers this real page information 2100 in the empty page information management queue 2210.

Step 33001: The storage controller 200 sends the real page address of the area for which the other real storage systems 100 have the allocation right to the other real storage systems 100.

Figure 48B:
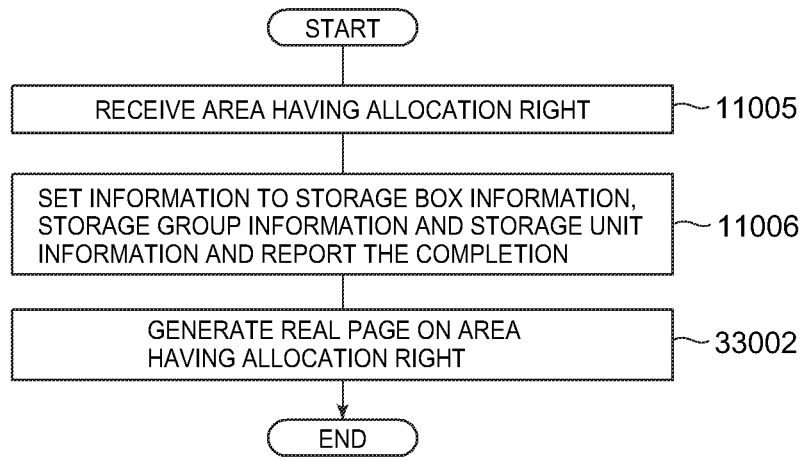
FIG. 48B is a drawing showing the processing flow of a real storage system, which has received information from a real storage system having the storage box allocation right related to the third example.

FIG. 48B is a drawing showing the processing flow of a real storage system, which has received information from a real storage system having the storage box allocation right related to the third example.

The difference between this processing flow related to the third example and the processing flow related to the first example is as follows.

The following step is inserted after Step 11006.

Step 33002: The storage controller 200 generates the real page information 2100 of the area for which the relevant real storage system 100 has the allocation right, and registers this real page information 2100 in the empty page information management queue 2210.

Figure 61:
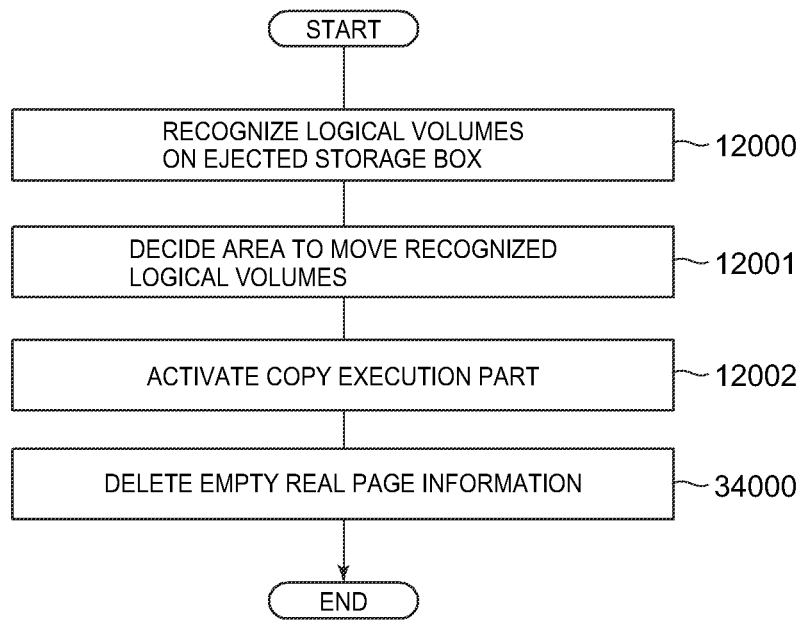
FIG. 61 is a drawing showing the processing flow of a storage box closing execution part related to the third example.

FIG. 61 is a drawing showing the processing flow of a storage box closing execution part related to the third example.

The storage box closing execution part 4700 is executed when a storage box 130 is to be ejected. When it has been decided that the storage box 130 is to be ejected, the real storage system 100 connected to this storage box 130 is activated, and the storage controller 200 of the activated real storage system 100 executes the following processing.

In the processing flow of the storage box closing execution part 4700 related to the third example, the following step is inserted with respect to the processing flow of the storage box closing execution part 4700 related to the first example.

Step 34000: The storage controller 200 deletes the empty real page information 2100 defined in the storage group 280 of the to-be-ejected storage box 130, and empties the empty page information management queue 2210.

FIG. 49 is a drawing showing the processing flow of a storage box migration execution part 4800 related to the third example.

The storage box migration execution part 4800 is executed when an old (migration-source) storage box 130 is replaced with a new (migration-destination) storage box 130. When it has been decided that the storage box 130 is to be replaced, the real storage system 100 connected to the old storage box 130 is activated. The flow of processing related to the third example differs from the flow of processing related to the first example as follows.

The following step is added as processing related to the migration-source storage box 130.

Step 35000: The storage controller 200 of the real storage system 100 deletes the empty real page information 2100 defined in the storage group 280 of the to-be-ejected storage box 130, and empties the empty page information management queue 2210.

The following step differs as processing related to the migration-destination storage box 130.

Step 35001: The storage controller 200 of the real storage system 100 generates the real page information 2100 related to the real page corresponding to the area, which has had the allocation right up to now, in the new storage box 130, and registers this real page information 2100 in the empty page information management queue 2210 of the corresponding storage group 280. The storage controller 200 also decides on the migration-destination logical volume, and defines the logical volume information 2000. Specifically, the storage controller 200 secures new logical volume information 2000 and sets the required information. In particular, at this point the storage controller 200 sets the identifier of the relevant real storage system 100, the identifier of the logical volume defined in the to-be-ejected storage box 130, and the area on the new storage box 130 in which this logical volume has been defined in the migrated LUN 2016 of the logical volume information 2000. The storage controller 200 also sets the migration flag 2015 to ON for one piece of logical volume information 2000, which, from among the logical volume information 2000, corresponds to the multiple logical volumes to be migrated, and sets the migration pointer 2017 to the first address. The storage controller 200 sets the migration waiting flag 2018 to ON for the remaining logical volume information 2000.

In addition, the processing flow related to the third example includes the following step instead of Step 13003 of the processing flow related to the first example.

Step 35002: The storage controller 200, in a case where the storage capacity of the new storage box 130 is larger than that of the old storage box 130, decides an allocation amount by equally dividing an increased capacity by the number of real storage systems 100 connected to the new storage box 130, decides an area, which corresponds to this allocation amount, sets the real page information 2100 of the corresponding real page, and sets this real page information 2100 in the empty page information management queue 2210. Thereafter, the storage controller 200 ends the processing.

Figure 50A:
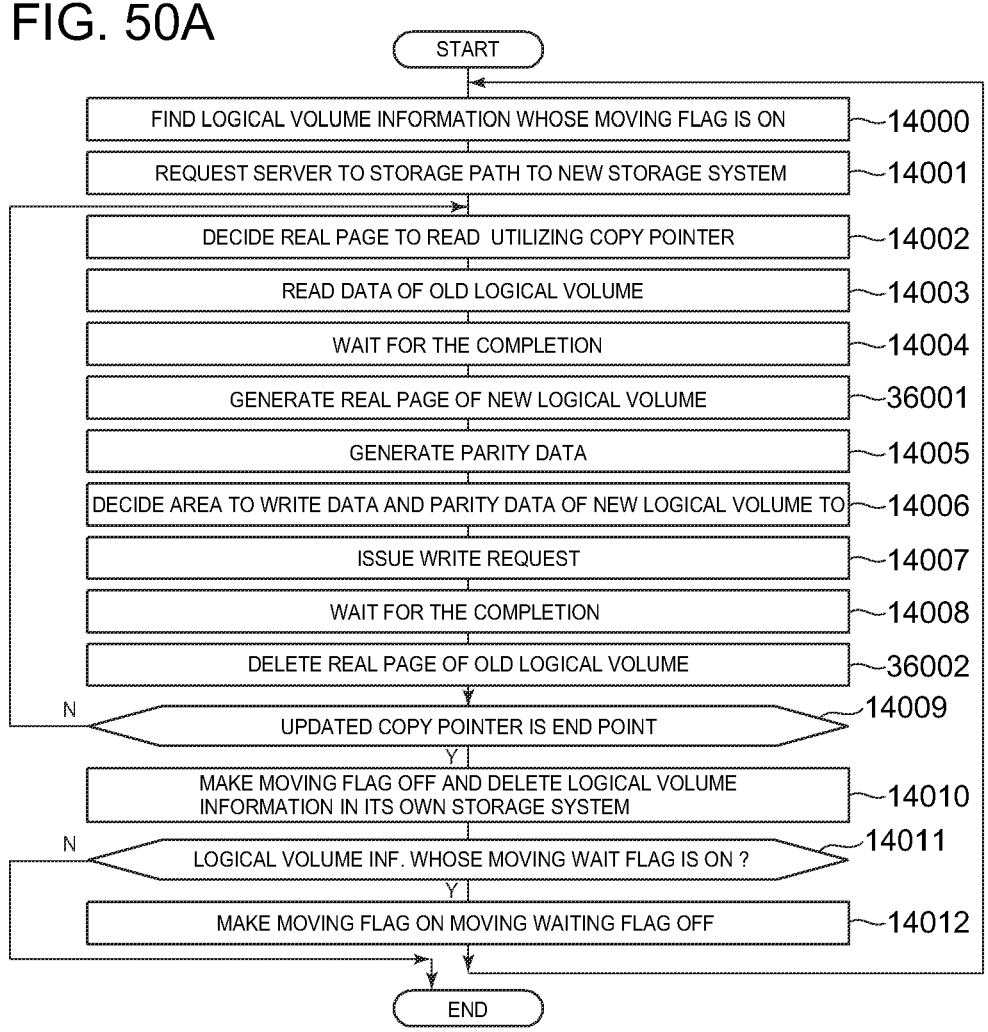
FIG. 50A is a drawing showing the processing flow of a copy execution part related to the third example.

FIG. 50A is a drawing showing the processing flow of a copy execution part related to the third example.

The copy execution part 4900 is activated from another execution part, and is commenced execution by the storage controller 200.

The difference between the processing flow of the copy execution part 4900 of the third example and the processing flow of the copy execution part 4900 of the first example is as follows.

Step 14002 of the processing flow related to the first example changes to the following step.

Step 36000: The storage controller 200, based on the logical volume information 2000 of the logical volume, which corresponds to the identifier of the migrated LUN 2016 of the logical volume information 2000 corresponding to the migration-source logical volume, and the migration pointer 2017, sets as the copy target the real page corresponding to the first real page pointer, which is not NULL, after the corresponding real page pointer. The storage controller 200 copies a real page pointer, which is NULL, to the real page pointer 2004 of the logical volume information 2000 corresponding to the migration-destination logical volume. The storage controller 200, based on the RAID type of the migration-destination storage group 280 and the migration pointer 2017, decides an area for which parity data can be generated from read data as the area to be read from the migration-source logical volume. In a case where the identifier of the real storage system 100 of the migrated LUN 2016 is the identifier of this real storage system 100, the storage controller 200 decides the physical area for performing the read from the RAID type and storage unit 160 of the storage group 280 (the parity data of the migration-source logical volume is not read at this time).

In addition, the following step is added to the steps of the processing flow related to the first example.

Step 36001: The storage controller 200 stores the real page for the migration-destination logical volume. The storage controller 200 secures the real page information 2100 from the empty page information management queue 2210 of the appropriate storage group 280, and sets the address of this real page information 2100 in the real page pointer 2004 of the logical volume information 2000.

In addition, the following step is added to the steps of the processing flow related to the first example.

Step 36002: The storage controller 200 deletes the real page information 2100 shown by the migration-source real page pointer 2004.

Figure 50B:
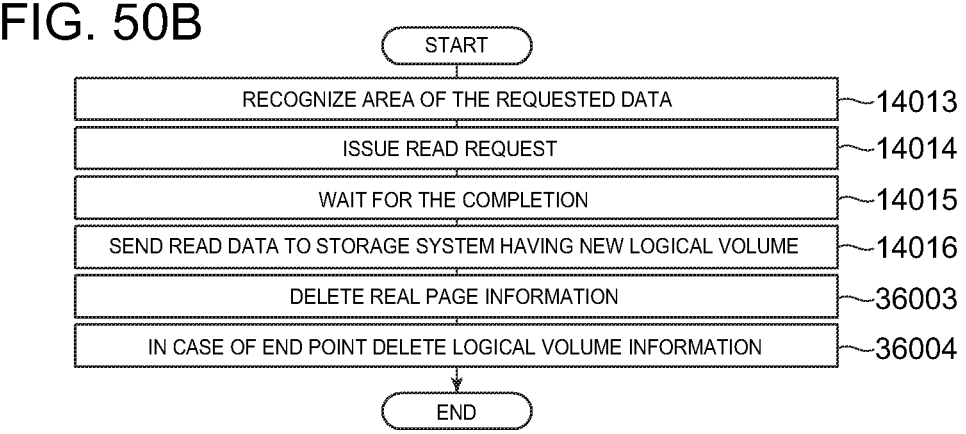
FIG. 50B is a drawing showing the processing flow related to a migration-source logical volume in a logical volume migration process performed between real storage systems related to the third example.

FIG. 50B is a drawing showing the processing flow related to a migration-source logical volume in a logical volume migration process performed between real storage systems related to the third example.

The following step is added to the steps of the processing flow related to the first example.

Step 36003: The storage controller 200 deletes the real page management information 2100 shown by the migration-source real page pointer 2004.

Step 36004: In a case where the last data of the relevant logical volume is transferred, the storage controller 200 deletes logical volume information corresponding the relevant logical volume. However in this example the empty segment bit map 2307 and the number of empty segments 2304 do not exist, therefore the storage controller 200 does not operate the information.

The processing flow of the cache closing schedule part 4910 related to the third example is the same as the processing flow of the cache closing schedule part 4910 related to the first example.

The processing flow of the cache closing migration part 4920 related to the third example is the same as the processing flow of the cache closing migration part 4920 related to the first example.

Figure 51:
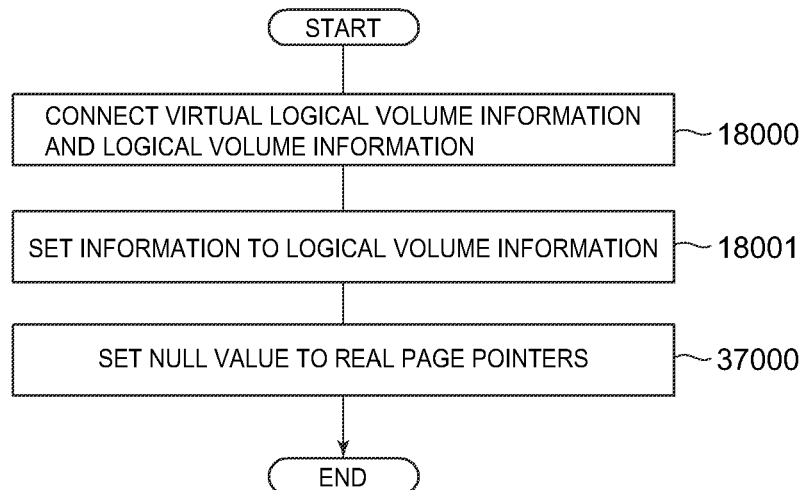
FIG. 51 is a drawing showing the processing flow of a virtual logical volume generation part related to the third example.

FIG. 51 is a drawing showing the processing flow of a virtual logical volume generation part related to the third example.

The virtual logical volume generation part 4950 is executed when defining a virtual logical volume.

The difference between the processing flow of the virtual logical volume generation part 4950 related to the third example and the processing flow of the virtual logical volume generation part 4950 related to the first example is as follows.

Step 37000: The storage controller 200 calculates the number of real pages based on the logical capacity 2002 set in Step 18001 and the real page size. The storage controller 200 sets a NULL value in the calculated number of real page pointers 2004 in the logical volume information 2000. Thereafter, the storage controller 200 ends the processing.

Figure 52:
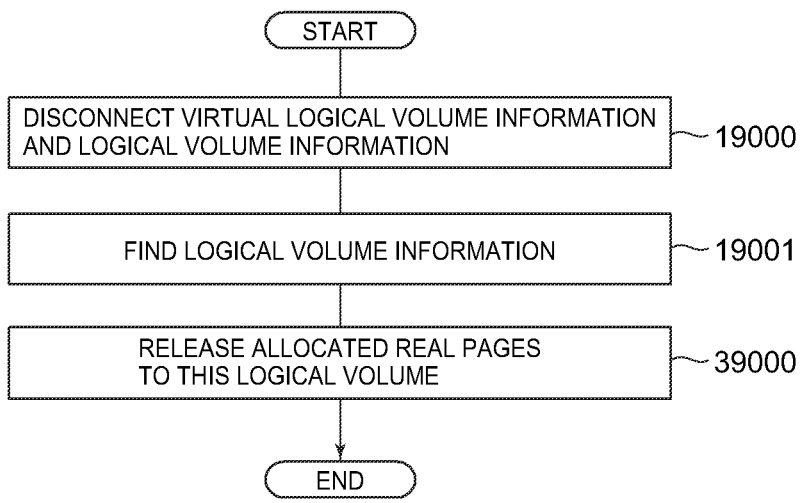
FIG. 52 is a drawing showing the processing flow of a virtual logical volume deletion part related to the third example.

FIG. 52 is a drawing showing the processing flow of a virtual logical volume deletion part related to the third example.

The virtual logical volume deletion part 4960 is executed when deleting a virtual logical volume. In accordance with this, the real storage system 100 having the control right of the to-be-deleted virtual logical volume executes the processing. The identifier of the virtual logical volume is specified when executing the virtual logical volume deletion part 4960.

Step 39000: The storage controller 200, based on the logical volume information 2000, finds the real page pointer 2004, which does not have a NULL value, and returns all of the allocated real page information 2100 shown in accordance with the real page pointers 2004 to the empty page information management queue 2210. Thereafter, the storage controller 200 ends the processing.

Example 4

Next, an information system related to a fourth example will be explained.

In the information system related to the fourth example, the real storage system 100 has a capacity virtualization function, and one real storage system 100 has a storage box 130 allocation function.

The configuration of the information system related to the fourth example is the same as that of the information system related to the first example.

The configuration of the server port information 198 related to the fourth example is the same as that of the server port information 198 related to the first example.

The configuration of the real storage system 100 related to the fourth example is the same as the configuration of the real storage system 100 related to the first example.

The configuration of the cache memory 210 related to the fourth example is the same as the configuration of the cache memory 210 related to the first example.

The configuration of the information included in the common memory 220 related to the fourth example is the same as the configuration of the information included in the common memory 220 related to the third example.

The configuration of the logical volume information 2000 related to the fourth example is the same as the configuration of the logical volume information 2000 related to the third example. Furthermore, the configuration of the cache management information 2750 related to the fourth example is the same as the configuration of the cache management information 2750 related to the first example.

The data configuration of the empty cache information management queue 2201 managed by the empty cache management information pointer 2650 related to the fourth example is the same as the data configuration of the empty cache information management queue 2201 related to the first example.

The configuration of the storage box information 2050 related to the fourth example is the same as that of the storage box information 2050 related to the second example.

The configuration of the storage group information 2300 related to the fourth example is the same as the configuration of the storage group information 2300 related to the third example.

The configuration of the real page information 2100 related to the fourth example is the same as the configuration of the real page information 2100 related to the third example.

The data configuration of the empty page information management queue 2210 related to the fourth example is the same as the data configuration of the empty page information management queue 2210 related to the third example.

The configuration of the storage unit information 2500 related to the fourth example is the same as that of the storage unit information 2500 related to the first example.

Next, the operations executed by the storage controller 200 will be explained using the above-described management information. In the fourth example, the programs stored in the memory 270 are the same as in the first example.

The processing flows of the read process execution part 4000, the write request receive part 4100, and the write after process execution part 4200 are the same as in the third example.

Figure 53A:
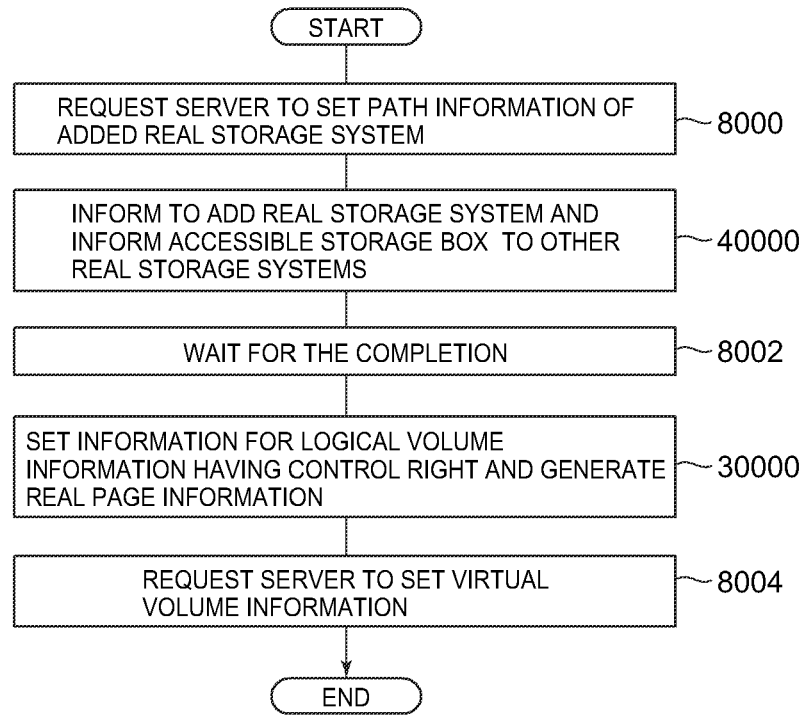
FIG. 53A is a drawing showing the processing flow of a storage system adding execution part related to a fourth example.

FIG. 53A is a drawing showing the processing flow of a storage system adding execution part related to the fourth example.

The process of this processing flow is executed by a real storage system 100, which has been added.

The difference between the processing flow of the storage system adding execution part 4300 related to the fourth example and the processing flow of the storage system adding execution part 4300 related to the third example is as follows.

Step 40000: The storage controller 200 notifies the other real storage systems 100 in the same virtual storage system 190 of information showing that a real storage system 100 has been added inside the virtual storage system 190, and showing the storage box 130, which the relevant real storage system 100 is able to access. Thus, in the fourth example, the allocation right is given in units of storage boxes 130.

Figure 53B:
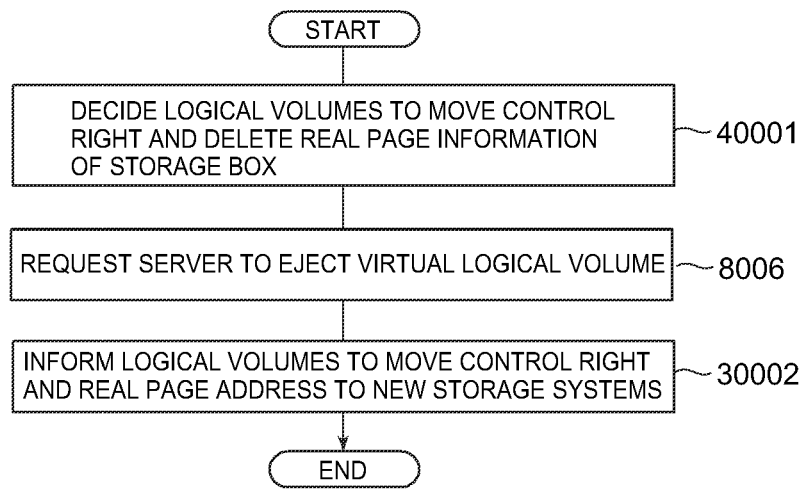
FIG. 53B is a drawing showing the processing flow of a real storage system, which has received a request from an added real storage system related to the fourth example.

FIG. 53B is a drawing showing the processing flow of a real storage system, which has received a request from an added real storage system related to the fourth example.

Step 40001: The storage controller 200, from among the notified storage boxes 130, decides a storage box for moving the control right to the added real storage system 100. In the fourth example, the allocation right is moved having the storage box 130 as the unit. At this time, the storage controller 200 references the second read times 2009 and the second write times 2010 of the respective logical volume information 2000. The storage controller 200 also references the second R times 2311 and the second W times 2313 of the storage group information 2300 corresponding the storage group 280, which is allocating each logical volume.

Figure 54A:
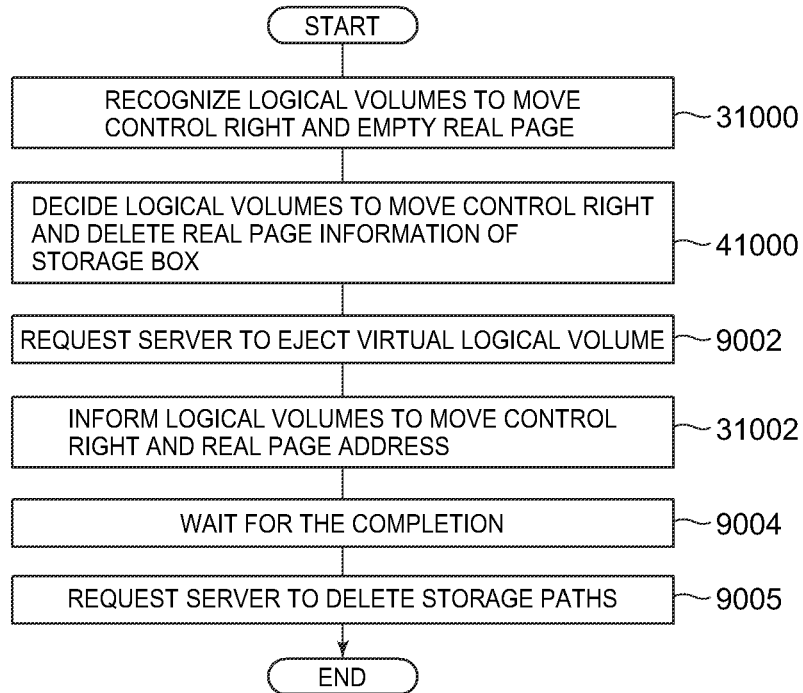
FIG. 54A is a drawing showing the processing flow of a storage system closing execution part related to the fourth example.

FIG. 54A is a drawing showing the processing flow of the storage system closing execution part related to the fourth example.

The process of this processing flow is executed by a real storage system 100, which is to be ejected.

The difference between the processing flow of the storage system closing execution part 4700 related to the fourth example and the processing flow of the storage system closing execution part 4700 related to the third example is as follows.

Step 41000: The storage controller 200 performs the processing for moving the allocation right with respect to the storage box 130. At this time, the storage controller 200 references the second read times 2009 and the second write times 2010 of the respective logical volume information 2000. The storage controller 200 also references the second R times 2311 and the second W times 2313 of the storage group information 2300 corresponding the storage group 280, which is allocating each logical volume.

Figure 54B:
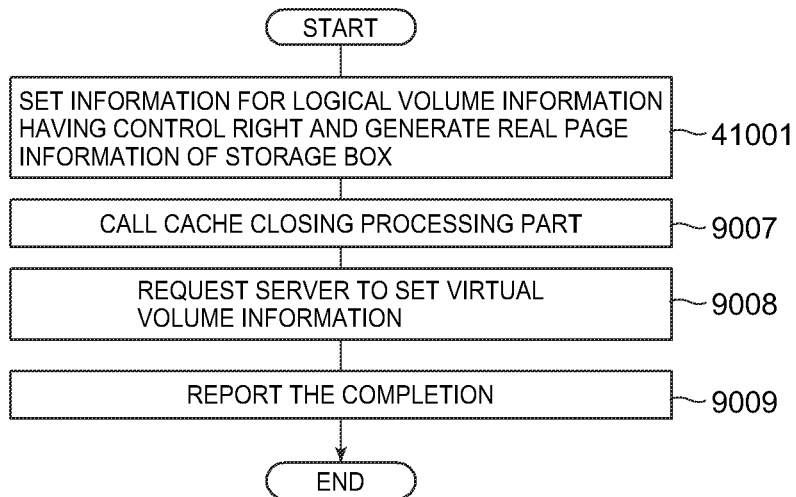
FIG. 54B is a drawing showing the processing flow of a real storage system, which has received a request from a to-be-ejected real storage system related to the fourth example.

FIG. 54B is a drawing showing the processing flow of a real storage system, which has received a request from a to-be-ejected real storage system related to the fourth example.

Step 41001: The storage controller 200 is configured to obtain the allocation right in storage box 130 units.

In the fourth example as well, the same processing may be performed when migrating a logical volume between real storage systems 100 in order to balance the loads on the real storage systems 100. An area for which the real storage system has the allocation right may also be migrated between real storage systems 100. In accordance with this, in this process, the storage controller 200 executes Step 41000 and Step 41001.

Figure 55A:
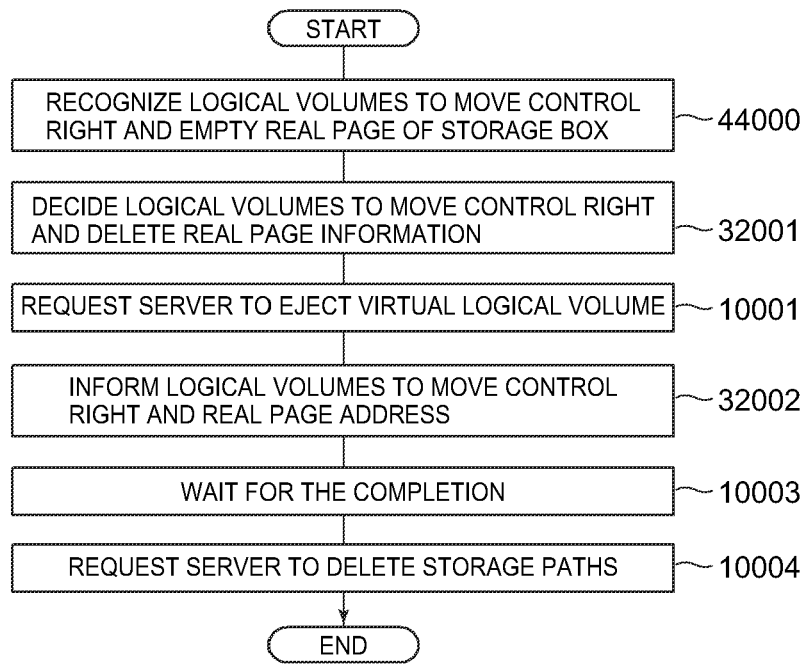
FIG. 55A is a drawing showing the processing flow of a storage system migration execution part related to the fourth example.

FIG. 55A is a drawing showing the processing flow of the storage system migration execution part related to the fourth example.

The process of this processing is executed by a migration-source real storage system 100.

The difference between the processing flow of the storage system migration execution part 4500 related to the fourth example and the processing flow of the storage system migration execution part 4500 related to the third example is as follows.

Step 44000: The storage controller 200 moves the allocation right with respect to the storage box 130.

Figure 55B:
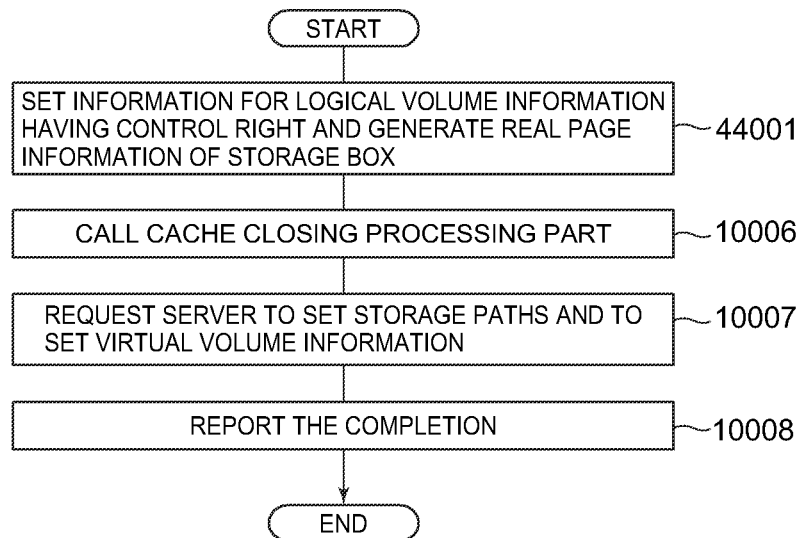
FIG. 55B is a drawing showing the processing flow of a real storage system, which has received a request from a migration-destination real storage system related to the fourth example.

FIG. 55B is a drawing showing the processing flow of a real storage system, which has received a request from a migration-destination real storage system related to the fourth example.

Step 44001: The storage controller 200 moves the allocation right in storage box 130 units.

Figure 56A:
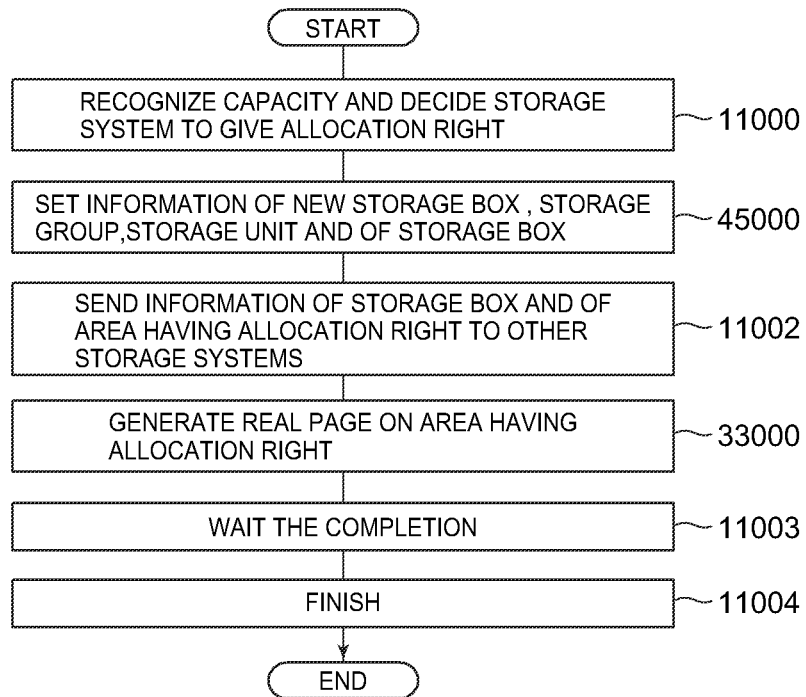
FIG. 56A is a drawing showing the processing flow of a storage box adding execution part related to the fourth example.
Figure 56B:
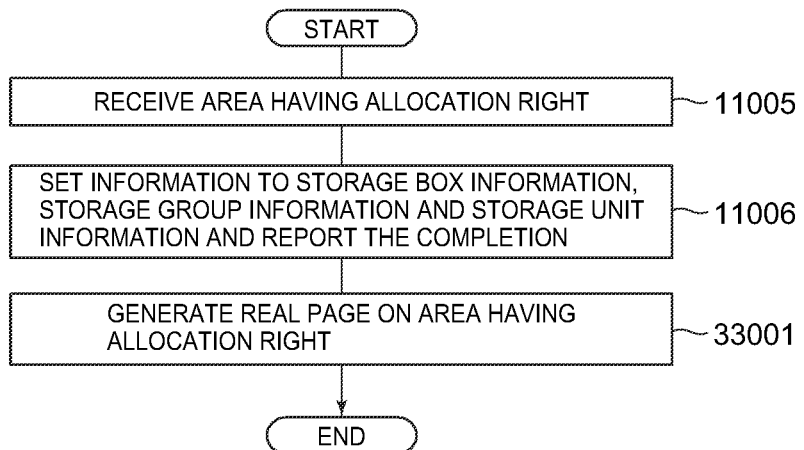
FIG. 56B is a drawing showing the processing flow of a real storage system, which has received information from a real storage system having the storage box allocation right related to the fourth example.

FIG. 56A is a drawing showing the processing flow of a storage box adding execution part related to the fourth example. FIG. 56B is a drawing showing the processing flow of a real storage system, which has received information from a real storage system having the storage box allocation right related to the fourth example.

The difference between the processing flow of the storage box adding execution part 4600 and the processing flow of the storage box adding execution part 4600 related to the third example is as follows.

Step 45000: The storage controller 200 of the real storage system 100 having the control right of the added storage box 130 generates the real page information 2100 to be added, and registers this real page information 2100 in the empty page information management queue 2210.

Figure 57:
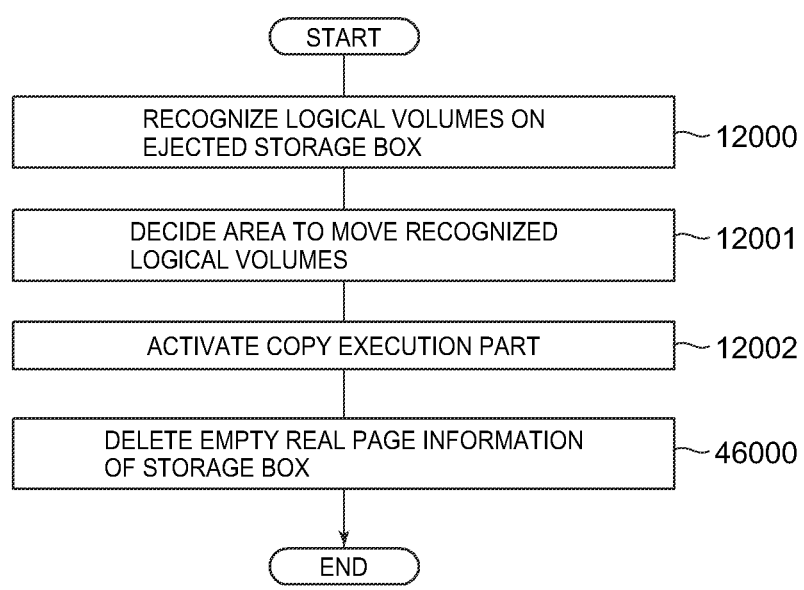
FIG. 57 is a drawing showing the processing flow of a storage box closing execution part related to the fourth example.

FIG. 57 is a drawing showing the processing flow of a storage box closing execution part related to the fourth example.

The difference between the processing flow of the storage box closing execution part 4700 and the processing flow of the storage box closing execution part 4700 related to the third example is as follows.

Step 46000: The real storage system 100 having the control right of the to-be-ejected storage box 130 deletes the real page information 2100 of the empty real page information management queue 2210, and empties the empty real page information management queue 2210.

Figure 58:
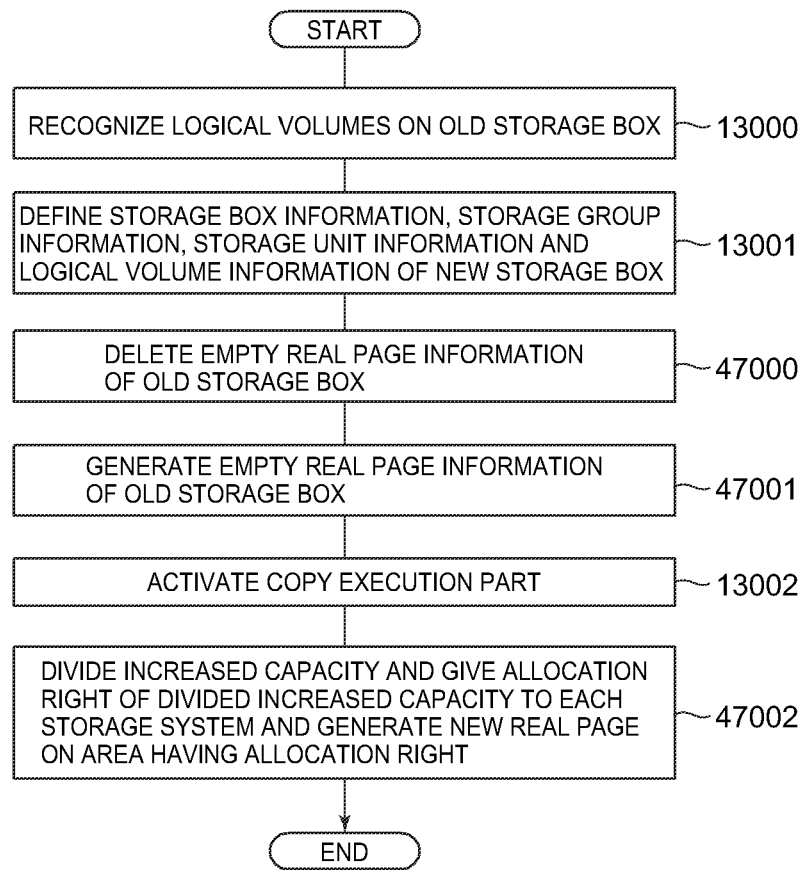
FIG. 58 is a drawing showing the processing flow of a storage box migration execution part related to the fourth example.

FIG. 58 is a drawing showing the processing flow of a storage box migration execution part related to the fourth example.

The difference between the processing flow of the storage box migration execution part 4800 and the processing flow of the storage box migration execution part 4800 related to the third example is as follows.

Step 47000: The real storage system 100 having the control right of the migration-destination storage box 130 generates the real page information 2100 to be added, and registers this real page information 2100 in the empty page information management queue 2210.

Step 47001: The real storage system 100 having the control right of the migration-source storage box 130 deletes the real page information 2100 of the empty page information management queue 2210, and empties the empty page information management queue 2210.

Step 47002: The real storage system 100 having the control right of the migration-source storage box 130 sets the real page information 2100 in the empty page information management queue 2210.

The processing flow of the copy execution part 4900 related to the fourth example is the same as the processing flow of the copy execution part 4900 related to the third example.

The processing flow of the cache closing schedule part 4910 related to the fourth example is the same as the processing flow of the cache closing schedule part 4910 related to the third example.

The processing flow of the cache closing execution part 4920 related to the fourth example is the same as the processing flow of the cache closing execution part 4920 related to the third example.

The processing flow of the virtual logical volume generation part 4950 related to the fourth example is the same as the processing flow of the virtual logical volume generation part 4950 related to the third example.

The processing flow of the virtual logical volume deletion part 4960 related to the fourth example is the same as the processing flow of the virtual logical volume deletion part 4960 related to the third example.

According to the examples explained hereinabove, it is possible to provide new value in accordance with separating the storage system and the storage box, that is, the storage controller and the storage medium so that each can be added and subtracted independently.

A number of examples have been explained hereinabove, but the present invention is not limited to these examples.

REFERENCE SIGNS LIST

100 Real storage system

We claim:
1. A compound storage system, comprising:
multiple storage devices;
multiple storage systems configured to perform processing related to data I/O (input/output) to/from the multiple storage devices, and
a controller configured to:
determine that a first storage system of the multiple storage systems possesses an allocation right for a storage area of one of the multiple storage devices, and
responsive to occurrence of a predetermined condition, determine that the allocation right is to be moved between the first storage system and a second storage system of the multiple storage systems.
2. The compound storage system according to claim 1, wherein the first storage system comprises a control right to perform I/O on the storage area of the storage device, and
the first storage system is configured to determine that the control right is to be moved between the first storage system and the second storage system under a predetermined condition to move the control right.
3. The compound storage system according to claim 2, wherein the control right comprises a right to perform I/O on the storage area of the storage device via a logical volume, and the allocation right comprises a right to allocate the storage area of the storage device to the logical volume.

4. The compound storage system according to claim 2, wherein the controller is configured to move a control right comprising a right to perform I/O on a first storage area and an allocation right for a second storage area associated with the first storage area to a same storage system.

5. The compound storage system according to claim 1, wherein the controller is configured to perform a migration of the allocation right for the storage area in accordance with a change in a number of storage systems or in a number of storage devices.

6. The compound storage system according to claim 5, wherein the predetermined condition includes adding a third storage system to the compound storage system, and the controller is configured to move the allocation right to the third storage system.

7. The compound storage system according to claim 5, wherein the predetermined condition includes ejecting the second storage system from the compound storage system, the controller is configured to move the allocation right from the second storage system to another storage system of the multiple storage systems.

8. The compound storage system according to claim 1, wherein the controller is configured to perform a migration of the allocation right for the storage area in accordance with a balance of load on the multiple storage systems.

9. The compound storage system according to claim 5, wherein a migration-destination storage system is configured to receive a notification comprising a number of segments related to the allocation right from a migration-source storage system along with the migration of the allocation right.

10. The compound storage system according to claim 5, wherein a migration-destination storage system is configured to receive a notification comprising address information of a real page related to the allocation right from a migration-source storage system along with the migration of the allocation right.

11. A method for moving an allocation right within a compound storage system including multiple storage devices, multiple storage systems, and a controller, the method comprising:
    performing, by one or more of the multiple storage systems, processing related to a data I/O (input/output) to/from the multiple storage devices,
    determining, by the controller, that a first storage system of the multiple storage systems possesses an allocation right for a storage area of one of the multiple storage devices, and
    responsive to occurrence of a predetermined condition, determining, by the controller, that the allocation right is to be moved between the first storage system to a second storage system of the multiple storage systems.

* * * * *